US011191056B2

(12) United States Patent
Fischer et al.

(10) Patent No.: US 11,191,056 B2
(45) Date of Patent: Nov. 30, 2021

(54) SYSTEMS AND METHODS FOR VALIDITY TIME AND CHANGE NOTIFICATION OF BROADCAST LOCATION ASSISTANCE DATA

(71) Applicant: QUALCOMM Incorporated, San Diego, CA (US)

(72) Inventors: Sven Fischer, Nuremberg (DE); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/534,877

(22) Filed: Aug. 7, 2019

(65) Prior Publication Data

US 2020/0053690 A1    Feb. 13, 2020

Related U.S. Application Data

(60) Provisional application No. 62/716,294, filed on Aug. 8, 2018.

(51) Int. Cl.
*H04W 64/00* (2009.01)
*G01S 19/25* (2010.01)
(Continued)

(52) U.S. Cl.
CPC ......... *H04W 64/003* (2013.01); *G01S 5/0236* (2013.01); *G01S 19/05* (2013.01); *G01S 19/252* (2013.01); *H04W 64/00* (2013.01)

(58) Field of Classification Search
CPC ... H04W 64/003; H04W 64/00; H04W 76/40; H04W 48/12; G01S 19/252; G01S 5/0236; G01S 19/05
See application file for complete search history.

(56) References Cited

U.S. PATENT DOCUMENTS 6,313,787 B1    11/2001 King et al.
7,595,754 B2    9/2009 Mehta
(Continued)

FOREIGN PATENT DOCUMENTS

CN    101072430 A    11/2007
CN    101072430 A    11/2007
(Continued)

OTHER PUBLICATIONS

3GPP TS 36.305: "3rd Generation Partnership Project; Technical Specification Group Radio Access Network; Evolved Universal Terrestrial Radio Access Network (E-UTRAN); Stage 2 Functional Specification of User Equipment (UE) Positioning in E-UTRAN", Version 10.2.0, Release 10, Jun. 2011, pp. 51.
(Continued)

*Primary Examiner* — Nam T Huynh
(74) *Attorney, Agent, or Firm* — Qualcomm Incorporated

(57) ABSTRACT

Positioning assistance data (PAD) may be partitioned into positioning System Information Blocks (posSIBs) and periodically broadcast by a base station. A posSIB or scheduling information for a posSIB may include a validity time and a validity tag that indicates whether the PAD for a posSIB has changed. A user equipment (UE) may receive a posSIB comprising PAD and the validity time and the validity tag for the posSIB. The UE may then wait until the validity time expires and/or the validity tag in the scheduling information indicates a change of PAD before receiving a new instance of the posSIB. The validity time and validity tag may both be included in the posSIB, in which case the UE may receive the posSIB and then look at the validity tag to determine whether to decode and process the PAD.

22 Claims, 13 Drawing Sheets

(51) Int. Cl.
*G01S 5/02* (2010.01)
*G01S 19/05* (2010.01)

(56) References Cited

U.S. PATENT DOCUMENTS

| | | |
|---|---|---|
| 8,463,294 B2 | 6/2013 | Kone |
| 8,538,444 B2 | 9/2013 | Lee et al. |
| 8,620,255 B2 | 12/2013 | Edge et al. |
| 8,909,239 B2 | 12/2014 | Edge et al. |
| 9,119,167 B2 | 8/2015 | Edge et al. |
| 9,271,256 B2 | 2/2016 | Edge et al. |
| 9,699,758 B2 | 7/2017 | Edge et al. |
| 10,383,081 B2 | 8/2019 | Edge et al. |
| 2004/0087315 A1 | 5/2004 | Dufva et al. |
| 2004/0267840 A1 | 12/2004 | Ono |
| 2005/0272405 A1 | 12/2005 | Tomlinson et al. |
| 2005/0272439 A1 | 12/2005 | Picciriello et al. |
| 2007/0049344 A1 | 3/2007 | Van et al. |
| 2007/0120737 A1 | 5/2007 | Moilanen et al. |
| 2007/0257838 A1 | 11/2007 | Cheng |
| 2008/0113671 A1 | 5/2008 | Ghozati et al. |
| 2008/0182592 A1 | 7/2008 | Cha et al. |
| 2008/0228654 A1 | 9/2008 | Edge |
| 2008/0242373 A1 | 10/2008 | Lu et al. |
| 2009/0061898 A1 | 3/2009 | Johnson et al. |
| 2009/0208001 A1 | 8/2009 | Kent et al. |
| 2009/0253422 A1 | 10/2009 | Fischer |
| 2010/0090822 A1 | 4/2010 | Benson et al. |
| 2010/0232362 A1 | 9/2010 | Tenny |
| 2010/0283677 A1 | 11/2010 | Halivaara |
| 2011/0000360 A1 | 1/2011 | Saino et al. |
| 2011/0032859 A1 | 2/2011 | Wirola et al. |
| 2011/0039577 A1 | 2/2011 | Stern-Berkowitz et al. |
| 2011/0081884 A1 | 4/2011 | Sennett et al. |
| 2011/0117925 A1 | 5/2011 | Sampath et al. |
| 2011/0200024 A1 | 8/2011 | Karaoguz et al. |
| 2011/0212733 A1 | 9/2011 | Edge et al. |
| 2012/0106740 A1 | 5/2012 | Kehren et al. |
| 2012/0149392 A1 | 6/2012 | Siomina et al. |
| 2012/0252492 A1 | 10/2012 | Chien |
| 2013/0033999 A1 | 2/2013 | Siomina et al. |
| 2013/0237247 A1 | 9/2013 | Lee et al. |
| 2013/0305053 A1 | 11/2013 | Laffey |
| 2015/0099540 A1 | 4/2015 | Siomina et al. |
| 2016/0109582 A1 | 4/2016 | Sendonaris et al. |
| 2016/0205499 A1 | 7/2016 | Davydov et al. |
| 2017/0123072 A1 | 5/2017 | Miya et al. |
| 2017/0135036 A1 | 5/2017 | Schmidt et al. |
| 2017/0317894 A1 | 11/2017 | Dao et al. |
| 2019/0098601 A1 | 3/2019 | Kumar et al. |
| 2019/0268725 A1 | 8/2019 | Edge et al. |
| 2019/0349881 A1 | 11/2019 | Choi et al. |
| 2020/0045667 A1 | 2/2020 | Razavi et al. |
| 2020/0084586 A1 | 3/2020 | Ryden et al. |
| 2020/0389766 A1 | 12/2020 | Kim et al. |

FOREIGN PATENT DOCUMENTS

| | | |
|---|---|---|
| CN | 101087482 A | 12/2007 |
| CN | 101087482 A | 12/2007 |
| CN | 101098182 A | 1/2008 |
| CN | 101098182 A | 1/2008 |
| CN | 101155050 A | 4/2008 |
| CN | 101155050 A | 4/2008 |
| CN | 101516059 A | 8/2009 |
| CN | 101622891 A | 1/2010 |
| CN | 101622891 A | 1/2010 |
| CN | 101877818 A | 11/2010 |
| CN | 101888587 A | 11/2010 |
| CN | 101888587 A | 11/2010 |
| CN | 102164340 A | 8/2011 |
| CN | 102164340 A | 8/2011 |
| EP | 2360971 A2 | 8/2011 |
| EP | 2360971 A2 | 8/2011 |
| JP | 2001208825 A | 8/2001 |
| JP | 2001208825 A | 8/2001 |
| JP | 2006058178 A | 3/2006 |
| JP | 2006058178 A | 3/2006 |
| JP | 2008535426 A | 8/2008 |
| JP | 2008535426 A | 8/2008 |
| JP | 2011015406 A | 1/2011 |
| JP | 2011015406 A | 1/2011 |
| JP | 2011022151 A | 2/2011 |
| JP | 2011022151 A | 2/2011 |
| WO | 0111382 | 2/2001 |
| WO | WO-0111382 A1 | 2/2001 |
| WO | 2006106187 A1 | 10/2006 |
| WO | WO-2006106187 A1 | 10/2006 |
| WO | 2008084382 A2 | 7/2008 |
| WO | WO-2008084382 A2 | 7/2008 |
| WO | 09082728 | 7/2009 |
| WO | WO-09082728 | 7/2009 |
| WO | WO-2009155278 | 12/2009 |
| WO | 2010105213 A1 | 9/2010 |
| WO | WO-2010105213 A1 | 9/2010 |
| WO | 2010130134 A1 | 11/2010 |
| WO | WO-2010130134 A1 | 11/2010 |
| WO | 2011069555 A1 | 6/2011 |
| WO | WO-2011069555 A1 | 6/2011 |
| WO | WO-2012108812 A1 | 8/2012 |
| WO | 2013033464 A2 | 3/2013 |
| WO | WO-2013033464 A2 | 3/2013 |
| WO | 2014189841 A1 | 11/2014 |
| WO | WO-2014189841 A1 | 11/2014 |

OTHER PUBLICATIONS

3GPP TS 36.355: "3rd Generation Partnership Project; Technical Specification Group Radio Access Network; Evolved Universal Terrestrial Radio Access (E-Utra); LTE Positioning Protocol (LPP)", Version 10.2.0, Release 10, Jun. 2011, pp. 114.

3GPP TS 44.035: "Digital Cellular Telecommunications System (Phase 2+); Location Services (LCS); Broadcast Network Assistance for Enhanced Observed Time Difference (E-OTD) and Global Positioning System (GPS) Positioning Methods," ETSI TS 144 035, Version 10.0.0, Release 10, Apr. 2011, pp. 36.

3rd Generation Partnership Project; Technical Specification Group Services and System Aspects; Telecommunication management; Charging management; Location Services (LCS) charging (Release 10), 3GPP Standard; 3GPP TS 32.271, 3rd Generation Partnership Project (3GPP), Mobile Competence Centre ; 650, Route Des Lucioles ; F-06921 Sophia-Antipolis Cedex ; France, No. V10.0.0, Dec. 30, 2010 (Dec. 30, 2010), pp. 1-26, XP050462465, [retrieved on Dec. 30, 2010].

Huawei et al., "Switch between Unicast and Broadcast", 3GPP Draft; R2-1803635 Switch between Unicast and Broadcast, 3rd Generation Partnership Project (3GPP), Mobile Competence Centre, 650, Route Des Lucioies, F-06921 Sophia-Antipolis Cedex, France, vol. RAN WG2, No. Athens, Greece; Feb. 26, 2018-Mar. 2, 2018, Feb. 16, 2018, XP051400658, Retrieved from the Internet: URL:http://www.3gpp.org/ftp/tsg%5Fran/WG2%5FRL2/TSGR2%5F101/Docs/ [retrieved on Feb. 16, 2018], 2 pages.

Qualcomm Europe; "Anticipated Impact on RAN2/3 Specifications of LTE Positioning Work lte", 3GPP Draft R3-090703, 3rd Generation Partnership Project (3GPP), Mobile Competence Centre; 650, Route Des Lucioles; F-06921 Sophia-Antipolis Cedex; France, No. Seoul, Korea; Mar. 18, 2009, Mar. 18, 2009 (Mar. 18, 2009), XP050341090.

Qualcomm Incorporated: "Evaluation of Option 1 and Option 2 for ciphering key distribution to suitably subscribed UEs for encrypted broadcasted positioning data", 3GPP Draft; C4-182149, 3rd Generation Partnership Project (3GPP), Mobile Competence Centre, 650, Route Des Lucioles, F-06921 Sophia-Antipolis Cedex, France, vol. CT WG4, No. Montreal, Canada; Feb. 26, 2018-Mar. 2, 2018, Feb. 15, 2018, XP051396296.

CMCC et al., "3GPP TSG-RAN WG2 Meeting #102; R2-1808893; Way forward on Modification of Positioning SIBs", 3GPP Draft; R2-1808893 Modification Of Positioning SIBS, 3rd Generation Partnership Project (3GPP), Mobile Competence Centre ; 650,

(56) References Cited

OTHER PUBLICATIONS

Route Des Lucioles ; F-06921 Sophia-Antipolis Cedex ; France, vol. RAN WG2, No. Busan, Korea; May 21, 2018-May, 25, 2018, May 25, 2018 (May 25, 2018), XP051520255, 12 Pages.
Ericsson: "3GPP TSG-RAN WG2 Meeting #102; R2-1808111; On Representation , Broadcast and Ciphering of Positioning SIBs", 3GPP Draft; R2-1808111 On Representation, Broadcast And Ciphering Of Positioning SIBS, 3rd Generation Partnership Project (3GPP), Mobile Competence Centre ; 650, Route Des Lucioles ; F-06921 Sophia-An , vol. RAN WG2, No. Busan, Korea ; May 21, 2018-May 25, 2018, May 11, 2018 (May 11, 2018), XP051519522, 8 Pages.
Ericsson: "3GPP TSG-RAN WG2 Meeting #103; R2-1813169; Positioning SIB Value Tag and Expiration Time", 3GPP Draft; R2-1813169 LPP CR Positioning SIB Value Tag And Expiration Time_V6, 3rd Generation Partnership Project (3GPP), Mobile Competence Centre; 650, Route Des Lucioles ; F-06921 Sophia-Antipolis , vol. RAN WG2, No. Gothenburg, Sweden; Aug. 20, 2018-Aug. 24, 2018, Sep. 1, 2018 (Sep. 1, 2018), XP051522727, 3 Pages.
Qualcomm Incorporated: "3GPP TSG-RAN WG2 Meeting #103; R2-1812356; Modification of Positioning SIBs", 3GPP Draft; R2-1812356_(POSSIB Modification Period), 3rd Generation Partnership Project (3GPP), Mobile Competence Centre ; 650, Route Des Lucioles ; F-06921 Sophia-Antipolis Cedex ; France , vol. RAN WG2, No. Gothenburg, Sweden; Aug. 20, 2018-Aug. 24, 2018, Aug. 9, 2018 (Aug. 9, 2018), XP051521962, 5 Pages.
Qualcomm Incorporated: "3GPP TSG-RAN WG2 Meeting #103; R2-1812378; Modification of Positioning SIBs", 3GPP Draft; R2-1812378_(CR 36355 REL-15 Possib Modification Period), 3rd Generation Partnership Project (3GPP), Mobile Competence Centre; 650, Route Des Lucioles ; F-06921 Sophia-Antipolis Cedex ; FR, vol. RAN WG2, No. Gothenburg, Sweden; Aug. 20, 2018-Aug. 24, 2018, Aug. 9, 2018 (Aug. 9, 2018), XP051521980, 5 Pages.
Qualcomm Incorporated: "3GPP TSG-RAN WG3 Meeting #100; R3-183104; LPPa Broadcast Assistance Data information", 3GPP Draft; R3-183104_(LPPA Broadcast)_V1, 3rd Generation Partnership Project (3GPP), Mobile Competence Centre ; 650, Route Des Lucioles ; F-06921 Sophia-Antipolis Cedex ; France, vol. RAN WG3, No. Busan, Korea; May 21, 2018-May 25, 2018, May 11, 2018 (May 11, 2018), XP051527271, 5 Pages.
3GPP TS 36.305: "3rd Generation Partnership Project; Technical Specification Group Radio Access Network; Evolved Universal Terrestrial Radio Access Network (E-UTRAN); Stage 2 Functional Specification of User Equipment (UE) Positioning in E-UTRAN", Version 10.2.0, Release 10, Jun. 2011, p. 51.
3GPP TS 36.355: "3rd Generation Partnership Project; Technical Specification Group Radio Access Network; Evolved Universal Terrestrial Radio Access (E-UTRA); Lte Positioning Protocol (LPP)", Version 10.2.0, Release 10, Jun. 2011, p. 114.
3GPP TS 44.035: "Digital Cellular Telecommunications System (Phase 2+); Location Services (LCS); Broadcast Network Assistance for Enhanced Observed Time Difference (E-OTD) and Global Positioning System (GPS) Positioning Methods," ETSI TS 144 035, Version 10.0.0, Release 10, Apr. 2011, p. 36.
3GPP TS 44.035: "3rd Generation Partnership Project; Technical Specification Group GSM/EDGE Radio Access Network; Location Services (LCS); Broadcast network assistance for Enhanced Observed Time Difference (E-OTD) and Global Positioning System (GPS) positioning methods", Release 10, Version 10.0.0, Mar. 2011, 34 Pages.
"3rd Generation Partnership Project; Technical Specification Group Radio Access Network; Evolved Universal Terrestrial Radio Access (E-UTRA); LTE Positioning Protocol (LPP) (Release 9)", 3GPP Standard; 3GPP TS 36.355, 3RD Generation Partnership Project (3GPP), Mobile Competence Centre; 650, Route Des Lucioles; F-06921 Sophia-Anti Polis Cedex; France, No. V9.2.1, XP050441988, Jun. 22, 2010, pp. 1-112.
"3rd Generation Partnership Project; Technical Specification Group Radio Access Network; Radio Resource Control (RRC); Protocol specification (Release 8)", 3GPP Ts 25.331, V8.15.0, Jun. 2011, pp. 1-1739.
"3rd Generation Partnership Project; Technical Specification Group Radio Access Network; Stage 2 functional specification of User Equipment (UE) positioning in UTRAN (Release 10)", 3GPP Ts 25.305, V10.0.0, Sep. 2010, 80 pages.
3rd Generation Partnership Project; Technical Specification Group Services and System Aspects; Telecommunication management; Charging management; Location Services (LCS) charging (Release 10), 3GPP Standard; 3GPP TS 32.271, 3rd Generation Partnership Project (3GPP), Mobile Competence Centre ; 650, Route Des Lucioles ; F-06921 Sophia-Antipolis Cedex ; FRANCE, No. V10. 0.0, Dec. 30, 2010 (2010-12-30) , pp. 1-26, XP050462465, [retrieved on Dec. 30, 2010].
Huawei et al., "Switch between Unicast and Broadcast", 3GPP Draft; R2-1803635 Switch between Unicast and Broadcast, 3rd Generation Partnership Project (3GPP), Mobile Competence Centre, 650, Route Des Lucioles, F-06921 Sophia-Antipolis Cedex, France, vol. Ran WG2, No. Athens, Greece; Feb. 26, 2018-Mar. 2, 2018, Feb. 16, 2018, XP051400658, Retrieved from the Internet: URL:http://www.3gpp.org/ftp/tsg%5Fran/WG2%5FRL2/TSGR2% 5F101/Docs/ [retrieved on Feb. 16, 2018], 2 pages.
Open Mobile Alliance, "LPP Extensions Specification", Candidate Version 1.0, Jun. 28, 2011, OMA-TS-LPPe-V1_0-20110628-C, pp. 1-280.
Open Mobile Alliance: "OMA-RD-LPPe-V1_0-20110628-C," LPP Extensions Requirements Candidate Version 1.0, Jun. 28, 2011, pp. 1-25.
Orange et al., "A-GNSS in UTRAN", 3GPP Draft; R2-070907 GNSS in UTRAN, 3RD Generation Partnership Project (3GPP), Mobile Competence Centre; 650, Route Des Lucioles; F-06921 Sophia-Antipolis Cedex; France, vol. Ran WG2, No. St. Louis, USA; Feb. 20, 2007, Feb. 20, 2007 (Feb. 20, 2007), XP050133921.
Qualcomm Europe; "Anticipated Impact on RAN2/3 Specifications of LTE Positioning Work Ite", 3GPP Draft; R3-090703, 3RD Generation Partnership Project (3GPP), Mobile Competence Centre; 650, Route Des Lucioles; F-06921 Sophia-Antipolis Cedex; France, No. Seoul, Korea; Mar. 18, 2009, Mar. 18, 2009 (MAr. 18, 2009), XP050341090.
Qualcomm Incorporated : "Ciphering of Broadcast Assistance Data", 3GPP TSG-SA WG3 Meeting #88, S3-172025, Aug. 7-11, 2017, 7 pages.
Qualcomm Incorporated: "Evaluation of Option 1 and Option 2 for ciphering key distribution to suitably subscribed UEs for encrypted broadcasted positioning data", 3GPP Draft; C4-182149, 3rd Generation Partnership Project (3GPP), Mobile Competence Centre, 650, Route Des Lucioles, F-06921 Sophia-Antipolis Cedex, France, vol. Ct WG4, No. Montreal, CANADA; Feb. 26, 2018-Mar. 2, 2018, Feb. 15, 2018, XP051396296, Retrieved from the Internet: URL:http:// www.3gpp.org/ftp/tsg%5Fct/WG4%5Fprotocollars%5Fex%2DCN4/ TSGCT4%5F83%5FMontreal/Docs/ [retrieved on Feb. 15. 2018], 2 pages.
Sorin et al., "Specifying and Verifying a Broadcast and a Multicast Snooping Cache Coherence Protocol," IEEE Transactions on Parallel and Distributed Systems, 2000, vol. 13 (6), pp. 1-22.
T1P1 5: "Modifications to support broadcast of GPS assistance data", 3GPP Draft; S2-000275, 3RD Generation Partnership Project (3GPP), Mobile Competence Centre ; 650, Route Des Lucioles ; F-06921 Sophia-Antipolis Cedex ; FRANCE, vol. Sa WG2, No. Puerto Vallarta, Mexico; Feb. 4, 2000, Feb. 4, 2000 (Feb. 4, 2000), XP050232729, [retrieved on Feb. 4, 2000].
CMCC et al., "3GPP TSG-RAN WG2 Meeting #102; R2-1808893; Way forward on Modification of Positioning SIBs", 3GPP Draft; R2-1808893 Modification Of Positioning SIBS, 3RD Generation Partnership Project (3GPP), Mobile Competence Centre ; 650, Route Des Lucioles ; F-06921 Sophia-Antipolis Cedex ; France, vol. RAN WG2, No. Busan, Korea; May 21, 2018-May 25, 2018, May 25, 2018 (May 25, 2018), XP051520255, 12 Pages, Retrieved from the Internet: URL:http://www.3gpp.org/ftp/tsg%5Fran/WG2% 5FRL2/TSGR2%5F102/Docs/R2%2D1808893%2Ezip [retrieved on May 25, 2018], pp. 1-2, chapter Modification of Positioning SIBs;

(56) References Cited

OTHER PUBLICATIONS page 3, last three lines p. 5, "pos SystemInfoValueTagSI-r15", p. 8, "pos SystemInfoValueTagSI-r15" p. 9, "Si-ValidityTime".

Ericsson: "3GPP TSG-RAN WG2 Meeting #102; R2-1808111; On Representation , Broadcast and Ciphering of Positioning SIBs", 3GPP Draft; R2-1808111 On Representation, Broadcast And Ciphering Of Positioning SIBS, 3RD Generation Partnership Project (3GPP), Mobile Competence Centre ; 650, Route Des Lucioles ; F-06921 Sophia-An , vol. Ran WG2, No. Busan, Korea ; May 21, 2018-May 25, 2018, May 11, 2018 (May 11, 2018), XP051519522, 8 Pages, Retrieved from the Internet: URL:http://www.3gpp.org/ftp/tsg%5Fran/WG2%5FRL2/TSGR2%5F102/Docs/R2%2D1808111 %2Ezip [retrieved on May 11, 2018].

Ericsson: "3GPP TSG-RAN WG2 Meeting #103; R2-1813169; Positioning SIB Value Tag and Expiration Time", 3GPP Draft; R2-1813169 LLP CR Positioning SIB Value Tag And Expiration Time_V6, 3RD Generation Partnership Project (3GPP), Mobile Competence Centre; 650, Route Des Lucioles ; F-06921 Sophia-Antipolis , vol. Ran WG2, No. Gothenburg, Sweden; Aug. 20, 2018-Aug. 24, 2018, Sep. 1, 2018 (Sep. 1, 2018), XP051522727, 3 Pages, Retrieved from the Internet: URL:http://www.3gpp.org/ftp/tsg%5Fran/WG2%5FRL2/TSGR2%5F103/Docs/R2%2D1813169 %2Ezip [retrieved on Sep. 1, 2018],.

International Search Report and Written Opinion—PCT/US2019/045601—ISA/EPO-dated Oct. 24, 2019.

Qualcomm Incorporated: "3GPP TSG-RAN WG2 Meeting #103; R2-1812356; Modification of Positioning SIBs", 3GPP Draft; R2-1812356_(POSSIB Modification Period), 3RD Generation Partnership Project (3GPP), Mobile Competence Centre ; 650, Route Des Lucioles ; F-06921 Sophia-Antipolis Cedex ; France , vol. RAN WG2, No. Gothenburg, Sweden; Aug. 20, 2018-Aug. 24, 2018, Aug. 9, 2018 (Aug. 9, 2018), XP051521962, 5 Pages, Retrieved from the Internet: URL:http://www.3gpp.org/ftp/tsg%5Fran/WG2%5FRL2/TSGR2%5F103/Docs/R2%2D1812356 %2Ezip [retrieved on Aug. 9, 2018].

Qualcomm Incorporated: "3GPP TSG-RAN WG2 Meeting #103; R2-1812378; Modification of Positioning SIBs", 3GPP Draft; R2-1812378_(CR 36355 REL-15 POSSIB Modification Period), 3RD Generation Partnership Project (3GPP), Mobile Competence Centre; 650, Route Des Lucioles ; F-06921 Sophia-Antipolis Cedex ; FR, vol. RAN WG2, No. Gothenburg, Sweden; Aug. 20, 2018-Aug. 24, 2018, Aug. 9, 2018 (Aug. 9, 2018), XP051521980, 5 Pages, Retrieved from the Internet: URL:http://www.3gpp.org/ftp/tsg%5Fran/WG2%5FRL2/TSGR2%5F103/Docs/R2%2D1812378 %2Ezip [retrieved on Aug. 9, 2018].

Qualcomm Incorporated: "3GPP TSG-RAN WG3 Meeting #100; R3-183104; LPPa Broadcast Assistance Data Information", 3GPP Draft; R3-183104_(LPPA Broadcast)_V1, 3RD Generation Partnership Project (3GPP), Mobile Competence Centre ; 650, Route Des Lucioles ; F-06921 Sophia-Antipolis Cedex ; France, vol. RAN WG3, No. Busan, Korea; May 25, 2018-May 25, 2018, May 11, 2018 (May 11, 2018), XP051527271,5 Pages, Retrieved from the Internet: URL:http://www.3gpp.org/ftp/tsg%5Fran/WG3%5Fiu/TSGR3%5F100/Docs/R3%2D183104%2Ezip [retrieved on May 11, 2018 ], p. 1, chapter 1. Introduction; pp. 1-2, chapter 2. Background; p. 2, chapter 3. Discussion; p. 3, chapter 9.2.x Broadcast Assistance, Data Information.

SYSTEMS AND METHODS FOR VALIDITY TIME AND CHANGE NOTIFICATION OF BROADCAST LOCATION ASSISTANCE DATA

CROSS-REFERENCE TO RELATED APPLICATIONS

This application claims the benefit of U.S. Provisional Application No. 62/716,294, entitled "SYSTEMS AND METHODS FOR VALIDITY TIME AND CHANGE NOTIFICATION OF BROADCAST LOCATION ASSISTANCE DATA," filed Aug. 8, 2018, which is assigned to the assignee hereof and which is expressly incorporated herein by reference in its entirety.

BACKGROUND

Field

Subject matter disclosed herein relates to estimation of a location of a mobile device and more particularly to informing a mobile device when broadcasted positioning assistance data has changed to help enable location of a mobile device.

Information

The location of a mobile device, such as a cellular telephone, may be useful or essential to a number of applications including emergency calls, navigation, direction finding, asset tracking and Internet service. The location of a mobile device may be estimated based on information gathered from various systems. In a cellular network implemented according to 4G (also referred to as Fourth Generation) Long Term Evolution (LTE) radio access, for example, a base station may transmit a positioning reference signal (PRS). A mobile device acquiring PRSs transmitted by different base stations may deliver signal-based measurements to a location server, which may be part of an Evolved Packet Core (EPC), for use in computing a location estimate of the mobile device using observed time difference of arrival (OTDOA) techniques. Alternatively, a mobile device may compute an estimate of its location using OTDOA techniques. Other position methods that may be used for a mobile device include use of a Global Navigation Satellite System (GNSS) such as GPS, GLONASS or Galileo and use of Assisted GNSS (A-GNSS) where a network provides assistance data to a mobile decide to assist the mobile device in acquiring and measuring GNSS signals and/or in computing a location estimate from the GNSS measurements.

Assistance data that is sent to a mobile device to assist in acquiring and measuring signals and/or in computing a location estimate from the measurements may be useful not only for GNSS location but also for OTDOA and other position methods such as GNSS based Real Time Kinematic (RTK). However, sending assistance data individually to each mobile device may result in significant delay and/or consume significant resources in a network and/or mobile device including battery use in a mobile device to interact with a network. Therefore, broadcast of assistance data to many or all mobile devices may be preferred in some implementations. In such implementations, a mobile device may benefit from knowing when assistance data being broadcast has changed in order to avoid repetitive reception and processing of assistance data that has not changed.

SUMMARY

Positioning assistance data (PAD) may be partitioned into positioning System Information Blocks (posSIBs) and periodically broadcast by a base station. A posSIB or scheduling information for a posSIB may include a validity time and a validity tag that indicates whether the PAD for a posSIB has changed. A user equipment (UE) may receive a posSIB comprising PAD and the validity time and the validity tag for the posSIB. The UE may then wait until the validity time expires and/or the validity tag in the scheduling information indicates a change of PAD before receiving a new instance of the posSIB. The validity time and validity tag may both be included in the posSIB, in which case the UE may receive the posSIB and then look at the validity tag to determine whether to decode and process the PAD.

In one implementation, a method for broadcasting positioning assistance data in a wireless network performed by a location server, includes determining the positioning assistance data to be broadcast by a base station; partitioning the positioning assistance data into a plurality of positioning System Information Blocks (posSIBs); determining a validity time for each posSIB; and sending the plurality of posSIBs to the base station, wherein the base station periodically broadcasts the plurality of posSIBs, the validity time for each posSIB and a value tag for each posSIB, wherein the value tag for a posSIB indicates whether the positioning assistance data in the posSIB has changed.

In one implementation, a location server configured for broadcasting positioning assistance data in a wireless network includes an external interface configured to communicate with a base station in the wireless network; at least one memory; and at least one processor coupled to the external interface and the at least one memory and configured to: determine the positioning assistance data to be broadcast by the base station; partition the positioning assistance data into a plurality of positioning System Information Blocks (posSIBs); determine a validity time for each posSIB; and send, via the external interface, the plurality of posSIBs to the base station, wherein the base station periodically broadcasts the plurality of posSIBs, the validity time for each posSIB and a value tag for each posSIB, wherein the value tag for a posSIB indicates whether the positioning assistance data in the posSIB has changed.

In one implementation, a location server configured for broadcasting positioning assistance data in a wireless network includes means for determining the positioning assistance data to be broadcast by a base station; means for partitioning the positioning assistance data into a plurality of positioning System Information Blocks (posSIBs); means for determining a validity time for each posSIB; and means for sending the plurality of posSIBs to the base station, wherein the base station periodically broadcasts the plurality of posSIBs, the validity time for each posSIB and a value tag for each posSIB, wherein the value tag for a posSIB indicates whether the positioning assistance data in the posSIB has changed.

In one implementation, a non-transitory storage medium including program code stored thereon, the program code is operable to configure at least one processor in a location server in a wireless network for broadcasting positioning assistance data, includes program code to determine the positioning assistance data to be broadcast by a base station; program code to partition the positioning assistance data into a plurality of positioning System Information Blocks (posSIBs); program code to determine a validity time for each posSIB; and program code to send the plurality of posSIBs to the base station, wherein the base station periodically broadcasts the plurality of posSIBs, the validity time for each posSIB and a value tag for each posSIB, wherein the value tag for a posSIB indicates whether the positioning assistance data in the posSIB has changed.

In one implementation, a method for broadcasting positioning assistance data in a wireless network performed by a base station, includes receiving a plurality of positioning System Information Blocks (posSIBs) from a location server, the plurality of posSIBs containing partitioned positioning assistance data to be broadcast by the base station; and periodically broadcasting the plurality of posSIBs, a validity time for each posSIB and a value tag for each posSIB, wherein the value tag for a posSIB indicates whether the positioning assistance data in the posSIB has changed.

In one implementation, a base station configured for broadcasting positioning assistance data in a wireless network includes an external interface configured to communicate with a location server in the wireless network; a wireless interface configured to wirelessly communicating with entities in the wireless network; at least one memory; and at least one processor coupled to the external interface and the wireless interface and the at least one memory and configured to: receive, via the external interface, a plurality of positioning System Information Blocks (posSIBs) from a location server, the plurality of posSIBs containing partitioned positioning assistance data to be broadcast by the base station; and periodically broadcasting, via the wireless interface, the plurality of posSIBs, a validity time for each posSIB and a value tag for each posSIB, wherein the value tag for a posSIB indicates whether the positioning assistance data in the posSIB has changed.

In one implementation, a base station configured for broadcasting positioning assistance data in a wireless network includes means for receiving a plurality of positioning System Information Blocks (posSIBs) from a location server, the plurality of posSIBs containing partitioned positioning assistance data to be broadcast by the base station; and means for periodically broadcasting the plurality of posSIBs, a validity time for each posSIB and a value tag for each posSIB, wherein the value tag for a posSIB indicates whether the positioning assistance data in the posSIB has changed.

In one implementation, a non-transitory storage medium including program code stored thereon, the program code is operable to configure at least one processor in a base station in a wireless network for broadcasting positioning assistance data, includes program code to receive a plurality of positioning System Information Blocks (posSIBs) from a location server, the plurality of posSIBs containing partitioned positioning assistance data to be broadcast by the base station; and program code to periodically broadcast the plurality of posSIBs, a validity time for each posSIB and a value tag for each posSIB, wherein the value tag for a posSIB indicates whether the positioning assistance data in the posSIB has changed.

In one implementation, a method for broadcasting positioning assistance data in a wireless network performed by a user equipment, includes receiving a plurality of positioning System Information Blocks (posSIBs), a validity time for each posSIB and a value tag for each posSIB that are periodically broadcast by a base station, the plurality of posSIBs containing partitioned positioning assistance data from a location server, the value tag for a posSIB indicating whether the positioning assistance data in the posSIB has changed; and obtaining downlink measurements using the positioning assistance data, wherein the downlink measurements comprise downlink measurements for cells in the wireless network, downlink measurements for wireless local area network (WLAN) access points, downlink measurements for a Global Navigation Satellite System (GNSS), or a combination thereof.

In one implementation, a user equipment (UE) configured to support broadcast positioning assistance data in a wireless network includes at least one wireless transceiver configured to wirelessly communicate with at least one wireless network; at least one memory; and at least one processor coupled to the at least one wireless transceiver and the at least one memory and configured to: receive, via the at least one wireless transceiver, a plurality of positioning System Information Blocks (posSIBs), a validity time for each posSIB and a value tag for each posSIB that are periodically broadcast by a base station in the wireless network, the plurality of posSIBs containing partitioned positioning assistance data from a location server, the value tag for a posSIB indicating whether the positioning assistance data in the posSIB has changed; and obtain downlink measurements, via the at least one wireless transceiver, using the positioning assistance data, wherein the downlink measurements comprise downlink measurements for cells in the wireless network, downlink measurements for wireless local area network (WLAN) access points, downlink measurements for a Global Navigation Satellite System (GNSS), or a combination thereof.

In one implementation, a user equipment (UE) configured to support broadcast positioning assistance data in a wireless network includes means for receiving a plurality of positioning System Information Blocks (posSIBs), a validity time for each posSIB and a value tag for each posSIB that are periodically broadcast by a base station, the plurality of posSIBs containing partitioned positioning assistance data from a location server, the value tag for a posSIB indicating whether the positioning assistance data in the posSIB has changed; and means for obtaining downlink measurements using the positioning assistance data, wherein the downlink measurements comprise downlink measurements for cells in the wireless network, downlink measurements for wireless local area network (WLAN) access points, downlink measurements for a Global Navigation Satellite System (GNSS), or a combination thereof.

In one implementation, a non-transitory storage medium including program code stored thereon, the program code is operable to configure at least one processor in user equipment in a wireless network for broadcasting positioning assistance data, includes program code to receive a plurality of positioning System Information Blocks (posSIBs), a validity time for each posSIB and a value tag for each posSIB that are periodically broadcast by a base station, the plurality of posSIBs containing partitioned positioning assistance data from a location server, the value tag for a posSIB indicating whether the positioning assistance data in the posSIB has changed; and program code to obtain downlink measurements using the positioning assistance data, wherein the downlink measurements comprise downlink measurements for cells in the wireless network, downlink measurements for wireless local area network (WLAN) access points, downlink measurements for a Global Navigation Satellite System (GNSS), or a combination thereof.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1A:
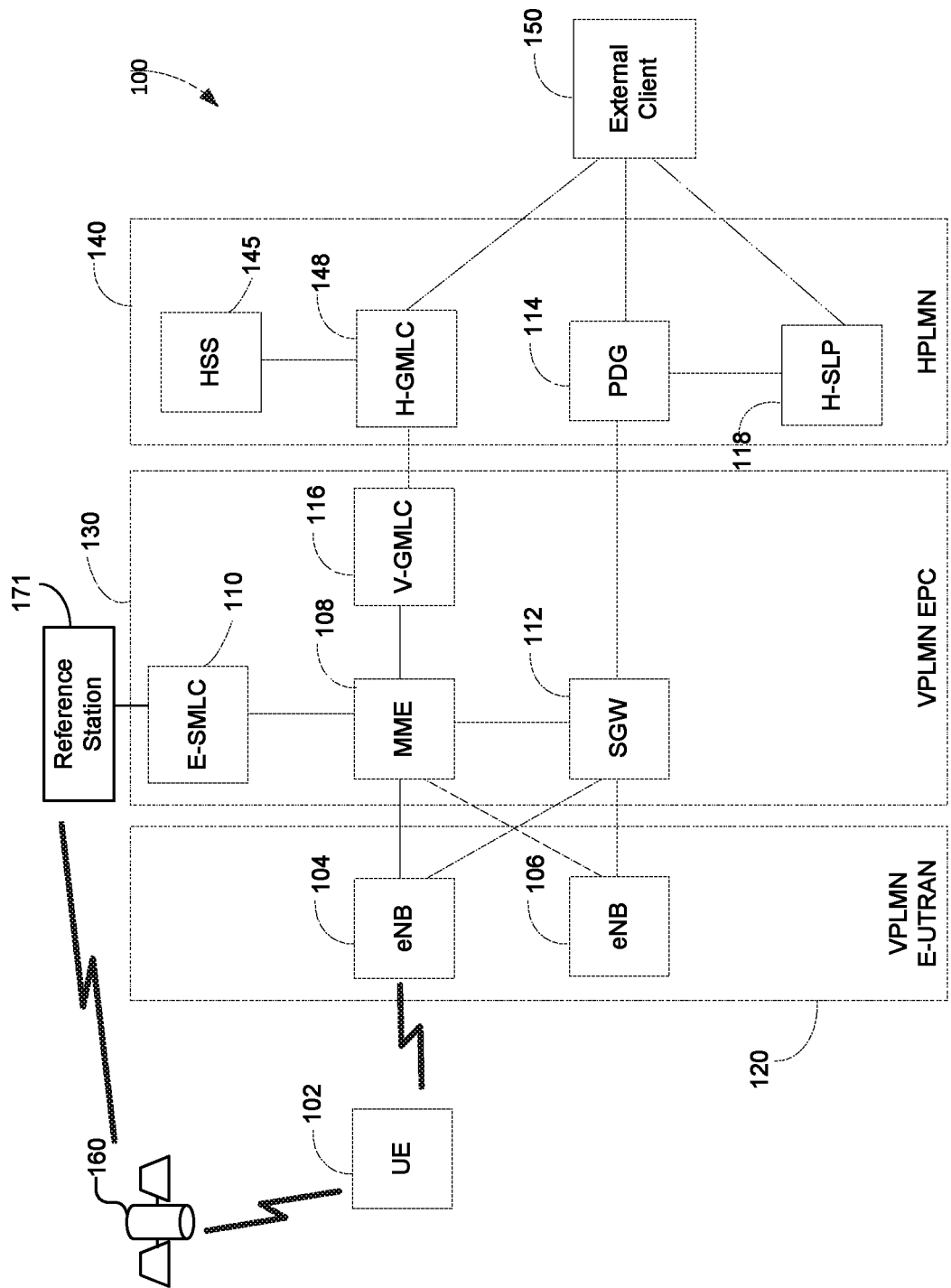
FIG. 1A is a system diagram illustrating certain features of a communication system comprising a mobile device and a cellular network, in accordance with an example implementation.

Reference is made in the following detailed description to accompanying drawings, which form a part hereof, wherein like numeric and alphanumeric labels may designate like parts throughout that are identical, similar and/or analogous. In addition, multiple instances of an element may be indicated by following a first number for the element with a hyphen and a second number. For example, multiple instances of an element 111 may be indicated as 111-1, 111-2, 111-3 etc. When referring to such an element using only the first number, any instance of the element is to be understood (e.g. element 111 in the previous example would refer any of elements 111-1, 111-2 and 111-3).

It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like mean that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. However, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

To support positioning of a mobile device, two broad classes of location solution have been defined: control plane and user plane. With control plane (CP) location, signaling related to positioning and support of positioning may be carried over existing network (and mobile device) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for mobile devices that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a mobile device accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The LS may be part of or accessible from a serving network or a home network for a UE or may simply be accessible over the Internet or over a local Intranet. If positioning of a UE is needed, an LS may instigate a session (e.g. a location session or a SUPL session) with the UE and coordinate location measurements by the UE and determination of an estimated location of the UE. During a location session, an LS may request positioning capabilities of the UE (or the UE may provide them without a request), may provide assistance data to the UE (e.g. if requested by the UE or in the absence of a request) and may request a location estimate or location measurements from a UE, e.g. for the GNSS, OTDOA and/or Enhanced Cell ID (ECID) position methods. Assistance data may be used by a UE to acquire and measure GNSS and/or PRS signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using OTDOA).

In an alternative UE assisted mode of operation, a UE may return location measurements to an LS which may determine an estimated location of the UE based on these measurements and possibly based also on other known or configured data (e.g. satellite ephemeris data for GNSS location or base station characteristics including base station locations and possibly PRS timing in the case of terrestrial positioning using OTDOA).

In another standalone mode of operation, a UE may make location related measurements without any positioning assistance data from an LS and may further compute a location or a change in location without any positioning assistance data from an LS. Position methods that may be used in a standalone mode include GPS and GNSS (e.g. if a UE obtains satellite orbital data from data broadcast by GPS and GNSS satellites themselves) as well as sensors.

In the case of 3GPP CP location, an LS may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, an LS may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, an LS and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message An LS and a base station (e.g. an eNodeB for LTE access) may exchange messages to enable the LS to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol defined in 3GPP TS 36.455 may be used to transfer such messages between a base station that is an eNodeB and an LS that is an E-SMLC. It is noted that the terms "parameter" and "information element" (IE) are synonymous and are used interchangeably herein. It is also noted that the term "posSIB", as used herein, refers to a System Information Block (SIB) which includes assistance data (also referred to as "positioning assistance data") to support positioning of one or more UEs. However, in some instances, the term "SIB" is used herein to refer to a SIB containing assistance data to support positioning of one or more UEs. It is further noted that the terms "SI messages" and "positioning SI messages" are used interchangeably herein to refer to system information messages containing assistance data, e.g. assistance data in the form of one or more posSIBs.

FIG. 1A is a diagram illustrating a communication system 100 for location support of a user equipment (UE) 102 that supports and is currently using Long Term Evolution (LTE) radio access (also referred to as wideband LTE) or Narrow Band Internet of Things (NB-IoT) radio access (also referred to as narrowband LTE), where NB-IoT and LTE may be as defined by 3GPP—e.g. in 3GPP TS 36.300. The communication system 100 may be referred to as an Evolved Packet System (EPS). As illustrated, the communication system 100 may include the UE 102, an Evolved Universal Mobile Telecommunications Service (UMTS) Terrestrial Radio Access Network (E-UTRAN) 120, and an Evolved Packet Core (EPC) 130. The E-UTRAN 120 and the EPC 130 may be part of a Visited Public Land Mobile Network (VPLMN) that is a serving network for the UE 102 and communicates with a Home Public Land Mobile Network (HPLMN) 140 for the UE 102. The VPLMN E-UTRAN 120, VPLMN EPC 130 and/or HPLMN 140 may interconnect with other networks. For example, the Internet may be used to carry messages to and from different networks such as the HPLMN 140 and the VPLMN EPC 130. For simplicity these networks and associated entities and interfaces are not shown. As shown, the communication system 100 provides packet-switched services to the UE 102. However, as those skilled in the art will readily appreciate, the various concepts presented throughout this disclosure may be extended to networks providing circuit-switched services.

The UE 102 may comprise any electronic device configured for NB-IoT and/or LTE radio access, for example. The UE 102 may be referred to as a device, a wireless device, a mobile terminal, a terminal, a mobile station (MS), a mobile device, a SET, or by some other name and may correspond to (or be part of) a smart watch, digital glasses, fitness monitor, smart car, smart appliance, cellphone, smartphone, laptop, tablet, PDA, tracking device, control device, or some other portable or moveable device. A UE 102 may comprise a single entity or may comprise multiple entities such as in a personal area network where a user may employ audio, video and/or data I/O devices and/or body sensors and a separate wireline or wireless modem. Typically, though not necessarily, a UE 102 may support wireless communication with one or more types of Wireless Wide Area Network (WWAN) such as a WWAN supporting Global System for Mobile Communications (GSM), Code Division Multiple Access (CDMA), Wideband CDMA (WCDMA), Long Term Evolution (LTE), Narrow Band Internet of Things (NB-IoT), Enhanced Machine Type Communications (eMTC) also referred to as LTE category M1 (LTE-M), High Rate Packet Data (HRPD), 5G NR, WiMax, etc. VPLMN EPC 130 combined with VPLMN E-UTRAN 120, and HPLMN 140, may be examples of a WWAN. A UE 102 may also support wireless communication with one or more types of Wireless Local Area Network (WLAN) such as a WLAN supporting IEEE 802.11 WiFi or Bluetooth® (BT). UE 102 may also support communication with one or more types of wireline network such as by using a Digital Subscriber Line (DSL) or packet cable for example. Although FIG. 1A shows only one UE 102, there may be many other UEs that can each correspond to UE 102.

The UE 102 may enter a connected state with a wireless communication network that may include the E-UTRAN 120. In one example, UE 102 may communicate with a cellular communication network by transmitting wireless signals to, and/or receiving wireless signals from, a cellular transceiver, such as an evolved Node B (eNodeB or eNB) 104 in the E-UTRAN 120. The E-UTRAN 120 may include one or more additional eNBs 106. The eNB 104 provides user plane and control plane protocol terminations toward the UE 102. The eNB 104 may comprise a serving eNB for UE 102 and may also be referred to as a base station, a base transceiver station, a radio base station, a radio transceiver, a radio network controller, a transceiver function, a base station subsystem (BSS), an extended service set (ESS), or by some other suitable terminology. The UE 102 also may transmit wireless signals to, or receive wireless signals from, a local transceiver (not shown in FIG. 1A), such as an access point (AP), femtocell, Home Base Station, small cell base station, Home Node B (HNB) or Home eNodeB (HeNB), which may provide access to a wireless local area network (WLAN, e.g., IEEE 802.11 network), a wireless personal area network (WPAN, e.g., Bluetooth network) or a cellular network (e.g. an LTE network or other wireless wide area network such as those discussed in the next paragraph). Of course it should be understood that these are merely examples of networks that may communicate with a mobile device over a wireless link, and claimed subject matter is not limited in this respect.

Examples of network technologies that may support wireless communication include NB-IoT and LTE, but may further include GSM, CDMA, WCDMA, HRPD, eMTC and 5G NR. NB-IoT, GSM, WCDMA, LTE, eMTC and NR are technologies defined by 3GPP. CDMA and HRPD are technologies defined by the 3rd Generation Partnership Project 2 (3GPP2). Cellular transceivers, such as eNBs 104 and 106, may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

The eNBs 104 and 106 may be connected by an interface (e.g. the 3GPP S1 interface) to the VPLMN EPC 130. The EPC 130 includes a Mobility Management Entity (MME) 108, and a Serving Gateway (SGW) 112 through which data (e.g. Internet Protocol (IP) packets) to and from the UE 102 may be transferred. The MME 108 may be the serving MME for UE 102 and is then the control node that processes the signaling between the UE 102 and the EPC 130 and supports attachment and network connection of UE 102, mobility of UE 102 (e.g. via handover between network cells) as well as establishing and releasing data bearers on behalf of the UE 102. Generally, the MME 108 provides bearer and connection management for the UE 102 and may be connected to the SGW 112, the eNBs 104 and 106, an Enhanced Serving Mobile Location Center (E-SMLC) 110 and a Visited Gateway Mobile Location Center (V-GMLC) 116 in the VPLMN EPC 130.

The E-SMLC 110 may support location of the UE 102 using the 3GPP control plane (CP) location solution defined in 3GPP technical specifications (TSs) 23.271 and 36.305. The V-GMLC 116, which may also be referred to simply as a Gateway Mobile Location Center (GMLC) 116, may provide access on behalf of an external client (e.g. external client 150) or another network (e.g. HPLMN 140) to the location of UE 102. The external client 150 may comprise a web server or remote application that may have some association with UE 102 (e.g. may be accessed by a user of UE 102 via VPLMN E-UTRAN 120, VPLMN EPC 130 and HPLMN 140) or may be a server, application or computer system providing a location service to some other user or users which may include obtaining and providing the location of UE 102 (e.g. to enable a service such as friend or relative finder, asset tracking or child or pet location).

E-SMLC 110 may be connected to or have access to one or more reference stations 171 which may be part of VPLMN EPC 130 or separate from VPLMN EPC 130 (e.g. part of a GNSS reference network and owned and operated by a service provider different to the operator of VPLMN EPC 130). A reference station 171 may comprise or include a GNSS receiver configured to acquire, measure and decode signals transmitted by one or more GNSSs. A reference station 171 may be configured to obtain or determine orbital and timing data for Satellite Vehicles (SVs) for one or more GNSSs and infer information for environmental factors that can affect GNSS location such as ionospheric and tropospheric delay. A reference station 171 may transfer determined information to E-SMLC 110—e.g. periodically or whenever the determined information changes.

As illustrated, the HPLMN 140 includes a Home Gateway Mobile Location Center (H-GMLC) 148 that may be connected to the V-GMLC 116 (e.g. via the Internet), as well as a Packet Data Network Gateway (PDG) 114 that may be connected to the SGW 112 (e.g. via the Internet). The PDG 114 may provide UE 102 with Internet Protocol (IP) address allocation and IP and other data access to external networks (e.g. the Internet) and to external clients (e.g. external client 150) and external servers, as well as other data transfer related functions. In some cases, PDG 114 may be located in VPLMN EPC 130 and not in HPLMN 140 when the UE 102 receives local IP breakout. The PDG 114 may be connected to a location server, such as H-SLP 118. The H-SLP 118 may support the SUPL UP location solution defined by OMA and may support location services for UE 102 based on subscription information for UE 102 stored in H-SLP 118. In some embodiments of communication system 100, a Discovered SLP (D-SLP) or Emergency SLP (E-SLP) (not shown in FIG. 1A), in or accessible from VPLMN EPC 130, may be used to locate UE 102 using the SUPL UP solution.

The H-GMLC 148 may be connected to a Home Subscriber Server (HSS) 145 for UE 102, which is a central database that contains user-related and subscription-related information for UE 102. The H-GMLC 148 may provide location access to the UE 102 on behalf of external clients such as external client 150. One or more of the H-GMLC 148, PDG 114, and H-SLP 118 may be connected to the external client 150, e.g., through another network, such as the Internet. In some cases, a Requesting GMLC (R-GMLC) located in another PLMN (not shown in FIG. 1A) may be connected to H-GMLC 148 (e.g. via the Internet) in order to provide location access to UE 102 on behalf of external clients connected to the R-GMLC. The R-GMLC, H-GMLC 148 and V-GMLC 116 may support location access to the UE 102 using the 3GPP CP solution defined in 3GPP TS 23.271.

It should be understood that while a VPLMN network (comprising VPLMN E-UTRAN 120 and VPLMN EPC 130) and a separate HPLMN 140 are illustrated in FIG. 1A; both PLMNs (networks) may be the same PLMN. In that case, (i) the H-SLP 118, PDG 114, and HSS 145, may be in the same network (EPC) as the MME 108, and (ii) the V-GMLC 116 and the H-GMLC 148 may comprise the same GMLC.

In particular implementations, the UE 102 may have circuitry and processing resources capable of obtaining location related measurements (also referred to as location measurements), such as measurements for signals received from GPS or other Satellite Positioning System (SPS) SVs 160, measurements for cellular transceivers such as eNBs 104 and 106, and/or measurements for local transceivers. UE 102 may further have circuitry and processing resources capable of computing a position fix or estimated location of UE 102 based on these location related measurements. In some implementations, location related measurements obtained by UE 102 may be transferred to a location server, such as the E-SMLC 110 or H-SLP 118, after which the location server may estimate or determine a location for UE 102 based on the measurements.

Location related measurements obtained by UE 102 may include measurements of signals received from SVs 160 that are part of an SPS or Global Navigation Satellite System (GNSS) such as GPS, GLONASS, Galileo or Beidou and/or may include measurements of signals received from terrestrial transmitters fixed at known locations (e.g., such as eNB 104, eNB 106 or other local transceivers). UE 102 or a separate location server (e.g. E-SMLC 110 or H-SLP 118) may then obtain a location estimate for the UE 102 based on these location related measurements using any one of several position methods such as, for example, GNSS, Assisted GNSS (A-GNSS), Advanced Forward Link Trilateration (AFLT), Observed Time Difference Of Arrival (OTDOA), Enhanced Cell ID (ECID), WiFi, or combinations thereof. In some of these techniques (e.g. A-GNSS, AFLT and OTDOA), pseudoranges or timing differences may be measured by UE 102 relative to three or more terrestrial transmitters fixed at known locations or relative to four or more SVs with accurately known orbital data, or combinations thereof, based at least in part, on pilot signals, positioning reference signals (PRS) or other positioning related signals transmitted by the transmitters or SVs and received at the UE 102. Here, location servers, such as E-SMLC 110 or H-SLP 118, may be capable of providing positioning assistance data to UE 102 including, for example, information regarding signals to be measured by UE 102 (e.g., expected signal timing, signal coding, signal frequencies, signal Doppler), locations and/or identities of terrestrial transmitters, and/or signal, timing and orbital information for GNSS SVs to facilitate positioning techniques such as A-GNSS, AFLT, OTDOA and ECID. The facilitation may include improving signal acquisition and measurement accuracy by UE 102 and/or, in some cases, enabling UE 102 to compute its estimated location based on the location measurements. For example, a location server may comprise an almanac (e.g., a Base Station Almanac (BSA)) which indicates the locations and identities of cellular transceivers and transmitters (e.g. eNBs 104 and 106) and/or local transceivers and transmitters in a particular region or regions such as a particular venue, and may further contain information descriptive of signals transmitted by these transceivers and transmitters such as signal power, signal timing, signal bandwidth, signal coding and/or signal frequency. In the case of ECID, a UE 102 may obtain measurements of signal strength (e.g. received signal strength indication (RSSI) or reference signal received power (RSRP)) for signals received from cellular transceivers (e.g., eNBs 104, 106) and/or local transceivers and/or may obtain a signal to noise ratio (S/N), a reference signal received quality (RSRQ), or a round trip signal propagation time (RTT) between UE 102 and a cellular transceiver (e.g., eNB 104 or 106) or a local transceiver. A UE 102 may transfer these measurements to a location server, such as E-SMLC 110 or H-SLP 118, to determine a location for UE 102, or in some implementations, UE 102 may use these measurements together with positioning assistance data (e.g. terrestrial almanac data or GNSS SV data such as GNSS Almanac and/or GNSS Ephemeris information) received from the location server to determine a location for UE 102.

In the case of OTDOA, UE 102 may measure a Reference Signal Time Difference (RSTD) between signals, such as a Position Reference Signal (PRS) or Cell Specific Reference Signal (CRS), received from nearby transceivers or base stations (e.g. eNBs 104 and 106). An RSTD measurement may provide the time of arrival difference between signals (e.g. CRS or PRS) received at UE 102 from two different transceivers (e.g. an RSTD between signals received from eNB 104 and from eNB 106). The UE 102 may return the measured RSTDs to a location server (e.g. E-SMLC 110 or H-SLP 118) which may compute an estimated location for UE 102 based on known locations and known signal timing for the measured transceivers. In some implementations of OTDOA, the signals used for RSTD measurements (e.g. PRS or CRS signals) may be accurately synchronized by the transceivers or transmitters to a common universal time such as GPS time or coordinated universal time (UTC), e.g., using a GPS receiver at each transceiver or transmitter to accurately obtain the common universal time.

An estimate of a location of a UE 102 may be referred to as a location, location estimate, location fix, fix, position, position estimate or position fix, and may be geodetic, thereby providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of a UE 102 may also include an uncertainty and may then be expressed as an area or volume (defined either geodetically or in civic form) within which the UE 102 is expected to be located with some given or default probability or confidence level (e.g., 67% or 95%). A location of a UE 102 may further be an absolute location (e.g. defined in terms of a latitude, longitude and possibly altitude and/or uncertainty) or may be a relative location comprising, for example, a distance and direction or relative X, Y (and Z) coordinates defined relative to some origin at a known absolute location. In the description contained herein, the use of the term location may comprise any of these variants unless indicated otherwise. Measurements (e.g. obtained by UE 102 or by another entity such as eNB 104) that are used to determine (e.g. calculate) a location estimate for UE 102 may be referred to as measurements, location measurements, location related measurements, positioning measurements or position measurements and the act of determining a location for the UE 102 may be referred to as positioning of the UE 102 or locating the UE 102.

The communication system 100 may be configured to deliver positioning assistance data in downlink broadcast messages to UE devices such as UE 102.

Support for broadcasting location assistance data is supported by 3GPP for LTE access and may be similarly supported later by 3GPP for 5G NR access. Positioning assistance data may be included in positioning System Information Blocks (SIBs), sometimes referred to as pos-SIBs. The posSIBs may be carried in positioning System Information (SI) messages which are transmitted by an eNB (e.g. eNB 104) using LTE wireless communication protocols. The mapping of posSIBs to SI messages may be flexibly configured according to a pos-schedulingInfoList parameter included in a SIB 1 message (also referred to as SIB1), which is also regularly broadcast from an eNB (e.g. eNB 104) as defined for the Radio Resource Control (RRC) LTE protocol defined in 3GPP TS 36.331. For each assistance data element defined in LPP (TS 36.355), a separate posSIB-type may be defined. By way of example, posSIBs designated as pos-sib-type1-1 to pos-sib type1-7 may include common GNSS assistance data; pos-sib-type2-1 to pos-sib type2-19 may include GNSS specific assistance data, where the specific GNSS is indicated in the pos-schedulingInfoList in SIB1; and pos-sib-type3-1 may include OTDOA assistance data. Furthermore, each posSIB may be ciphered by an E-SMLC (e.g. E-SMLC 110), e.g., using the 128-bit Advanced Encryption Standard (AES) algorithm (with counter mode), either with the same ciphering key or with a different ciphering key for each type of posSIB. An indication of whether a particular posSIB is or is not ciphered may be provided in the pos-schedulingInfoList parameter. Additionally, posSIBs that exceed a maximum size limit may be segmented by an E-SMLC (e.g. E-SMLC 110). Whether a posSIB is segmented or not, and if segmented the segmentation option used, may be indicated in each posSIB. The posSIBs may be formatted, encoded and grouped into SI messages at the E-SMLC (e.g. E-SMLC 110), and provided transparently to eNBs (e.g. eNBs 104 and 106) in LPPa messages, for broadcasting by the eNBs.

Figure 1B:
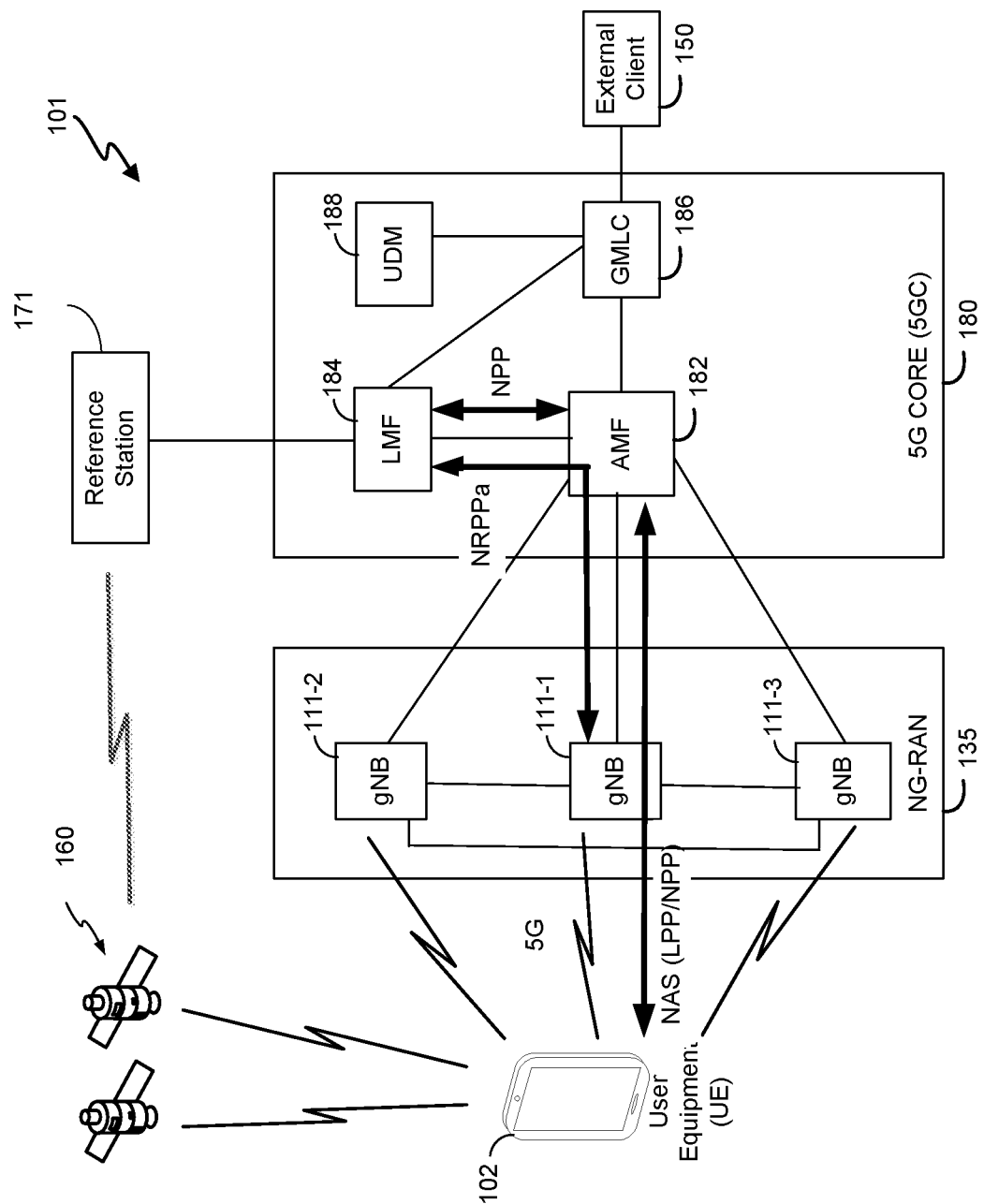
FIG. 1B is a system diagram illustrating certain features of a communication system comprising a mobile device and a cellular network, in accordance with an alternative example implementation.

FIG. 1B shows a diagram of a communication system 101, according to an alternative embodiment to the embodiment of communication system 100 described above with reference to FIG. 1A. In communication system 101, UE 102, reference station(s) 171, SVs 160 and external client 150 may operate in connection with Fifth Generation (5G) features of communication system 101. The communication system 101 may be configured to deliver positioning assistance data in downlink broadcast messages to UE devices such as UE 102. For example, positioning assistance data may be broadcasted in system information blocks (SIBs) in downlink messages from gNB devices 111. Furthermore, positioning assistance data that is broadcasted in the SIBs may be key encrypted. UE 102 may receive one or more cipher keys in messages other than the broadcast messages for use in decrypting the broadcasted positioning assistance data.

The communication system 101 comprises a UE 102, and components of a Fifth Generation (5G) network comprising a Next Generation Radio Access Network (NG-RAN) 135 and a 5G Core Network (5GC) 180. A 5G network may also be referred to as a New Radio (NR) network; NG-RAN 135 may be referred to as an NR Radio Access Network (RAN) or as a 5G RAN; and 5GC 180 may be referred to as an NG Core network (NGC). The communication system 101 may further utilize information from SVs 160 for a Global Navigation Satellite System (GNSS) like GPS, GLONASS, Galileo or Beidou. Additional components of the communication system 101 are described below. The communication system 101 may include additional or alternative components.

It should be noted that FIG. 1B provides only a generalized illustration of various components, any or all of which may be utilized as appropriate, and each of which may be duplicated or omitted as necessary. Specifically, although only one UE 102 is illustrated, it will be understood that many UEs (e.g., hundreds, thousands, millions, etc.) may utilize the communication system 101. Similarly, the communication system 101 may include a larger or smaller number of SVs 160, gNBs 111, external clients 150, and/or other components. The illustrated connections that connect the various components in the communication system 101 include data and signaling connections which may include additional (intermediary) components, direct or indirect physical and/or wireless connections, and/or additional networks. Furthermore, components may be rearranged, combined, separated, substituted, and/or omitted, depending on desired functionality.

Base stations (BSs) in the NG-RAN 135 shown in FIG. 1B comprise NR Node Bs, also referred to as gNBs, 111-1, 111-2 and 111-3 (collectively and generically referred to herein as gNBs 111). Pairs of gNBs 111 in NG-RAN 135 may be connected to one another—e.g. directly as shown in FIG. 1B or indirectly via other gNBs 111. Access to the 5G network is provided to UE 102 via wireless communication between the UE 102 and one or more of the gNBs 111, which may provide wireless communications access to the 5GC 180 on behalf of the UE 102 using 5G. In FIG. 1B, the serving gNB for UE 102 is assumed to be gNB 111-1, although other gNBs (e.g. gNB 111-2 and/or gNB 111-3) may act as a serving gNB if UE 102 moves to another location or may act as a secondary gNB to provide additional throughout and bandwidth to UE 102. Some gNBs 111 in FIG. 1B (e.g. gNB 111-2 or gNB 111-3) may be configured to function as positioning-only beacons which may transmit signals (e.g. PRS signals) and/or broadcast assistance data to assist positioning of UE 102 but may not receive signals from UE 102 or from other UEs.

In some implementations, NG-RAN 135 may include one or more next generation eNBs (ng-eNBs, not shown in FIG. 1B) which may provide LTE radio access to UE 102 and connectivity of UE 102 to elements in 5GC 180 (e.g. AMF 182) and/or to external client 150. An ng-eNB in NG-RAN 135 may be connected to one or more other ng-eNBs in NG-RAN 135, to one or more gNBs 111 and/or to AMF 182.

As noted, while FIG. 1B depicts nodes configured to communicate according to 5G communication protocols, nodes configured to communicate according to other communication protocols, such as, for example, LTE protocol, may be used. Such nodes, configured to communicate using different protocols, may be controlled, at least in part, by the 5GC 180. Thus, the NG-RAN 135 may include any combination of gNBs, eNBs, ng-eNBs, or other types of base stations or access points.

The gNBs 111 may communicate with an Access Management Function (AMF) 182, which, for positioning functionality, communicates with a Location Management Function (LMF) 184. The AMF 182 may support mobility of the UE 102, including cell change and handover and may participate in supporting a signaling connection to the UE 102 and possibly data and voice bearers for the UE 102. The LMF 184 may support positioning of the UE 102 when UE accesses the NG-RAN 135 and may support position procedures/methods such as Assisted GNSS (A-GNSS), Observed Time Difference of Arrival (OTDOA), Real Time Kinematic (RTK), Precise Point Positioning (PPP), Differential GNSS (DGNSS), Enhanced Cell ID (ECID), angle of departure (AOD), and other position methods. The LMF 184 may also process location services requests for the UE 102, e.g., received from the AMF 182 or from the GMLC 186. In some embodiments, a node/system that implements the LMF 184 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 102's location) may be performed at the UE 102 (e.g., using signal measurements for signals transmitted by wireless nodes, and assistance data provided to the UE 102).

The Gateway Mobile Location Center (GMLC) 186 may support a location request for the UE 102 received from an external client 150 and may forward such a location request to the AMF 182 for forwarding by the AMF 182 to the LMF 184 or may forward the location request directly to the LMF 184. A location response from the LMF 184 (e.g. containing a location estimate for the UE 102) may be similarly returned to the GMLC 186 either directly or via the AMF 182, and the GMLC 186 may then return the location response (e.g., containing the location estimate) to the external client 150. The GMLC 186 is shown connected to both the AMF 182 and LMF 184 but only one of these connections may be supported by 5GC 180 in some implementations. Unified Data Management (UDM) 188 may store subscription data for UE 102 in the case that 5GC 180 is part of an HPLMN for UE 102 and may perform similar functions to HSS 145 in communication system 100.

As further illustrated in FIG. 1B, the LMF 184 and the gNBs 111 may communicate using a New Radio Position Protocol A (NRPPa) defined in 3GPP TS 38.455. NRPPa may be similar to, or an extension of, the LTE Positioning Protocol A (LPPa) defined in 3GPP Technical Specification (TS) 36.455, with NRPPa messages being transferred between the gNBs 111 and the LMF 184 via the AMF 182. As further illustrated in FIG. 1B, LMF 184 and UE 102 may communicate using LPP and/or a New Radio Positioning Protocol (which may be referred to as NPP or NRPP) which may be the same as, similar to, or an extension of LPP, where the LPP and/or NPP messages are transferred between the UE 102 and the LMF 184 via the AMF 182 and a serving gNB 111-1 for UE 102. For example, LPP and/or NPP messages may be transferred between the LMF 184 and the AMF 182 using service operations based on the HyperText Transfer Protocol (HTTP) and may be transferred between the AMF 182 and the UE 102 using a 5G Non-Access Stratum (NAS) protocol. The LPP and/or NPP protocol may be used to support positioning of UE 102 using UE assisted and/or UE based position methods such as A-GNSS, RTK, OTDOA and/or ECID. The NRPPa protocol may be used to support positioning of UE 102 using network based position methods such as ECID or Angle of Arrival (AoA) (when used with measurements obtained by a gNB 111) and/or may be used by LMF 184 to obtain location related information from gNBs 111 such as parameters defining PRS transmission from gNBs 111.

When NG-RAN 135 includes one or more ng-eNBs, an ng-eNB in NG-RAN 135 may communicate with LMF 184 using NRPPa and/or may enable transfer of LPP and/or NPP messages between UE 102 and LMF 184 via the ng-eNB and AMF 182. An ng-eNB in NG-RAN 135 may also broadcast positioning assistance data to UEs such as UE 102.

Information provided by the gNBs 111 (or by ng-eNBs in NG-RAN 135) to the LMF 184 using NRPPa may include timing and configuration information for PRS transmission and location coordinates of the gNBs 111 (or the ng-eNBs). The LMF 184 can then provide some or all of this information to the UE 102 as assistance data in an LPP and/or NPP message via the NG-RAN 135 and the 5GC 180.

An LPP and/or NPP message sent from the LMF 184 to the UE 102 may instruct the UE 102 to do any of a variety of things, depending on desired functionality. For example, an LPP and/or NPP message could contain an instruction for the UE 102 to obtain measurements for GNSS (or A-GNSS), wireless LAN, and/or OTDOA (or some other position method). In the case of OTDOA, the LPP and/or NPP message may instruct the UE 102 to obtain one or more measurements (e.g. Reference Signal Time Difference (RSTD) measurements) of PRS signals transmitted within particular cells supported by particular gNBs 111 (or supported by some other type of base station). The UE 102 may send the measurements back to the LMF 184 in an LPP and/or NPP message (e.g. inside a 5G NAS message) via the serving gNB 111-1 and the AMF 182.

In embodiments, LMF 184 may encode location assistance data and optionally cipher the encoded location assistance data and send the encoded and optionally ciphered location assistance data to a gNB 111 or an ng-eNB (e.g. using NRPPa) for broadcast to UEs 102.

Positioning assistance data, which may be broadcast by base stations, such as eNBs 104, 106 or gNBs 111, are typically time varying and valid only for a certain time period. For example, GNSS ephemeris data is typically valid for about 2 hours. Other assistance data such as DGNSS corrections or RTK observations may change more frequently (on the order of a few seconds to tens of seconds).

For broadcast of assistance data using LTE (e.g. by an eNB 104 or eNB 106 in communication system 100) or NR (e.g. by a gNB 111 in communication system 101), assistance data may be included in a positioning System Information Block (posSIB). A posSIB may include assistance data of a specific type (e.g. assistance data for UE assisted OTDOA, UE based OTDOA, differential corrections for A-GNSS, acquisition assistance data for A-GNSS, RTK reference station information etc.) and may have an associated posSIB type (e.g. denoted by an integer or pair of integers). In a particular cell, a particular posSIB type may be periodically broadcast (e.g. at fixed intervals of 80 ms up to 5.12 seconds) and carrying the associated type of assistance data. The assistance data may remain the same for a certain period and may then be changed (e.g. to match a change in associated source information for the assistance data). The posSIB type may then continue to be periodically broadcast but now containing the changed assistance data. This process may continue with further changes to the assistance data.

To improve efficiency of broadcast, one or more posSIBs with the same common broadcast periodicity may be included in a positioning System Information (SI) message which is broadcast with the common broadcast periodicity. PosSIBs which contain more assistance data than can fit into one positioning SI message may be segmented into two or more posSIB segments and included in consecutive positioning SI messages (e.g. where each positioning SI message includes one posSIB segment for any posSIB that is segmented).

Scheduling information for positioning SI messages may be broadcast to a UE 102 using a System Information Block 1 (SIB1) which is broadcast by an eNB 104 or 106 or by a gNB 111 with a fixed periodicity and is periodically received and interpreted by a UE 102. The scheduling information may include an identification of each positioning SI message being periodically broadcast and may indicate the periodicity of each positioning SI message and an identify of each of the posSIBs which the positioning SI message includes. For posSIBs carrying assistance data for position methods related to A-GNSS or RTK, the scheduling information may further indicate a particular GNSS constellation (e.g. GPS, Glonass, Galileo or Beidou) to which the assistance data in the posSIB is applicable.

Using the scheduling information in the SIB1, a UE 102 can be aware of the positioning SI messages being broadcast in a particular cell, the types of posSIB included in each positioning SI message and the periodicity of each positioning SI message. However, the scheduling information may not inform a UE 102 as to when a particular posSIB starts to include changed assistance data. Thus, a UE 102 may start to receive assistance data by receiving and decoding certain positioning SI messages and the posSIBs these include. However, the UE 102 may not know when to receive a later instance of the same positioning SI message in order to obtain updated assistance from one or more included posSIBs. Although a UE 102 might receive and decode every periodic broadcast of a positioning SI message in order to ensure that any new assistance data is received, this could require extensive use of resources, particularly UE battery.

To support a more efficient means of enabling a UE 102 to determine when to receive a positioning SI message, two additional parameters can be included in a posSIB—a "validity tag" (also referred to as a "validityTag") and a "validity Time" (also referred to a "validityTime"). The validity tag may indicate to a UE 102 when a posSIB includes changed assistance data. For example, a value tag could be encoded as an integer whose value increases by one modulo some maximum value in the first or only segment of a posSIB that includes changed assistance data. The validity time may include a start time indicating a time at which assistance data in the posSIB started to be valid and a duration indicating for how long after the start time the assistance data is expected to remain valid. By adding the duration to the start time, a UE 102 can determine a time at which assistance data in the posSIB is expected to change. For example the start time may be encoded as a Coordinated Universal Time (UTC) accurate to one minute or one second and the duration may include hours, minutes and possibly seconds.

As described above, positioning assistance data in posSIBs may be carried in positioning System Information (SI) messages. Currently, the SI broadcast periodicities defined by 3GPP for LTE access may be set to 80, 160, 320, 640, 1280, 2560, or 5120 milliseconds (ms), which is indicated in SIB1, which allows a UE 102 to known when to acquire any needed assistance data and to acquire the assistance data with low latency. Each positioning SI message containing one or more posSIBs (assistance data) typically repeats (via being broadcast) many times with the same content. The UE 102 may determine via a pos-schedulingInfoList parameter included in SIB1 when a particular positioning SI message is scheduled and which posSIBs (assistance data) it contains. However, once a UE 102 has acquired a desired positioning SI message, the UE 102 does not know when the content of the positioning SI message will change and therefore the UE 102 does not know when to read the next positioning SI message with changed content.

The UE 102 may learn when to acquire new positioning SI messages with changed posSIB content by reading the positioning SI messages at regular time intervals to determine if the positioning SI messages have changed content and thus may learn over time at which rate the network provides updated positioning assistance data (posSIBs). However, this process may be very time and battery consuming, as the UE 102 may need to acquire many positioning SI messages with the same content before the UE 102 detects a desired positioning SI message with new content. Moreover, to detect any change in posSIB content, the UE 102 could have to decode and possible decipher the posSIB, and process the contained assistance data to verify whether or not they have changed in this particular instance of the positioning SI message.

Accordingly, it is desirable to inform the UE 102 when positioning assistance data in a posSIB has changed, so that the UE 102 can acquire new/updated positioning assistance data only when there has been a change. To inform the UE 102 about a change in periodically broadcasted positioning assistance data, a two-step indication process may be used in which a base station (e.g. an eNB 104 or gNB 111) periodically broadcasts an indication of a validity time for the positioning assistance data as well as an indication of whether the positioning assistance data has changed. For example, a "value tag" parameter, indicating whether positioning assistance data has changed, and a "validity time" parameter may be provided for (e.g. included within) each posSIB. A validity time for a posSIB may indicate for how long the positioning assistance data in the posSIB is valid, and therefore, may indicate to a UE 102 when to expect updated information. When the validity time expires or is about to expire, the UE 102 may check if the value tag indicates that the content of the posSIB has changed compared to the previously acquired and stored posSIB, and if changed, the UE 102 may obtain the new posSIB.

The value tag, for example, may be a field used by the UE 102 to identify any changes in an AssistanceDataSIBelement parameter included in a posSIB that contains assistance data. A value tag counter, for example, may be incremented by one by a location server (e.g. E-SMLC 110 or LMF 184) every time a new AssistanceDataSIBelement parameter (with changed content) is provided to the base station for broadcasting. In case a posSIB is segmented using "octet string segmentation", in which a long octet string comprising assistance data may be segmented into smaller octet strings with each smaller octet string placed into one posSIB segment, the location server may include the value tag only in the AssistanceDataSIBelement parameter which includes the first segment (e.g. first octet string) of the assistance data.

The validity time, for example, may be a field that indicates the validity time of the AssistanceDataSIBelement parameter. The validity time, for example, may include one or more subfields, such as a duration subfield and a startTime subfield indicating the UTC start time of the validity period, e.g. in the form of "YYMMDDhhmm[ss]Z", where YY indicates a year, MM indicates a month, DD indicates a day, hh indicates an hour, mm indicates a minute and ss, if included, indicates a second. The UE 102 may consider the received AssistanceDataSIBelement parameter to be valid from the startTime until an endTime given by adding the duration to the startTime. The UE 102 may use this information to determine when to read the corresponding positioning SI messages. In case of segmented assistance data, a location server (e.g. E-SMLC 110 or LMF 184) may include the validity time parameter only in the first posSIB segment.

In one implementation, referred to here as IM1, the value tag parameter may be included in scheduling information for each positioning SI message in the SIB1, and may be incremented by a network (e.g. by a location server or base station) every time any posSIB carried by the positioning SI message has changed content. In a variant of IM1, referred to here as IM2, there may be a value tag parameter in the SIB1 for each posSIB carried by a positioning SI message. For IM1 and IM2, the validity time parameter may be included in each posSIB, which indicates how long the positioning assistance data in the posSIB is valid and thus defines when the UE 102 may expect posSIBs with updated assistance data.

Once the UE 102 has acquired a desired positioning SI message for the first time for implementation IM1 or IM2, the UE 102 can know when to expect updated information (via the associated validity time). When the validity time is about to expire, the UE 102 may begin to listen to SIB1 (which may have a fixed periodicity of 80 ms). The UE 102 may verify whether the value tag for the positioning SI message (for IM1), or for a posSIB of interest carried by the positioning SI message for IM2, has changed. When the value tag has changed in the SIB1, the UE 102 may acquire a new instance of the positioning SI message to obtain the posSIB with new content.

With implementation IM1, the UE 102 may determine when there is a change to some posSIB carried by a positioning SI message by monitoring the value tag in the SIB1. With implementation IM2, the UE 102 may determine when there is a change to a particular posSIB carried by a positioning SI message by monitoring the value tag in the SIB1. However, for both IM1 and IM2, the UE 102 needs to monitor the SIB1 only when a posSIB is expected to change as provided by the validity time. Accordingly, the UE 102 does not need to read SIB1 continuously (e.g., every 80 ms) to detect a change of the value tag.

In case of segmented posSIBs, a positioning SI message would include only one segment (one posSIB segment) of assistance data and the UE 102 would need to acquire a series of the SI message to obtain the complete assistance data for the posSIB. Since a base station (e.g. eNB 104 or gNB 111) can be aware of different posSIB segments when receiving from a location server (e.g. LMF 184 or E-SMLC 110) assistance data to be broadcast, the base station may change the value tag in a positioning SI message when assistance data for the positioning SI message is sent from the location server containing the first (or only) segment of a new posSIB. When the first posSIB segment is included by the base station in a positioning SI message for the first time, the base station may increment the value tag in the SIB1 for implementation IM1 or IM2. The value tag can then remain the same until the first (or only) segment of another new posSIB is included in the positioning SI message by the base station. The UE 102, thus, does not see any change in the value tag for successive posSIB segments. Similarly, the validity time may be included only in the first segment of a segmented posSIB. The validity time could then equal the interval between consecutive change occurrences to the value tag.

However, because the value tag in the SIB1 changes for the first posSIB segment, a UE 102 interested in the posSIB would read the positioning SI message as soon as the change was observed. While this may mean that the UE 102 would miss the first segment (e.g. if the UE 102 fails to look at the SIB1 in time), the UE 102 may still observe a posSIB segment number included in the AssistanceDataSIBelement parameter and may be able to receive later and earlier segments by continuing to receive the positioning SI message.

Therefore, implementation IM1 or IM2 may allow a UE 102 to determine a change to individual posSIBs from the SIB1 without having to look at (and decode and possible decipher) SI messages and additionally informs the UE 102 when to expect such a change in relation to the last change (via the validity time), thereby avoiding the need for the UE 102 to read every instance of SIB1.

For implementation IM1 or IM2, the AssistanceDataSIBelement parameter may be generated at a location server, e.g., the E-SMLC 110 or LMF 184, and provided transparently to base stations, e.g., eNBs 104, 106, or gNB 111 for broadcasting (e.g., via LPPa or NRPPa), together with meta data describing the posSIBs and the scheduling, e.g., to enable the base station to populate a Pos-SchedulingInfoList parameter in SIB1. Since the location server generates all the data, it may provide the new value tag in the meta-data to the base station, e.g., in the LPPa or NRPPa message. Alternatively, the base station may determine the value tag for each posSIB by determining whether the assistance data in the posSIB has changed. For example, the base station may compare the size and/or the bit pattern of the position assistance data in a new posSIB to that of a previous posSIB to determine if the content has changed without need to decode or interpret the positioning assistance data. Alternatively, when the base station receives a new LPPa or NRPPa message from a location server which contains the same posSIBs as in a previously received LPPa or NRPPa message, the base station may assume that the positioning assistance data has changed (due to the location server sending the same posSIBs as a result of changes to the assistance data), and the base station may then determine (e.g. increase) the value tag. Such interpretation may be pre-configured between base stations and location server (e.g., via operation and maintenance).

In another implementation, referred to here as IM3, both the value tag and the validity time parameters may be included in the AssistanceDataSIBelement parameter within a posSIB. Compared to implementations IM1 and IM2, this may have an advantage that no SIB1 changes are needed. For example, implementation IM1 and IM2 may each increase the message size of the SIB1, which may be a concern in some deployments due to a maximum size of SIB1 which can be 277 bytes for LTE (and 85 bytes for NB-IoT).

In addition, implementation IM3, which has both the validity time and value tag included in the posSIB, may have an advantage that no additional base station changes are required, since all parameters in the AssistanceDataSIBelement parameter are determined at a location server and can be transparent to a base station. In addition, no LPPa or NRPPs changes may be required and only the protocol LPP may be impacted. Further, implementation IM3 may only slightly increase the overall processing by UE 102 for detecting modified posSIBs compared to implementation IM1 or IM2.

It is noted that the description below and illustrations in FIGS. 2-10 of broadcast of positioning assistance data, validity time and value tag are mostly directed to the example communication system 100 of FIG. 1A. However, the description and illustration should be understood to apply also to the example communication system 101 of FIG. 1B. In such a case, references below to E-UTRAN 120. EPC 130, eNB 104, eNB 106, MME 108, E-SMLC 110, V-GMLC 116 and LPPa may be replaced, respectively, by references to NG-RAN 135, 5GC 180, gNB 111-1 (or an ng-eNB in NG-RAN 135), gNB 111-2 (or gNB 111-3 or an ng-eNB in NG-RAN 135), AMF 182, LMF 184, GMLC 186 and NRPPa.

Figure 2:
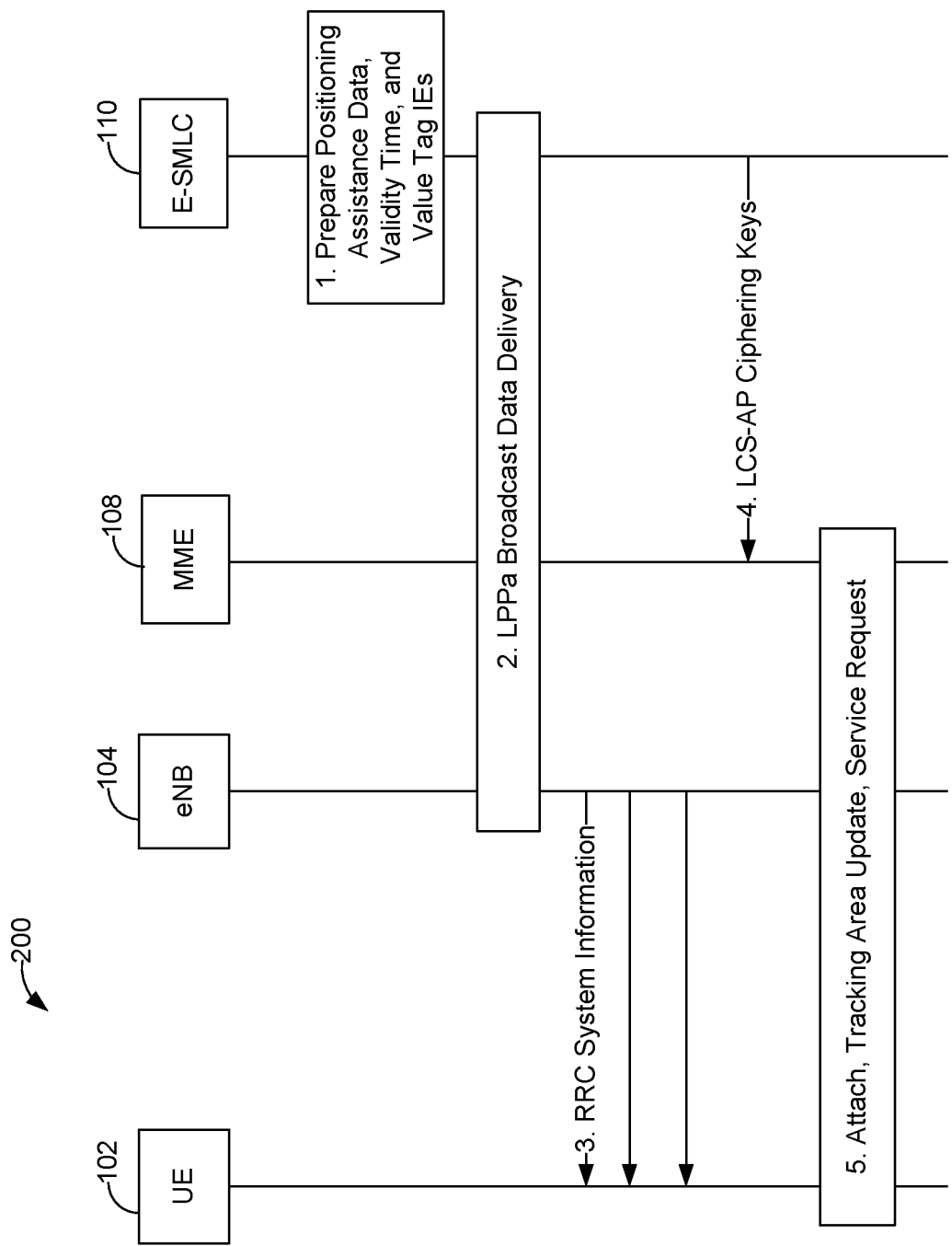
FIGS. 2, 3A-3D, 4 and 5 are signaling flow diagrams showing broadcast of positioning assistance data according to various embodiments.

FIG. 2 shows an example signaling flow 200 for broadcasting positioning assistance data, validity time and value tags using LTE as in communication system 100. At stage 1 in signaling flow 200, the various assistance data elements for each supported positioning method are collected, processed and formatted at the E-SMLC 110. For example, the E-SMLC 110 may gather data (e.g. for GNSS, RTK and/or OTDOA) from reference station 171 and/or other sources (e.g. eNB 104, eNB 106, Operations and Maintenance). The E-SMLC 110 may then encode and potentially cipher positioning System Information Block (posSIB) content. For example, the ciphering may use the 128-bit Advanced Encryption Standard (AES) algorithm defined by the National Institute of Standards and Technology (NIST) in the United States. For example, AES counter mode may be used. The E-SMLC 110 may determine the validity time of the positioning assistance data. The E-SMLC 110 may also determine a value tag associated with the positioning assistance data, e.g., by incrementing a numeric value if the positioning assistance data is changed with respect to previous positioning assistance data.

At stage 2, the assistance data information is provided to the eNB 104 (e.g. via MME 108) and to other eNBs such as eNB 106 using LPPa procedures, as discussed below. The validity time and value tag (if determined by the E-SMLC 110) may be provided to the eNB 104 along with the assistance data information. In some implementations, the eNB 104 may determine the value tag, e.g., by determining whether the positioning assistance data provided by the E-SMLC 110 has changed with respect to previous positioning assistance data. For example, the eNB 104 may compare the size and/or the bit pattern of the received position assistance data to that of previous positioning assistance data to determine if the content has changed without needing to decode or interpret the positioning assistance data. Alternatively, the eNB 104 may assume that positioning assistance data has changed if the LPPa message provides the same assistance data information as in a previously received LPPa message and may determine, e.g., increase, the value tag.

At stage 3, the eNB 104 includes the received assistance data information in positioning System Information (SI) Messages which may be for a Radio Resource Control (RRC) protocol for LTE access as defined in 3GPP TS 36.331. One or both of the validity time and value tag may also be included in the SI messages—e.g. according to implementation IM1, IM2 or IM3. The assistance data and one or both of the validity time and value tag are periodically broadcast (or broadcasted) by the eNB 104 (and by other eNBs such as eNB 106) using positioning SI messages. Additionally, one or both of the validity time and value tag may be periodically broadcast (or broadcasted) by the eNB 104 (and by other eNBs such as eNB 106) in scheduling information in SIB1 when implementation IM1 or IM2 is used. The UE 102 may apply a system information acquisition procedure (e.g. defined in 3GPP TS 36.331) to acquire the assistance data information, the validity time and value tag that are broadcasted in the SIB1 and positioning SI messages.

In some implementations, a posSIB may be segmented by E-SMLC 110 or by eNB 104 prior to broadcast if the overall size of the posSIB exceeds a maximum System Information (SI) message size (e.g. as defined for RRC in 3GPP TS 36.331). Segmentation may involve fragmenting a posSIB into a sequence of two or more posSIB segments which are each broadcast in a separate SI message as described further down. One or both of the validity time and value tag may be broadcast only in the posSIB that includes the first segment of the assistance data.

At stage 4, the E-SMLC 110 provides any ciphering keys being used at stage 1 to MME 108 and other MMEs. For example, the ciphering keys may be provided at stage 4 using a Location Services Application Protocol (LCS-AP) message. Information that is provided for each key at stage 4 may include an identification of applicable posSIBs, a key value, a key identifier and a time and geographic area of key applicability.

At stage 5, the MME 108 distributes the ciphering keys to suitably subscribed UEs (e.g. UE 102) using a NAS mobility management procedure (e.g. as defined in 3GPP TS 23.401) such as an Attach or Tracking Area Update. Alternatively, a Supplementary Services procedures could be used to distribute the keys (e.g., a Mobile Originated Located Request (MO-LR)). The keys may be used by a UE (e.g. UE 102) to decipher the assistance data received in a positioning SI message broadcast at stage 3 when ciphering is used.

A possible Pos-SchedulingInfoList parameter included in the SIB1 is shown in Table 1. The definition in Table 1 is based on a fragment of Abstract Syntax Notation One (ASN.1). The subscripts "-r15" may not be considered part of a parameter name and may be included only to indicate a 3GPP release in which a parameter was first defined (e.g. Release 15). Table 1 shows a list of positioning SI messages (Pos-SchedulingInfoList), where each element (Pos-SchedulingInfo) provides the information of its content: Broadcast periodicity (in units of 10 ms (radio frames)) (pos-si-Periodicity), and the list of posSIBs (i.e., assistance data) included (Pos-SIB-MappingInfo). The list of Pos-SIB-Type's include information comprising (a) whether the assistance data is ciphered or not (encrypted), (b) information for an applicable GNSS (gnss-id, sbas-id), (c) a value tag (valueTag), and (d) an indication of a specific posSIB type (pos-sib-type). The pos-sib-type maps one to one to a specific assistance data element, which is defined in LPP (TS 36.355). For example, posSibType1-1 includes GNSS Reference Time assistance, posSibType1-2 includes GNSS Reference Location, etc.

TABLE 1

```
-- ASN1START
Pos-SchedulingInfoList-r15 ::= SEQUENCE (SIZE (1..maxSI-
Message)) OF Pos-SchedulingInfo-r15
Pos-SchedulingInfo-r15 ::= SEQUENCE {
   pos-si-Periodicity-r15 ENUMERATED {rf8, rf16,
rf32, rf64, rf128, rf256, rf512},
   pos-sib-MappingInfo-r15 Pos-SIB-MappingInfo-r15
}
Pos-SIB-MappingInfo-r15 ::= SEQUENCE (SIZE (1..maxSIB))
OF Pos-SIB-Type-r15
Pos-SIB-Type-r15 ::= SEQUENCE {
   encrypted-r15     ENUMERATED { true }      OPTIONAL,
   -- Need OP
   gnss-id-r15       GNSS-ID-r15              OPTIONAL,
   -- Need OP
   sbas-id-r15       SBAS-ID-r15              OPTIONAL,
   -- Need OP
   valueTag-r15      INTEGER (0..63)          OPTIONAL,
      pos-sib-type-r15 ENUMERATED { posSibType1-1,
                         posSibType1-2,
                         posSibType1-3,
                         posSibType1-4,
                         posSibType1-5,
                         posSibType1-6,
                         posSibType1-7,
```

TABLE 1-continued

```
          posSibType2-1,
          posSibType2-2,
          posSibType2-3,
          posSibType2-4,
          posSibType2-5,
          posSibType2-6,
          posSibType2-7,
          posSibType2-8,
          posSibType2-9,
          posSibType2-10,
          posSibType2-11,
          posSibType2-12,
          posSibType2-13,
          posSibType2-14,
          posSibType2-15,
          posSibType2-16,
          posSibType2-17,
          posSibType2-18,
          posSibType2-19,
          posSibType3-1,
          ... }
}
-- ASN1STOP
```

A possible posSIB definition for broadcast of assistance data may be as shown in Table 2. The definition in Table 2 is based on ASN.1 and may be employed to precisely define posSIB content for broadcast AD—e.g. in 3GPP TS 36.331 or 3GPP TS 36.355.

TABLE 2

```
-- ASN1START
PositioningSystemInformationBlockType-r15 ::= SEQUENCE {
    assistanceDataSIBelement-r15        OCTET STRING,
    lateNonCriticalExtension            OCTET STRING
    OPTIONAL,
    ...
}
-- ASN1STOP
```

The assistanceDataSIBelement in Table 2 may be defined as an OCTET STRING whose content is defined by the selected pos-sib-type. The assistanceDataSIBelement may then contain control parameters (valueTag, validityTime, cipheringKeyData, segmentationInfo) and the assistanceDataElement OCTET STRING may be as shown in Table 3 regarding internal content of the OCTET STRING.

TABLE 3

```
-- ASN1START
AssistanceDataSIBelement-r15 ::= SEQUENCE {
    valueTag-r15              INTEGER (0..63)
    OPTIONAL,
    validityTime-r15          ValidityTime-r15
    OPTIONAL,
    cipheringKeyData-r15      CipheringKeyData-r15
    OPTIONAL,
    segmentationInfo-r15      SegmentationInfo-r15
    OPTIONAL,
    assistanceDataElement-r15 OCTET STRING,
    ...
}
CipheringKeyData-r15 ::= SEQUENCE {
    cipherSetID-r15           INTEGER (0..65535),
    d0-r15                    BIT STRING (SIZE (1..128)),
    ...
}
SegmentationInfo-r15 ::= SEQUENCE {
    segmentationOption-r15    ENUMERATED {pseudo-seg,
octet-string-seg},
```

TABLE 3-continued

```
    assistanceDataSegmentType-r15     ENUMERATED
{notLastSegment, lastSegment},
    assistanceDataSegmentNumber-r15   INTEGER (0..63),
    ...
}
-- ASN1STOP
```

In Table 3, the valueTag field may be included in the posSIB but need not be included if the valueTag is provided in SIB1 (Pos-SchedulingInfoList) to enable the UE 102 to identify any changes in the AssistanceDataSIBelement. The valueTag counter may be incremented by one by the location server (e.g. E-SMLC 110) in each new AssistanceDataSIBelement (with changed content) that is provided to the eNB 104 for broadcasting. In case of octet string segmentation (e.g., if segmentationOption is included and indicates 'octet-string-seg'), the location server (e.g. E-SMLC 110) may include the valueTag only in the AssistanceDataSIBelement which includes the first segment of the assistanceDataElement. The validityTime field indicates the validity time of the AssistanceDataSIBelement. The cipheringKeyData IE, if present, may indicate whether the assistanceDataElement IE octet string is ciphered. The assistanceDataSegmentType IE may indicate whether segmentation is used and may indicate whether the included assistanceDataElement segment is the last posSIB segment or not. The assistanceDataSegmentNumber IE may provide a segment number for the assistanceDataElement segment contained in the posSIB. A segment number of zero may correspond to the first segment, a segment number of one may correspond to the second segment, and so on. The content of the assistanceDataElement OCTET STRING may depend on the selected pos-sib-type. For example, if pos-sib-type indicates posSibType1-2, the assistanceDataElement may contain GNSS Reference Time assistance data as defined in LPP in 3GPP TS 36.355, which may be ciphered. Additional parameters may be present in a posSIB that indicate a particular type of segmentation (segmentationOption indicating a Segmentation Option 1 (e.g., octet string segmentation) versus a Segmentation Option 2 (e.g., pseudo-segmentation as described below) or a particular type of ciphering (not shown in Table 3) (e.g. a Segmentation Option 2 with independent ciphering versus a Segmentation Option 2 with dependent ciphering of each posSIB segment as described below).

The validity time (e.g., validityTime IE in Table 3) may be defined using ASN.1 as shown in Table 4.

TABLE 4

```
-- ASN1START
ValidityTime-r15 ::= SEQUENCE {
    startTime-r15             UTCTime,
    duration-seconds-r15      INTEGER (1..60)
    OPTIONAL,
    duration-minutes-r15      INTEGER (1..60)
    OPTIONAL,
    duration-hours-r15        INTEGER (1..256)
    OPTIONAL,
    ...
}
-- ASN1STOP
```

In Table 4, the startTime subfield may indicate the UTC start time of the validity period in the form of "YYMMDDhhmm[ss]Z." The duration-seconds, duration-minutes, duration-hours subfields may indicate the validity time of the AssistanceDataSIBelement. The UE 102 may consider the received AssistanceDataSIBelement to be valid from the startTime for the duration of the sum of duration-seconds, duration-minutes, and duration-hours. The UE 102 may use this information to determine when to read the corresponding positioning SI messages. In case of a segmented assistanceDataElement (i.e., if segmentationOption is included) the location server (e.g. E-SMLC 110) may include the validityTime only in the first posSIB segment.

The ciphering key data (e.g. cipheringKeyData IE in Table 3) may be based on a 128-bit Advanced Encryption Standard (AES) cipher algorithm with counter mode. The cipherSetID IE may identify a cipher set comprising a cipher key value and a first component C0 of an initial counter C1 for AES counter mode. The d0 parameter in Table 3 may provide a second component for the initial ciphering counter C1. The d0 parameter is defined in Table 3 as a bit string with a length of 1 to 128 bits. A UE 102 may pad out the d0 bit string if less than 128 bits with zeroes in least significant bit positions to achieve 128 bits. The initial counter C1 may then be obtained from the parameter d0 and the first component C0 (defined by the cipherSetID) as:

$$C1=(d0+C0) \bmod 2^{128} \quad (1)$$

In equation (1), all values may be treated as non-negative integers. The cipherSetID IE in Table 3 could also provide an identifier (or an identity) of the ciphering key used, which would enable an operator to use different ciphering keys for different SIBs (e.g. to support multiple subscription levels) and to change the value of a ciphering key without disrupting UE 102 broadcast acquisition (e.g., if the new key was provided to UE 102 in advance).

The first component C0 for the initial ciphering counter C1 may be provided point-to-point (e.g. as described for stage 5 in signaling flow 200). Multiple Cipher Sets may be provided to UE 102, each containing information relevant to ciphering of a particular System Information Block (i.e., different posSIBs could have different ciphering keys to support multiple subscription levels). Each cipher set may include (at least) the information shown in Table 5, where each row in Table 5 below the top row defines a separate parameter whose name is in the first column, ASN.1 data type is in the second column and purpose and usage is in the third column.

A UE 102 with proper subscription may receive multiple Cipher Sets, with each as defined in Table 5 (e.g., one set for each posSIB type for which the UE 102 has a subscription for receiving broadcast AD). Therefore, some UEs may have access to all data while other UEs can only access a subset, depending on their subscription. The delivery of the Cipher Set(s) to subscribed UEs may use a mobility management procedure, as described for stage 5 in signaling flow 200. Alternatively, or in addition, a Supplementary Services procedure could be used, as also mentioned above.

The assistanceDataSegmentType IE and assistanceDataSegmentNumber IE in Table 3 may provide segmentation information to UE 102. However, for segmentation of assistance data there may be two principle possibilities referred to herein as "Segmentation Option 1" and "Segmentation Option 2".

With Segmentation Option 1 (also referred to as "Octet String Segmentation"), the assistance data is first encoded (e.g. using ASN.1) and then optionally ciphered with the resulting encoded (and ciphered) octet string or bit string then being segmented. This means that all segments (e.g. octet strings) of a posSIB may have to be received and assembled by a UE 102 before deciphering (if needed) and ASN.1 decoding of the assistance data by the UE 102 can commence. The cipheringKeyData IE in Table 3 may then have to be included in the first posSIB segment only.

With Segmentation Option 2 (also referred to as "Pseudo-segmentation"), the assistance data is segmented before encoding and any encrypting. This means that each segment may be a valid and independent ASN.1 encoded message (or set of ASN.1 parameters) that may also be ciphered. For example, a segment may comprise a complete GNSS navigation model for one or more satellites. The cipheringKeyData parameter in Table 3 may then have to be included in each posSIB segment or in the first posSIB segment only, as discussed below.

For Segmentation Option 1, the same ciphering could be used for the whole encoded (and ciphered) octet string (or bit string). Therefore, the cipheringKeyData IE could be included in the first posSIB segment only. Since the ciphering key data in Table 3 can be around 18 octets for AES

TABLE 5

| Cipher Set | | |
|---|---|---|
| cipherSetID | INTEGER (0 . . . 65535) | This field specifies the cipher set ID. |
| cipherKey | BIT STRING (SIZE (128)) | This field specifies a cipher key as a bit string of size 128 bits. |
| C0 | BIT STRING (SIZE (1 . . . 128)) | This field specifies the first component of the initial ciphering counter C1. If less than 128 bits, C0 may be padded out with zeroes in least significant bit positions to achieve 128 bits. |
| SIBType | BIT STRING (posSibType1-1 (0), posSibType1-2 (1), posSibType1-3 (2), etc . . .) | This field specifies the posSIB Type(s) for which the Cipher Set data is applicable. |
| Time of applicability & validity time | E.g., System Frame Number (SFN), UTC, etc. | Time when the ciphering data set becomes valid. |
| TAIs List | OCTET STRING | Contains the Tracking Area Identities (TAIs) of the tracking areas for which the ciphering data set is applicable. If this IE is omitted, the ciphering data set may be valid in the entire PLMN. | ciphering, this could reduce the posSIB overhead for the subsequent posSIB segments by around 18 octets for each segment.

However, for Segmentation Option 2, there would be two possibilities. One possibility is Segmentation Option 2 with independent ciphering of each posSIB segment. Since each posSIB segment may contain a different and self-contained assistance data IE which can be deciphered and decoded by a UE 102 independently of other posSIB segments which were created through segmentation of assistance data, each posSIB-segment could be ciphered independently. The UE 102 can then use the assistance data in a posSIB segment immediately after the posSIB segment has been received. However, the cipheringKeyData IE would then need to be included in each posSIB segment. Another possibility is Segmentation Option 2 with dependent ciphering of each posSIB segment. With this, common ciphering can be applied to all posSIB segments starting with the first segment and continuing ciphering to the last segment. Conceptually, all the encoded assistance data (AD) segments (each comprising an octet string or bit string) would be concatenated into a single octet (or bit) string, ciphered, and then separated again into different (ciphered) assistance data segments. With the AES counter mode ciphering method, this may equate to an exclusive OR (XOR) logical bit operation for the single concatenated octet or bit string (of unciphered AD) with a single cipher string. However, a UE 102 implementation may not need to do any concatenation and could instead compute the cipher string and XOR different portions of it with different incoming ciphered posSIB segments in order to perform deciphering. A restriction may be that a UE 102 would have to start the deciphering at the first posSIB segment and not at a subsequent posSIB segment (e.g. in order to know the number of previous posSIB octets). However, compared to Segmentation Option 1, the UE 102 could still be able to decipher each posSIB segment when received and not wait until all segments were received. The UE 102 may have to wait for the first posSIB segment to start deciphering but the UE 102 may not need to wait for the last segment and can decipher each segment as soon as it is received. The cipher key data may then need to be provided in the first posSIB segment only (e.g. as for Segmentation Option 1).

If a number N of posSIB segments are assumed to be broadcast at intervals of T seconds (e.g. with a complete posSIB broadcast period of N*T seconds), the average latency at UE 102 to receive or begin obtaining deciphered AD from broadcast posSIB segments may be as shown (in the third column) in Table 6.

TABLE 6

Average Latency

| | | |
|---|---|---|
| (1) | Segmentation Option 1: | $1.5 \times N \times T$ |
| (2) | Segmentation Option 2 with independent ciphering of each segment: | $0.5 \times T$ |
| (3) | Segmentation Option 2 with dependent ciphering of each segment: | $0.5 \times N \times T$ |

Table 6 shows that Segmentation Option 1 may have the highest average latency, but may also have the lowest posSIB-segment overhead (since cipheringKeyData would have to be included in the first posSIB segment only). Segmentation Option 2 with independent ciphering of each segment may have the lowest average latency, but may also have the highest posSIB-segment overhead (since cipheringKeyData may have to be included in each posSIB segment). Segmentation Option 2 with dependent ciphering of each segment may be between Segmentation Option 1 and Segmentation Option 2 with independent ciphering of each segment in terms of latency and may also have low posSIB segment overhead.

For generating and formatting the posSIBs at stage 1 in signaling flow 200, there may be two principle alternatives, referred to here as Formatting Alternative 1 and Formatting Alternative 2: With Formatting Alternative 1, posSIB formatting and encoding occurs at the E-SMLC 110. Here, the E-SMLC 110 encodes the data according to the posSIB definition (e.g., as in the example in Table 3) and provides the complete posSIB as an octet (or bit) string to the eNB 104. The E-SMLC 110 may thus ASN.1 encode the assistance data element, and possibly according to the ASN.1 encoding for LPP, and may optionally cipher the encoded octet (or bit) string. The E-SMLC 110 may also determine the needed control parameters (e.g., segmentationInfo, valueTag, validityTime in Table 3), and the Ciphering Key data, and may ASN.1 encode the complete posSIB (e.g. as in Table 3). Therefore, the posSIB content (including ciphering and segmentation details as well as validity time and possibly value tag) may be transparent to the eNB 104, and the eNB 104 may only need to include the octet (or bit) string received from E-SMLC 110 in an SI message for broadcast at stage 3 in signaling flow 200. If the posSIB needs to be segmented, the E-SMLC 110 may also perform the segmentation (e.g. as described above) and may provide the encoded (and ciphered) posSIB segments to eNB 104 as complete octet (or bit) strings (at stage 2 in signaling flow 200) for broadcast by eNB 104 at stage 3 in signaling flow 200.

In order to schedule the posSIB broadcast correctly, the eNB 104 may need to know, in addition to the octet (or bit) string to be broadcast, a GNSS identity (ID) (when applicable to the posSIB) and whether or not the posSIB is segmented into multiple segments. The eNB 104 may also need to know whether the posSIB content is ciphered (encrypted) or not (e.g., to let the UE 102 know a priori know which SIBs will be ciphered) as shown in Pos-schedulingInfoList in Table 1. Therefore, an LPPa message used to transfer a posSIB from E-SMLC 110 to eNB 104 at stage 2 of signaling flow 200, where Formatting Alternative 1 is used, may be as shown in Table 7. If the value tag is included in SIB1 (Pos-SchedulingInfoList Table 1) the valueTag may also be provided by the E-SMLC as shown in Table 7.

TABLE 7

| IE/Group Name | Presence | Range | IE type and reference | Semantics description |
|---|---|---|---|---|
| Scheduling Info | | 1 | | |
| >GNSS ID | O | | ENUMERATED (. . .) | |
| >SBAS ID | O | | ENUMERATED (. . .) | |
| >Cipher Flag | M | | BOOLEAN | |
| >si-Periodicity | M | | ENUMERATED (. . .) | |
| >valueTag | O | | INTEGER (. . .) | If the value tag is included in SIB1 |
| SIB Type XX | | 1 . . . <maxSegments> | | Sorted according to increasing assistanceDataSegmentNumber |
| >Segment | | | OCTET STRING | |

In Table 7, the posSIB that is transferred may comprise an unsegmented posSIB or may comprise a posSIB comprising two or more posSIB segments, where the Segment IE in Table 7 corresponds to the unsegmented posSIB or to one of the posSIB segments (with separate instances of the Segment IE then included for each posSIB segment). In Table 7, a greater than (">") symbol in the leftmost column indicates an IE that is part of an immediately preceding (higher up) IE without such a symbol; an "O" or "M" in the second column indicates that an IE is optional or mandatory, respectively; an entry in the third column indicates an allowed range for the number of occurrences of an IE; an entry in the fourth column indicates an ASN.1 data type for an IE; and an entry in the rightmost column provides some optional description for an IE. The conventions used in Table 7 are similar to those used to define LPPa in 3GPP TS 36.455. The same conventions are also used below for Tables 8, 9, 10, 11, and 12.

With Formatting Alternative 2, posSIB Formatting and Encoding occurs at the eNB 104. Here, the E-SMLC 110 provides the individual IEs according to the posSIB definition to the eNB 104 and the eNB 104 encodes the posSIB. In this case, the LPPa message used to transfer AD at stage 2 in signaling flow 200 may primarily include the encoded and possibly ciphered assistance data (AD) element as an octet or bit string. The AD could be provided per posSIB or as a list of AD elements together with needed control information. For example, the data transferred at stage 2 of signaling flow 200 could be as shown in Table 8 in the case of AD for a GNSS Navigation model (where an SBAS indicates a Satellite based augmentation system).

With Formatting Alternative 2, the posSIB content would not be transparent to the eNB 104. Only the assistance data element (e.g., gnss NavigationModel in Table 8) may be transparent, since this would be encoded and possibly ciphered at the E-SMLC 110.

With Formatting Alternative 2 and Segmentation Option 1, the assistance data octet or bit string (e.g., gnss-Navigation Model in Table 8) could be segmented at the eNB 104, and the eNB 104 may determine the posSIB control parameters (e.g., the assistanceDataSegmentType IE and assistanceDataSegmentNumber IE in Table 3) and includes ciphering key data (e.g. the CipheringKeyData IE in Table 3) only in the first posSIB segment. Alternatively, segmentation at E-SMLC 110 would also be possible, and in this case the E-SMLC 110 could provide a list of octet string (or bit string) AD segments for each posSIB segment together with the ciphering key data (e.g. the CipheringKeyData IE in Table 3) for the first posSIB segment only.

With Formatting Alternative 2 and Segmentation Option 2, segmentation must be performed at the E-SMLC 110 (since ASN.1 encoding and ciphering are both performed at the E-SMLC 110). In this case, E-SMLC 110 may provide a list of octet (or bit) string AD segments for each posSIB segment to eNB 104 together with control parameters (e.g., the assistanceDataSegmentType IE and assistanceDataSegmentNumber IE in Table 3), as well as ciphering key data (e.g. the CipheringKeyData IE in Table 3) either for the first posSIB segment only, or for all posSIB segments, as described previously for Segmentation Option 2.

The two formatting alternatives for providing the posSIB data to the eNB 104 may have the following properties.

TABLE 8

| IE/Group Name | Presence | Range | IE type and reference | Semantics description |
|---|---|---|---|---|
| GNSS ID | O | | ENUMERATED (. . .) | |
| SBAS ID | O | | ENUMERATED (. . .) | |
| SIB Type XX | | 1 . . . <maxSegments> | | Depends on Segmentation Option |
| >cipheringKeyData | O | | CipheringKey Data | SEQUENCE |
| >gnss-NavigationModel | M | | OCTET STRING | |
| >validityTime | O | | | |
| >valueTag | O | | | |

Formatting Alternative 1 may have less eNB 104 impacts than Formatting Alternative 2. Formatting Alternative 1 may avoid the eNB 104 knowing about or needing to support ciphering. Formatting Alternative 1 may be more efficient in terms of processing than Formatting Alternative 2, since SIBs common to several eNBs may have to be formatted only once in the system (by E-SMLC 110) and not by each eNB separately. Formatting Alternative 1 may allow faster implementation for any future changes to ciphering, segmentation or posSIB content than Formatting Alternative 2, because eNB 104 changes may not be needed. In addition, the posSIB content for Formatting Alternative 1 might be defined as a simple octet (or bit) string for RRC in 3GPP TS 36.331 with the detailed posSIB content (e.g. as exemplified in Table 3) defined in another TS such as the LPP TS in 3GPP TS 36.355.

Two options for LPPa procedures for transfer of positioning assistance data from an E-SMLC 110 to an eNB 104, as at stage 2 in signaling flow 200, using LPPa may be possible. These are referred to herein as LPPa Option 1 and LPPa Option 2. With LPPa Option 1, a class 1 LPPa procedure is used to enable the E-SMLC 110 to request broadcasting of positioning assistance data by the eNB 104 which is followed by a class 2 LPPa procedure to convey the assistance data from the E-SMLC 110 to eNB 104. With LPPa Option 2, a class 1 LPPa procedure is used to enable the E-SMLC 110 to request broadcasting of positioning assistance data, which also conveys the assistance data.

As defined for LPPa in 3GPP TS 36.455, a class 1 LPPa procedure may comprise an LPPa request or command message sent from a first entity (e.g. E-SMLC 110) to a second entity (e.g. eNB 104) with an LPPa response message (e.g. indicating success or failure) returned by the second entity to the first entity. In contrast, with an LPPa class 2 procedure, an LPPa request or command message may be sent from the first entity to the second entity without an LPPa response message being returned.

With LPPa Option 1, the eNB 104 may provide "feedback" (e.g. an amount of radio resources available for broadcasting assistance data) to the E-SMLC 110, to help the E-SMLC 110 suitably size the assistance data. With LPPa Option 2, the eNB 104 receives the assistance data using LPPa and may provide "feedback" (e.g. which parts of the assistance data eNB 104 was not able to configure for broadcasting) in the response.

With LPPa Option 1 the level of posSIB support may be negotiated between E-SMLC 110 and eNB 104 ahead of time (i.e., before providing the actual posSIB data), whereas for LPPa Option 2, the E-SMLC 110 may initially assume certain posSIB resources at the eNB 104, and may get the actual available posSIB resources at the eNB 104 afterwards. A number of posSIB resources may need to be negotiated between E-SMLC 110 and eNB 104. The first resource may comprise Assistance data elements to broadcast. This may be a list of actual assistance data IEs (e.g., GNSS Navigation Model, OTDOA Assistance Data, etc.) or a list of posSIB types. The second resource may comprise a desired broadcast periodicity. Each assistance data IE may have different requirements on broadcast periodicity. For example, RTK Observation Data from a GNSS reference station (e.g. reference station 171) may be broadcast once per second, whereas OTDOA assistance data may have a longer broadcast periodicity (e.g., 5 to 10 seconds). A third resource may comprise a particular combination of SIBs (or assistance data IEs) that are to be included (and broadcast) using the same SI message (or same type of SI message). For example, certain combinations of SIBs/assistance data IEs may preferably be included in the same set of SI messages (for example, GNSS Reference Time and RTK Observations; or GNSS Reference Time and GNSS Acquisition Assistance, etc.). A fourth resource may comprise a maximum posSIB (or assistance data) segment size (e.g. which may be different for WB LTE versus NB-IoT).

Given a large number of possible combinations of posSIB resources from the list above, it may be advantageous to negotiate the posSIB broadcast resources between an eNB 104 and E-SMLC 110 ahead of time using LPPa Option 1.

With LPPa Option 2, the E-SMLC 110 may need to begin with a guess of available resources at the eNB 104 and select a certain set of possible assistance data IEs/SIBs to broadcast. Since the E-SMLC 110 may have no information on broadcast resources, the E-SMLC 110 may select more resources than are likely to be available initially. The eNB 104 may then have to select a subset of the assistance data/SIBs resources requested initially by the E-SMLC 110 and provide feedback on the selected subset to the E-SMLC 110. But since the eNB 104 may not be involved in positioning of UEs such as UE 102, eNB 104 may not know which subset of assistance data elements/SIBs make most sense (or are indeed needed) for a certain positioning method or for a certain GNSS type, and for a certain positioning mode (i.e., UE-assisted and/or UE-based, or GNSS with or without RTK, etc.).

Similarly, with LPPa Option 2 the E-SMLC 110 may have to assume a certain posSIB size initially in order to segment and cipher the data. This initial assumption on posSIB size may be sub-optimal, i.e., either too small or too large. A too small assumed posSIB size may not trigger the eNB 104 feedback (since the request could be fulfilled) and, therefore, may not exploit the full broadcast capability. A too large selected posSIB size may require a re-encoding and re-ciphering at the E-SMLC 110 based on eNB 104 feedback and may thus be inefficient.

LPPa Option 1 may enable the E-SMLC 110 to optimize posSIB content and broadcasting before the actual posSIB data is segmented, encoded and ciphered. The E-SMLC 110 may encode and cipher only those assistance data elements/SIBs which can actually be broadcasted by the eNB 104, and which are most suited for a certain positioning method or methods and positioning modes (UE-assisted, UE-based). If a maximum posSIB size is low, the E-SMLC 110 may perform pseudo-segmentation (using Segmentation Option 2), or may decide not to provide this assistance data element via broadcast. If available broadcast periodicity is low, the E-SMLC 110 may only provide data with longer life time, etc.

With LPPa Option 1, a class 2 LPPa procedure may also be used to terminate (or modify) a previous reservation. For example, an eNB 104 could terminate (or modify) a previous reservation when resource availability had decreased or increased.

Figure 3A:
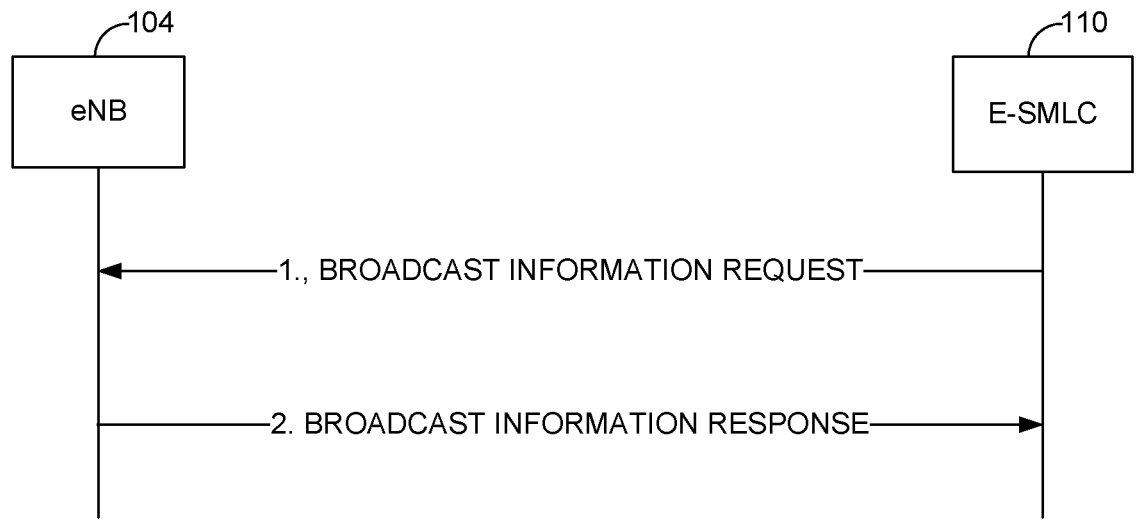

FIG. 3A shows a class 1 LPPa Broadcast Information Exchange procedure for LPPa Option 1 which may be initiated by the E-SMLC 110 at stage 1 to indicate to the eNB 104 the need to configure transmission of positioning SI messages and to receive the SI configuration information from the eNB 104 at stage 2. The content of the LPPa broadcast Information Request at stage 1 may be as shown in Table 9.

TABLE 9

| IE/Group Name | Presence | Range | IE type and reference |
|---|---|---|---|
| Message Type | M | | |
| LPPa Transaction ID | M | | |
| Requested SIB Types Transmission and Periodicity | M | | Table 11 below |

The "Requested SIB Types Transmission and Periodicity" IE shown in Table 9 may include a list of posSIB Types to be broadcasted by the eNB 104 (e.g. sorted according to priority and grouped according to desired aggregation in SI messages) together with the desired periodicity or periodicities (e.g. sorted according to priority) for each posSIB Type group/SI message. The corresponding response message at stage 2 may grant and/or modify the request as shown in Table 10.

TABLE 10

| IE/Group Name | Presence | Range | IE type and reference |
|---|---|---|---|
| Message Type | M | | 9.2.3 |
| LPPa Transaction ID | M | | 9.2.4 |
| SIB Types and Periodicity | M | | Table 11 below. |

The "SIB Types and Periodicity" IE in Table 10 may include all the information required by the E-SMLC 110 to encode and format the particular posSIB type. Table 11 shows an example of the "Requested SIB Types Transmission and Periodicity" IE for Table 9 and the "SIB Types and Periodicity" IE for Table 10.

TABLE 11

| IE/Group Name | Presence | Range | IE type and reference |
|---|---|---|---|
| SIB Group List | | 1 ... <maxGroups> | One group may correspond to one System Information (SI) message |
| >SIB Types List | | 1 ... <maxSIBs> | Number of SIBs in a SI message |
| >SIB Type | M | | ENUMERATED (SIBx, SIBy, SIBz, ...) |
| >si-Periodicity | M | | ENUMERATED (rf8, rf16, rf32, rf64, rf128, rf256, rf512) |
| >Max SIB Size | M | | INTEGER(1 ... max) |

PosSIB groups may be included in priority order in Table 11 and posSIB Types may likewise be included in priority order for each posSIB group. If an eNB 104 does not have enough resources for the requested SIBs according to Table 11 in a BROADCAST INFORMATION REQUEST, the eNB 104 may reduce one or more of the requested periodicities and/or posSIB maximum sizes and/or may remove one or more of the requested posSIB groups or posSIB types from the granted SIBs according to Table 11 in a BROADCAST INFORMATION RESPONSE. The reduction in resources may be applied preferentially to the lowest priority posSIB groups and posSIB types first, with higher priority posSIB groups and posSIB types not affected until resources for lower priority posSIB groups and posSIB types have been removed or minimized. Since this may degrade overall service more than if a more balanced reduction in resources over all posSIB groups and posSIB types was applied, it may be useful to include some extra information in a BROADCAST INFORMATION REQUEST (e.g. in Table 11) to specify how an eNB 104 should reduce resource allocation to posSIB groups and posSIB types. For example, there could be an additional IE in Table 11 which specifies whether the eNB 104 should attempt to reduce resources in a balanced manner across all posSIB groups and posSIB types without regard to priority or may reduce resources strictly based on priority. As another alternative, an E-SMLC 110 could include an IE indicating a minimum periodicity and a minimum posSIB maximum size for each posSIB type in a BROADCAST INFORMATION REQUEST (e.g. in Table 11) as well as a preferred periodicity and preferred posSIB maximum size.

Figure 3B:
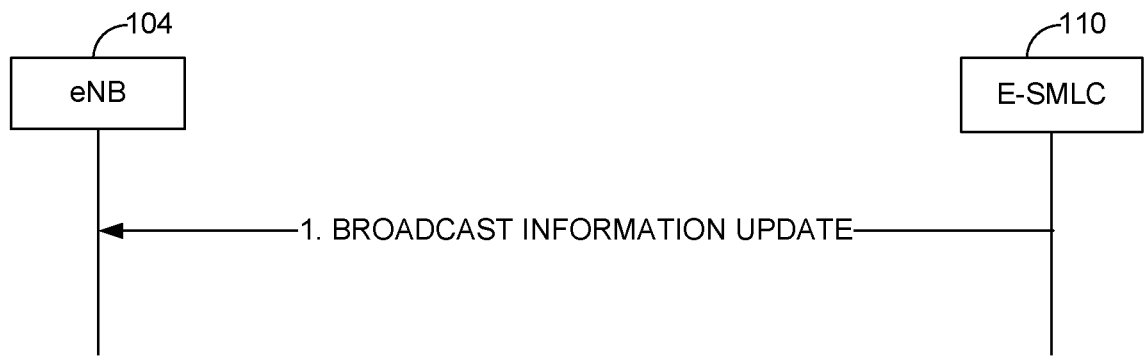

The actual broadcast SIBs may be subsequently delivered by E-SMLC 110 to eNB 104 using a BROADCAST INFORMATION UPDATE message as shown in FIG. 3B. The E-SMLC 110 may initiate the procedure by sending a BROADCAST INFORMATION UPDATE message to the eNB 104 at stage 1 in FIG. 3B. This message may contain data for one or more SIBs (e.g. as exemplified in Tables 7 and 8), and may include one or both of the valueTag and validityTime. The E-SMLC 110 may initiate the procedure whenever an assistance data posSIB changes (e.g. due to change of the actual assistance data or due to change of the ciphering keys). For example, Table 12 shows possible content of a BROADCAST INFORMATION UPDATE message.

TABLE 12

| IE/Group Name | Presence | Range | IE type and reference | Semantics description |
|---|---|---|---|---|
| Message Type | M | | | |
| LPPa Transaction ID | M | | | |
| SIB Group List | | 1 ... <maxGroups> | | One group may correspond to one SI message |

TABLE 12-continued

| IE/Group Name | Presence | Range | IE type and reference | Semantics description |
|---|---|---|---|---|
| >SIB Types List | | 1 ... <maxSIBs> | | Number of SIBs in a SI message |
| >SIB Type | M | | Table 7 or Table 8 | |

Figure 3C:
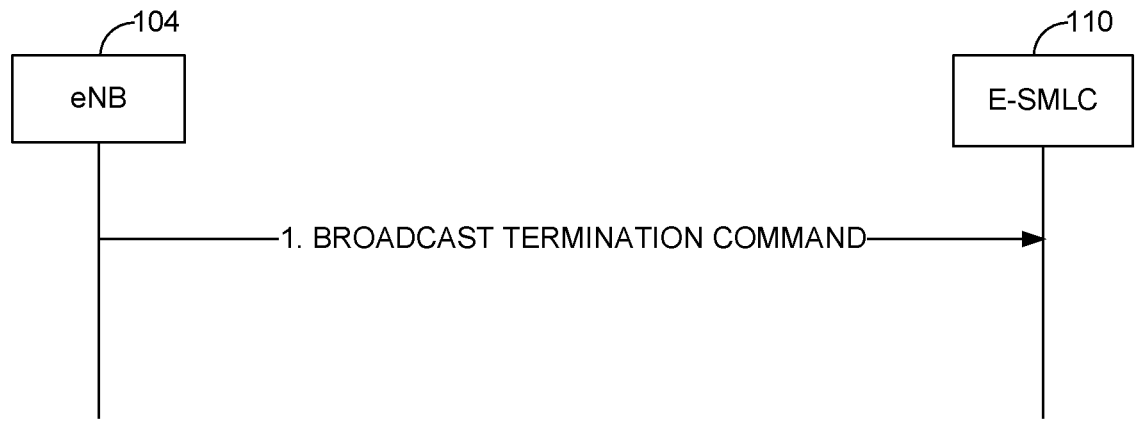

As mentioned above, an eNB 104 or E-SMLC 110 initiated ABORT or TERMINATION procedure may be needed to allow termination of a previously granted Broadcast Information Exchange procedure by the eNB 104 or E-SMLC 110, respectively. FIG. 3C shows one example of this where the eNB 104 initiates the termination at stage 1. E-SMLC 110 initiated termination may be similar with the TERMINATION message sent in the other direction.

Figure 3D:
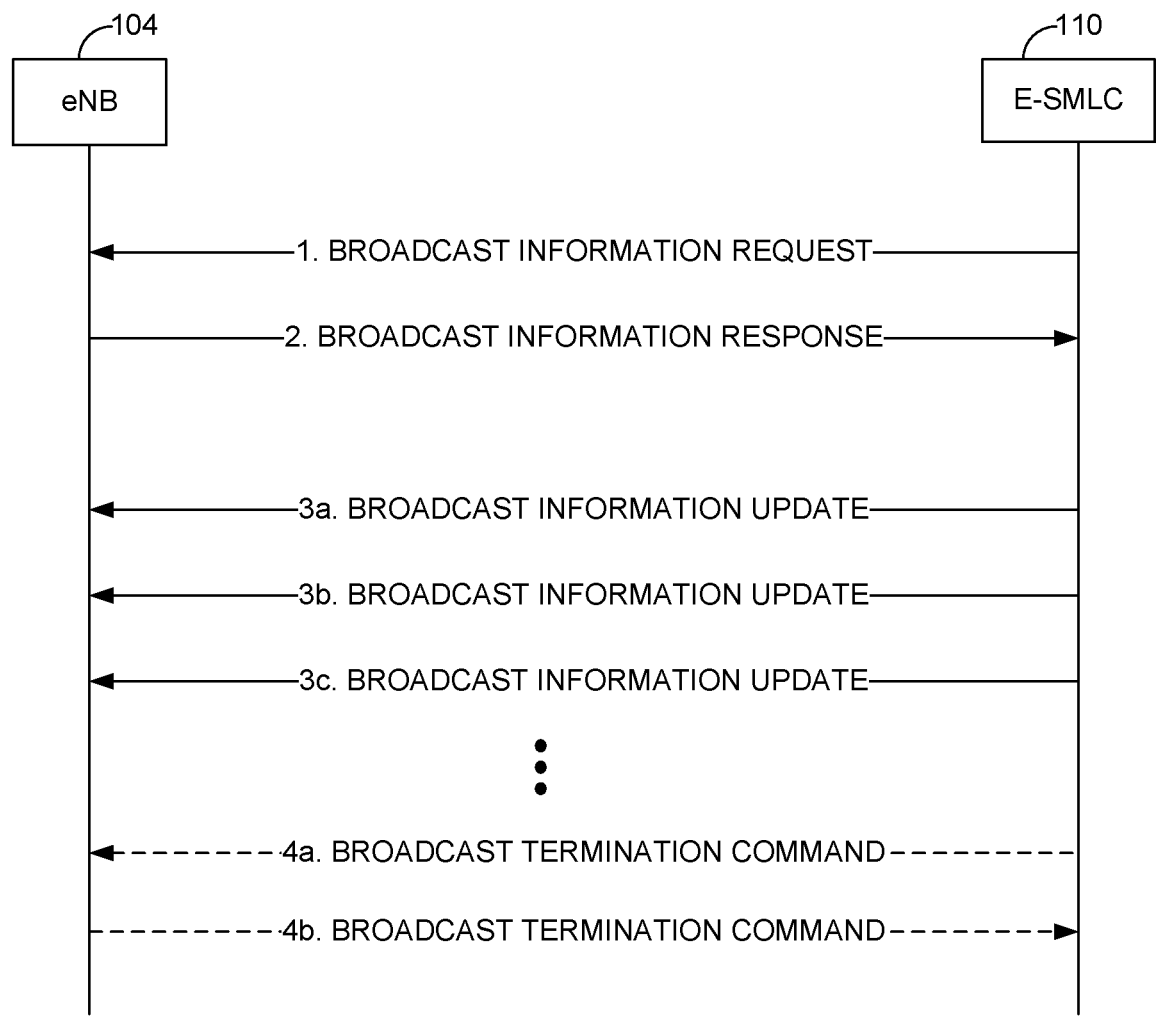

Therefore, based on FIGS. 3A-3C, stage 2 in FIG. 2 could be expanded into the stages shown in FIG. 3D. At stage 1 in FIG. 3D, the E-SMLC 110 requests information about available broadcast posSIB resources from an eNB 104 as in FIG. 3A. This request may include a list of desired SIBs to be broadcasted together with desired broadcast periodicity for each posSIB type.

At stage 2 in FIG. 3D, if the eNB 104 grants the request, it provides a list of possible SIBs which can be broadcasted, together with possible periodicity and other control parameters (such as maximum posSIB size).

At stage 3 in FIG. 3D, the E-SMLC 110 encodes the data according to the posSIB definition and determines the validity time and may determine the value tag, and provides the data in BROADCAST INFORMATION UPDATE messages to the eNB 104 as in FIG. 3B. The information update for each posSIB may comprise all of the data broadcast by the posSIB—pre-encoded and pre-ciphered by E-SMLC 110 as applicable. The E-SMLC 110 also provides updated information to eNB 104 by repeating stage 3 whenever assistance data changes or when a ciphering key is changed and updates the validity time and value tag accordingly. Alternatively, the eNB 104 updates the value tag every time a new BROADCAST INFORMATION UPDATE messages is received for the same assistance data.

At stage 4 in FIG. 3D, at any time after stage 2, the eNB 104 or E-SMLC 110 may terminate the broadcast update procedure as in FIG. 3C.

The eNB 104 and E-SMLC 110 may each be able to update the level of posSIB support. This could be achieved by first terminating an ongoing procedure (e.g. as in FIG. 3C) and then restarting with negotiating new broadcast resources (e.g. as in FIG. 3A). Alternatively, an LPPa MODIFICATION COMMAND could be used for that purpose, e.g., in case the posSIB resources in the eNB 104 changes, or assistance data availability in the E-SMLC 110 changes.

Figure 4:
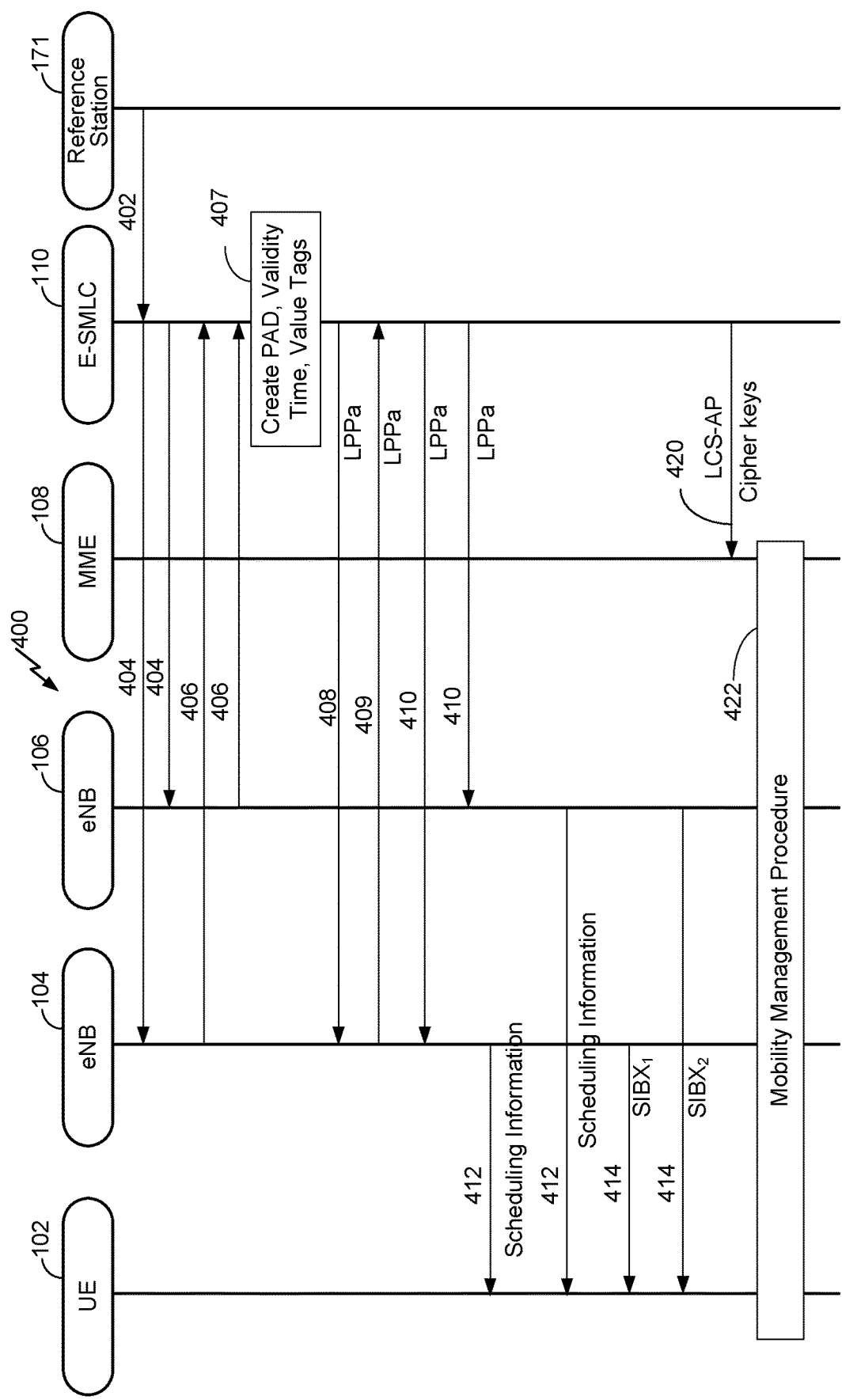

FIG. 4 shows an example signaling flow 400 applicable to communication system 100 shown in FIG. 1A for creating and distributing positioning assistance data, validity time and value tags for use by UE devices such as UE 102 in positioning operations. Signaling flow 400 may be similar to or the same as signaling flow 200 in FIG. 2, though includes more detail than FIG. 2, and is provided to describe and clarify additional embodiments and techniques. As pointed out previously, features of FIG. 4 may also be implemented using communication system 101 shown in FIG. 1B without deviating from claimed subject matter. For example, in an implementation of FIG. 4 using communication system 101, eNBs 104 and 106 may be replaced by gNBs 111-1 and 111-2, respectively, MME 108 may be replaced by AMF 182, E-SMLC 110 may be replaced by LMF 184, and usage of LPPa may be replaced by usage of NRPPa.

According to an embodiment, E-SMLC 110 may receive messages from multiple sources comprising location information (e.g. location parameters) for GNSS positioning, Real Time Kinematic (RTK) positioning, OTDOA positioning, or a combination thereof. For example, location parameters for GNSS positioning may comprise orbital data, almanac data and/or timing data for one or more GNSS satellites or space vehicles (SVs); location parameters for OTDOA positioning may comprise the locations of eNodeB antennas, cell timing and/or PRS parameters (e.g. PRS bandwidth, frequencies, subframe allocation) for cells; and location parameters for RTK positioning may comprise some or all data defined by the Radio Technical Commission for Maritime Services (RTCM) for one or more GNSSs (e.g. in RTCM Standard 10403.3 entitled "Differential GNSS (Global Navigation Satellite Systems) Services—Version 3.3"). In particular, E-SMLC 110 may receive messages 402 from reference station 171 comprising location parameters based on reports and observations from GNSS assets such as satellite 160. E-SMLC 110 may also transmit request messages 404 to eNBs 104 and 106 and receive response messages 406 from eNBs 104 and 106 comprising location parameters applicable to OTDOA positioning, for example. The location information applicable to OTDOA may comprise antenna locations, cell identities, cell timing, PRS parameters for eNBs 104 and 106. In an aspect, messages 404 and 406 may comprise LPPa messages applicable to communication system 100 shown in FIG. 1A. Alternatively, messages 404 and 406 may comprise NRPPa messages applicable to communication system 101 shown in FIG. 1B.

Based, at least in part, on location parameters obtained from messages 402 and 406, for example, E-SMLC 110 may create positioning assistance data (PAD) at block 407 for use by UE devices such as UE 102 in obtaining measurements, observations and/or estimates relating to a location of the UE 102 using various positioning techniques (e.g., GNSS, RTK, OTDOA, etc.). The E-SMLC 110 may further create one or both of the validity time and value tags for the PAD for use to notify UE 102 of a change to the PAD. For example, the E-SMLC 110 may determine a start time, a duration, an end time or some combination thereof that the PAD is valid. In some implementations, the E-SMLC 110 may also determine a value tag associated with the PAD, e.g., by incrementing a numeric value if the PAD is changed with respect to previous PAD. The value tag may be per posSIB as in implementation IM2 or IM3 above or per positioning SI message as for implementation IM1 above. For IM1, the value tag may be incremented whenever PAD included in any posSIB included in the positioning SI message is changed. For IM2 or IM3, the value tag may be incremented whenever PAD included in a particular posSIB included in the positioning SI message is changed.

The E-SMLC 110 may determine the validity time based on the type of the PAD and/or based on the update rate at which the reference stations 171 are providing location information to the E-SMLC at stage 402. For example, if the reference stations 171 are configured to provide differential GNSS data every 30 seconds, the E-SMLC may use a validity time of 30 seconds in the differential GNSS PAD. In another example, if the reference stations 171 provide GNSS orbital parameters (e.g., ephemeris and/or almanac data), the E-SMLC may determine the validity time based on the update rate of the individual GNSSs (e.g., as defined in the respective GNSS specifications).

The E-SMLC 110 may determine the validity time also based on a desired quality of service. For example, for differential GNSS corrections, the accuracy of the location estimate may decrease with the age of the corrections. The E-SMLC 110 may determine for a desired quality of service (e.g., accuracy of the location estimate) the validity time of the differential GNSS corrections PAD. The E-SMLC 110 may receive GNSS observation data (e.g., code and/or carrier phase measurements) from a reference station 171 and may use these measurements together with differential corrections to perform reference position calculations. The E-SMLC 110 may determine an acceptable decrease of positioning accuracy using various validity times of the correction data. The E-SMLC 110 may then select the validity time which provides the desired quality of service (e.g., desired positioning accuracy). In this case, the validity time may exceed the interval at which the assistance data is changing (e.g. the interval between receipt of consecutive reference data updates from reference stations 171).

In an implementation, PAD created at block 407 may comprise a subset of PAD to be applied by a UE 102 and not the entire PAD to be used by a UE 102. For example, PAD created at block 407 may complement or augment PAD provided to UEs from other sources (e.g. provided by E-SMLC 110 point to point using LPP or LPP/LPPe or provided by LMF 184 using LPP or NPP). Also, PAD created at block 407 may comprise a subset of PAD for one particular LPP positioning method to be used in conjunction with other PAD for the one particular LPP positioning method. In an aspect, PAD created at block 407 may comprise some or all assistance data defined for position methods supported by LPP and/or LPPe such as UE assisted A-GNSS, UE based A-GNSS, UE assisted OTDOA, UE based OTDOA, UE assisted RTK and/or UE based RTK.

According to an embodiment, E-SMLC 110 may encode PAD, the validity time, and value tags created at block 407. The encoding may be based on LPP such that E-SMLC 110 encodes PAD as one or more ASN.1 parameters defined for LPP. For example, E-SMLC 110 may encode PAD, the validity time, and value tags as posSIBs (e.g. if implementation IM3 is used). For example, each posSIB may comprise PAD and its associated validity time and value tag for one LPP position method and may comprise a subset of the assistance data defined in LPP for that position method. In some implementations (e.g. implementation IM1 or IM2), the value tags may be encoded in scheduling information associated with each PAD. As an example, a separate posSIB may be used to convey PAD for each of UE based OTDOA for wideband (WB) LTE, UE assisted OTDOA for WB LTE, UE based OTDOA for narrowband (NB) LTE (e.g. NB-IoT) and UE assisted OTDOA for NB LTE (e.g. NB-IoT). Similarly, a separate posSIB may be used to convey PAD for each of different types of GNSS AD such as GNSS orbital parameters, GNSS acquisition assistance parameters, GNSS ionospheric parameters and GNSS timing parameters. Further, other posSIBs may be used to convey assistance data, where the assistance data supports RTK positioning and/or contains RTCM messages, as described later herein. Furthermore, at block 407, E-SMLC 110 may tailor PAD for particular cells being served by eNBs 104 and 106. For example, posSIBs for one particular cell may be tailored to contain PAD particularly relevant to that particular cell, which may be different from posSIBs containing PAD for other cells. As an example, in the case of PAD for a posSIB supporting OTDOA, the posSIB for a particular first cell may be based on the first cell as the serving and/or reference cell for a UE 102 and may provide OTDOA related information for the first cell and for one or more other cells (e.g. neighbor cells) nearby to the first cell. The posSIB for the first cell may differ from the posSIB for some other second cell which may provide OTDOA related information for a different set of cells than the first cell or be based on the second cell rather the first cell as being the serving and/or reference cell.

Optionally, E-SMLC 110 may reserve resources at eNB 104 and/or eNB 106 for broadcast of PAD, validity time and value tags created at block 407 by sending LPPa messages 408 to eNB 104 (as shown in FIG. 4) and/or eNB 106 (not shown in FIG. 4). Messages 408 may indicate the posSIBs, and optionally, the scheduling information in SIB1 to be broadcast by eNBs 104 and/or 106, the periodicity for each posSIB and/or the maximum posSIB message size to be broadcast for each posSIB. The eNB 104 and/or eNB 106 may reserve some or all of the resources requested by messages 408 and may return LPPa messages 409 to E-SMLC 110 indicating the resources that were reserved (as shown in FIG. 4 for eNB 104 but not shown in FIG. 4 for eNB 106). LPPa messages 409 may indicate the posSIBs for which resources have been reserved or agreed by eNBs 104 and/or 106, the allowed periodicity for each posSIB and/or the maximum allowed posSIB message size to be broadcast for each posSIB.

E-SMLC 110 may send PAD, validity time, and value tags created and encoded at block 407 to eNBs 104 and 106 in LPPa messages 410. The PAD, validity time, and value tags sent in LPPa messages 410 may be based on any resources reserved in eNBs 104 and 106 by messages 408 and 409 when these messages are sent. An LPPa message 410 sent by E-SMLC 110 to eNB 104 or eNB 106 may comprise one or more posSIBs containing encoded PAD or encoded and optionally ciphered PAD and one or both of the value time and value tags for one or more posSIBs, where each posSIB is to be broadcast by one cell supported by eNB 104 or eNB 106. In addition, LPPa message 410 sent by E-SMLC 110 may include scheduling information for each PAD, which may optionally include value tags associated with each PAD (e.g. if implementation IM1 or IM2 is used). In addition, E-SMLC 110 may send LPPa messages 410 to eNBs 104 and 106 to provide updated posSIBs or updated PAD, including an updated validity time and value tag, in response to changes in PAD obtained at block 407 (e.g. caused by receipt of new or updated location information by E-SMLC 110 in message 402 and/or 406).

In one embodiment, E-SMLC 110 may encode the entire content for each posSIB including the PAD, validity time, and value tag contained in the posSIB and information related to optional ciphering of the PAD and/or optional segmentation of the posSIB (as described below). In this embodiment, the information related to optional ciphering of the PAD and optional segmentation of the posSIB may not be visible to (also referred to as being transparent to) eNBs 104 and 106 (e.g. may not be decoded or interpreted by eNBs 104 and 106). In another embodiment, E-SMLC 110 may encode the PAD and may provide information related to optional ciphering of the PAD and optional segmentation of the posSIB to eNBs 104 and 106 in separate parameters in message 410 that may be decoded and interpreted by eNBs 104 and 106.

In some implementations (e.g. in implementation IM1 or IM2), the eNBs 104 and 106 may determine the value tag if it is not provided by the E-SMLC 110 in message 410. For example, the eNBs 104 and 106 may determine whether the PAD provided in message 410 has changed with respect to a previous PAD. For example, the eNBs 104 and 106 may compare the size and/or the bit pattern of the PAD received in message 410 to that of a previous PAD to determine if the content has changed without a need to decode or interpret the positioning assistance data. In another example, the eNBs 104 and 106 may assume that each new LPPa message with the same type of PAD indicates that the content of the PAD has changed. If the PAD has changed, the eNBs 104 and 106 may determine the value tag, e.g., by incrementing a numerical value. The value tag determined by the eNBs 104 and 106 may be encoded with scheduling information associated with the PAD in a SIB1 message.

According to an embodiment, certain PAD encoded for posSIBs for transmission in LPPa messages 410 may further be encrypted by E-SMLC 110 prior to sending in messages 410 (e.g. using the Advanced Encryption Standard (AES)) according to a ciphering key (e.g. a 128 bit ciphering key). One or more posSIBs in LPPa messages 410 may be accompanied by (e.g. may contain) an indication to recipient eNB devices 104 and 106 that PAD in certain posSIBs is encrypted. For example, a posSIB may be accompanied by an identifier or identity (ID) for a particular ciphering key that was used to encrypt the PAD in the posSIB to indicate which ciphering key was used.

According to an embodiment, E-SMLC 110 may transmit one or more messages comprising ciphering keys used to encrypt PAD in posSIBs created at block 407 to one or more other nodes in a network. For example, E-SMLC 110 may transmit a message 420 to MME 108 (e.g. a Location Services Application Protocol (LCS-AP) message) containing information for ciphering keys used to encrypt PAD in posSIBs. The information for each ciphering key may comprise the ciphering key value (e.g. 128 bits for AES), an identifier for the ciphering key (e.g. an integer, character string or binary value), a time of applicability for the ciphering key (e.g. indicating a time period during which the ciphering key may be used by E-SMLC 110), a geographic area of applicability (e.g. indicating in which part of a network PAD encrypted by the ciphering key will be broadcast in posSIBs), or a combination thereof. In one embodiment, the time of applicability may comprise a start time or an end time, a duration, or a combination thereof. In another embodiment, the geographic area of applicability may comprise at least one cell for the network, at least one location area for the network, at least one tracking area for the network, or at least one geographic area defined using coordinates (e.g. latitude and longitude coordinates).

According to an embodiment, MME 108 may forward to UEs 102 at least a portion of the information for ciphering keys used to encrypt PAD in posSIBs that was received in one more messages 420. Parameters that are forwarded for each ciphering key may comprise the ciphering key value (e.g. 128 bits for AES), an identifier for the ciphering key (e.g. an integer, character string or binary value), a time of applicability for the ciphering key (e.g. indicating a duration during which the ciphering key may be used by E-SMLC 110), a geographic area of applicability (e.g. indicating in which part of a network PAD encrypted by the ciphering key may be broadcast in posSIBs), or a combination thereof. These parameters may be forwarded to a UE 102 as part of a mobility management (MM) procedure 422. For example, MME 108 may forward at least a portion of the contents of messages 420 to UE 102 in the course of a particular procedure such as an Attach procedure, Tracking Area Update (TAU) procedure or Service Request mobility management procedure, just to provide a few examples. Here, MME 108 may forward at least a portion of the contents of messages 420 (e.g., ciphering keys used to encrypt PAD in posSIBs along with identifiers of the ciphering keys, a time of applicability, a geographic area of applicability, or a combination thereof) to UE 102 in a Non-Access Stratum (NAS) Attach Accept message, a NAS TAU Accept message, a NAS Authentication Response message, a Downlink NAS Transport message, a Downlink Generic NAS Transport message and/or a NAS Service Accept message.

In one embodiment, in order to avoid sending information for ciphering keys used to encrypt PAD to a UE that does not have a subscription for receiving ciphered PAD, MME 108 may only send the information for ciphering keys to UE 102 using MM procedure 422 if subscription data for UE 102 (e.g. received from HSS 145) indicate that UE 102 has a subscription to receive ciphered PAD. Further, MME 108 may only send ciphering key information to UE 102 for particular posSIBs for which UE 102 has a subscription to receive ciphered PAD. Furthermore, in order to avoid sending information for ciphering keys used to encrypt PAD to a UE 102 that either does not need the information or has previously received the information, MME 108 may only send the information for ciphering keys to UE 102 if UE 102 provides a request or indication that the ciphering key information is needed. For example, in an embodiment of MM procedure 422, UE 102 may include an indication in a NAS Attach Request, a NAS TAU Request, a NAS Service Request or a NAS Registration Request that ciphering key information for PAD is needed or requested. The indication may be included by UE 102 when UE 102 needs the PAD (e.g. to assist location of UE 102) and when any previous ciphering key information provided to UE 102 by MME 108 (or by another MME) is no longer valid. For example, UE 102 may determine that previous ciphering key information provided to UE 102 by MME 108 (or by another MME) is no longer valid when a time of applicability for the previous ciphering key information has expired, when UE 102 moves outside a geographic area of applicability for the previous ciphering key information, or when UE 102 receives one or more posSIBs broadcast by eNB 104 (or another eNB such as eNB 106) which contain ciphered PAD and an indication that the PAD is ciphered using a ciphering key for which UE 102 does not have ciphering key information. MME 108 may then only send the ciphering key information to UE 102 (e.g. in a NAS Attach Accept, NAS TAU Accept or NAS Registration Accept message) when the indication is received from UE 102, which may avoid using signaling resources to unnecessarily send ciphering key information.

In order to provide a UE 102 with information in advance concerning posSIB messages 414 such as the timing, content, and optionally, whether the PAD content has changed with respect to a previous PAD, an eNB 104 and/or eNB 106 may broadcast scheduling information 412 to UE 102. Scheduling information 412 broadcast by eNB 104 or eNB 106 may indicate whether each PAD encoded in particular posSIB messages 414 has changed, e.g., via the value tag, as well as when particular posSIB messages 414 will later be broadcast by eNB 104 or eNB 106, respectively, and may include a periodicity for the particular posSIB messages 414 and/or an indication of the content of the particular posSIB messages 414 (e.g. such as the GNSS(s) for which assistance data in posSIB messages 414 applies, the RTCM message types that are included in the posSIB messages 414 and/or whether ciphering is used). UE 102 may receive the scheduling information 412 and based on UE 102 capabilities and UE 102 need or usage for particular assistance data, e.g., if a particular PAD has been updated, may decide which posSIB messages 414 the UE 102 will later receive and store. For example, after the validity time for a particular PAD that was previously received has expired, the UE 102 may begin to read periodically broadcast scheduling information 412 to determine if the content of the particular PAD has changed, as indicated by the value tag in the scheduling information. When the value tag in the scheduling information 412 indicates the particular PAD has changed, UE 102 may receive, decode, and optionally decipher, the appropriate posSIB message 414 to update the particular PAD. In some embodiments, scheduling information 412 may be periodically broadcast by eNB 104 and/or eNB 106 in a SIB 1 message (also referred to as SIB1) as defined for RRC in 3GPP TS 36.331.

According to an embodiment, eNBs 104 and 106 may broadcast downlink messages 414 to UE 102 including, for example, PAD, and one or both of the validity time and value tag, encoded into posSIBs obtained from messages 410 received from E-SMLC 110. In an embodiment, downlink messages 414 may comprise messages (e.g. SI messages) for the Radio Resource Control (RRC) protocol defined in 3GPP TS 36.331. In this embodiment, an RRC message (e.g. an SI message) may comprise a single posSIB, where the posSIB may comprise (i) the encoded and optionally ciphered PAD, and one or both of the validity time and value tag, created by E-SMLC 110 at block 407, and optionally (ii) an indication of ciphering (e.g. a ciphering key identity). In an implementation, eNB 104 may provide a list of desired posSIBs (e.g., together with control parameters such as repetition rate, maximum posSIB size, etc.) to E-SMLC 110 in messages 406. As pointed out above, block 407 may encode posSIBs for PAD tailored for particular cells. As illustrated in FIG. 4, eNB 104 may include PAD for a first cell encoded in a posSIB SIBX$_1$ in a first downlink message 414 that is broadcast in the first cell, while eNB 106 may include PAD for a second cell encoded in a posSIB SIBX$_2$ in a second downlink message 414 that is broadcast in the second cell. The PAD in posSIBs SIBX$_1$ and SIBX$_2$ may be encoded according to the LPP protocol and the posSIB (including the already encoded PAD) may be further encoded according to the RRC protocol. As pointed out above, PAD encoded in posSIBs SIBX$_1$ and SIBX$_2$ may each comprise a subset of assistance data for one LPP position method (e.g. such as GNSS, OTDOA or RTK).

In some implementations, the value tag may be present in the downlink messages 414 SIBX$_1$ and SIBX$_2$ instead of the scheduling information 412. For example, a value tag associated with each PAD may be included in the control information in the posSIBs SIBX$_1$ and SIBX$_2$. Thus, for example, after the validity time for a particular PAD that was previously received has expired, the UE 102 may read the periodically broadcast scheduling information 412 to determine when the posSIB containing the particular PAD will next be broadcast. The UE 102 may acquire the downlink message 414 with the relevant posSIB and may decode the control information to determine if the value tag has changed, indicating that the particular PAD has changed. When the value tag in the control information in the downlink message 414 indicates the particular PAD has changed, UE 102 may then decode, and optionally decipher, the appropriate assistance data element in the posSIB message in the downlink message 414 to update the particular PAD. It should be noted, that while UE 102 must acquire and decode the control information in each broadcast of the relevant posSIB message after the validity time for the particular PAD has expired, the UE 102 does not need to decode or decipher the actual assistance data element in the posSIB message unless the value tag indicates that the particular PAD has changed.

Thus, in a typical sequence of operation, the UE 102 acquires the Pos-SchedulingInfoList in the scheduling information 412, e.g., in in SIB1. From this, the UE 102 knows which posSIBs are available and when the posSIBs are scheduled. The UE also knows which posSIBs are ciphered, and can check whether it has a valid subscription or ciphering key. Considering the UE capabilities, the target use case, and the UE subscription, a UE 102 may typically be interested in (or can receive) only a sub-set of the available assistance data at a particular time. The UE 102 may acquire the positioning SI message(s) in downlink message 414 containing the currently desired assistance data IEs (posSIBs). Each positioning SI message includes one or more PositioningSystemInformationBlockType IEs as shown in Table 2, which may include the assistanceDataSIBelement OCTET STRING. The UE 102 may decode the AssistanceDataSIBelement OCTET STRING as shown in Table 3 and may obtain the control information, e.g., including the valueTag, the validityTime, the cipheringKeyData, and the segmentationInfo. The UE 102 may further obtain the assistanceDataElement OCTET STRING. The UE 102 may check the control information including the valueTag and/or validityTime to determine whether to proceed with deciphering and decoding of the assistanceDataElement, which is the 2nd OCTET STRING in the overall posSIB. If the valueTag has not changed, and/or the validityTime has not expired (and/or the UE 102 has no ciphering key), the UE 102 stops the processing. Otherwise, the UE 102 may decipher the assistanceDataElement OCTET STRING (possibly after assembling all segments in case of octet string segmentation). The UE 102 decodes (e.g. according to ASN.1 rules) the deciphered OCTET STRING and processes the received assistance data fields. The steps of deciphering and decoding the assistanceDataElement need only occur when the valueTag IE (or validityTime IE if the valueTag IE is not present) indicates that a posSIB of interest has changed (or is about to change). Moreover, the steps of acquiring the positioning SI message and obtaining and checking the control information need only occur when the validityTime IE (if included) for a previously acquired posSIB of interest indicates that a change to the posSIB is imminent. The most processor intensive steps are the deciphering and decoding the assistanceDataElement due to performing decoding and possibly deciphering of an entire posSIB segment. However, these steps need only occur when the positioning assistance data has changed. The less processor intensive steps of acquiring the positioning SI message and obtaining and checking the control information need only occur when a change to posSIB content is imminent, and thus possibly with a few unnecessary iterations according to how a UE is implemented and how precisely a location server is able to indicate the validity time.

Further as pointed out above, PAD in posSIBs SIBX$_1$ and SIBX$_2$ may have been encrypted at block 407 according to ciphering keys. In that case, posSIBs $SIBX_1$ and $SIBX_2$ may further comprise an indication of ciphering (e.g., including an identifier of a ciphering key).

In some embodiments, in order to avoid broadcast of posSIB messages 414 exceeding some maximum size (e.g. 100 to 280 octets), eNB 104 and/or eNB 106 may segment an encoded and optionally a ciphered posSIB, that is received in an LPPa message 410 from E-SMLC 110, into two or more segments and may transmit each segment as a separate posSIB message 414. Here, each transmitted posSIB message 414 may include information about the segmentation such as whether segmentation is used, a segment number and/or a final segment indication. A UE 102 receiving posSIB messages 414 containing posSIB segments may reassemble the complete posSIB message by receiving all segments 414 and using the included segmentation information to determine which posSIB messages 414 to reassemble into the complete posSIB message.

In some embodiments, segmentation of posSIB messages 414 may be performed by E-SMLC 110 and not by eNBs 104 and 106 by sending of separate posSIB message segments or separate PAD segments to eNBs 104 and 106 in LPPa messages 410. E-SMLC 110 may segment posSIB messages 414 or PAD messages in two alternative ways. With "octet segmentation" (or "octet level segmentation" or "octet string segmentation"), E-SMLC 110 may segment posSIB message 414 or PAD by splitting a sequence of octets for posSIB message 414 or a PAD message into two or more sequences of octets where the content or values of the octets and the ordering of the octets are unchanged. With "pseudo-segmentation", E-SMLC 110 may split the assistance data to be contained in a posSIB message 414 into separate sets of assistance data with either no overlap or minimal overlap of assistance data between the separate sets and may encode each set of assistance data in a separate posSIB message or a separate PAD message where each separate posSIB message or each separate PAD message may be a well formed message (e.g. a well formed ASN.1 message). E-SMLC 110 may then send the separate posSIB messages or separate PAD messages to eNBs 104 and 106 in messages 410 with each separate posSIB message or each separate PAD message being treated by eNBs 104 and 106 as if the separate message is an entire posSIB message.

As pointed out above, E-SMLC 110 may provide updates to PAD encoded in posSIBs for particular cells in LPPa messages 410. For example, if eNB 104 or eNB 106 receives LPPa messages 410 with updates to PAD for $SIBX_1$ or $SIBX_2$ for a particular cell or particular geographic area, the eNB 104 may cease broadcasting a previous version of $SIBX_1$ or $SIBX_2$ for the particular cell or geographic area, and may commence broadcasting the $SIBX_1$ or $SIBX_2$ comprising the updated PAD instead. The eNBs 104 and 106 may additionally update the value tag, if the value tag is determined by the eNB 104.

UE 102 may receive PAD encoded and optionally ciphered in broadcast downlink messages 414 in SIBs $SIBX_1$ and/or $SIBX_2$. For example, UE 102 may receive (or receive an indication of) one or more posSIBs containing PAD that are broadcast by eNB 104 in a serving cell for UE 102. UE 102 may then determine which posSIBs to receive and decode based on (i) configured information in UE 102 concerning the position method(s) and PAD supported by each posSIB, (ii) UE 102 capability to support the position method(s) and PAD in each posSIB, (iii) whether UE 102 may already possess the PAD, and/or (iv) whether UE 102 needs PAD at the current time or in the near future in order to obtain location measurements or compute a location estimate. Depending on this determination, UE 102 may decode PAD from SIBs $SIBX_1$ and/or $SIBX_2$ for use in positioning operations described below in conjunction with FIG. 5. In an embodiment, UE 102 may associate a ciphering key identifier in a SIB $SIBX_1$ and/or $SIBX_2$ with a ciphering key (obtained from Mobility Management Procedure 422 as discussed above) for use in decrypting encrypted PAD in the SIB prior to decoding the PAD. UE 102 may then perform positioning operations in communication with E-SMLC 110 as described below with reference to FIG. 5.

Figure 5:
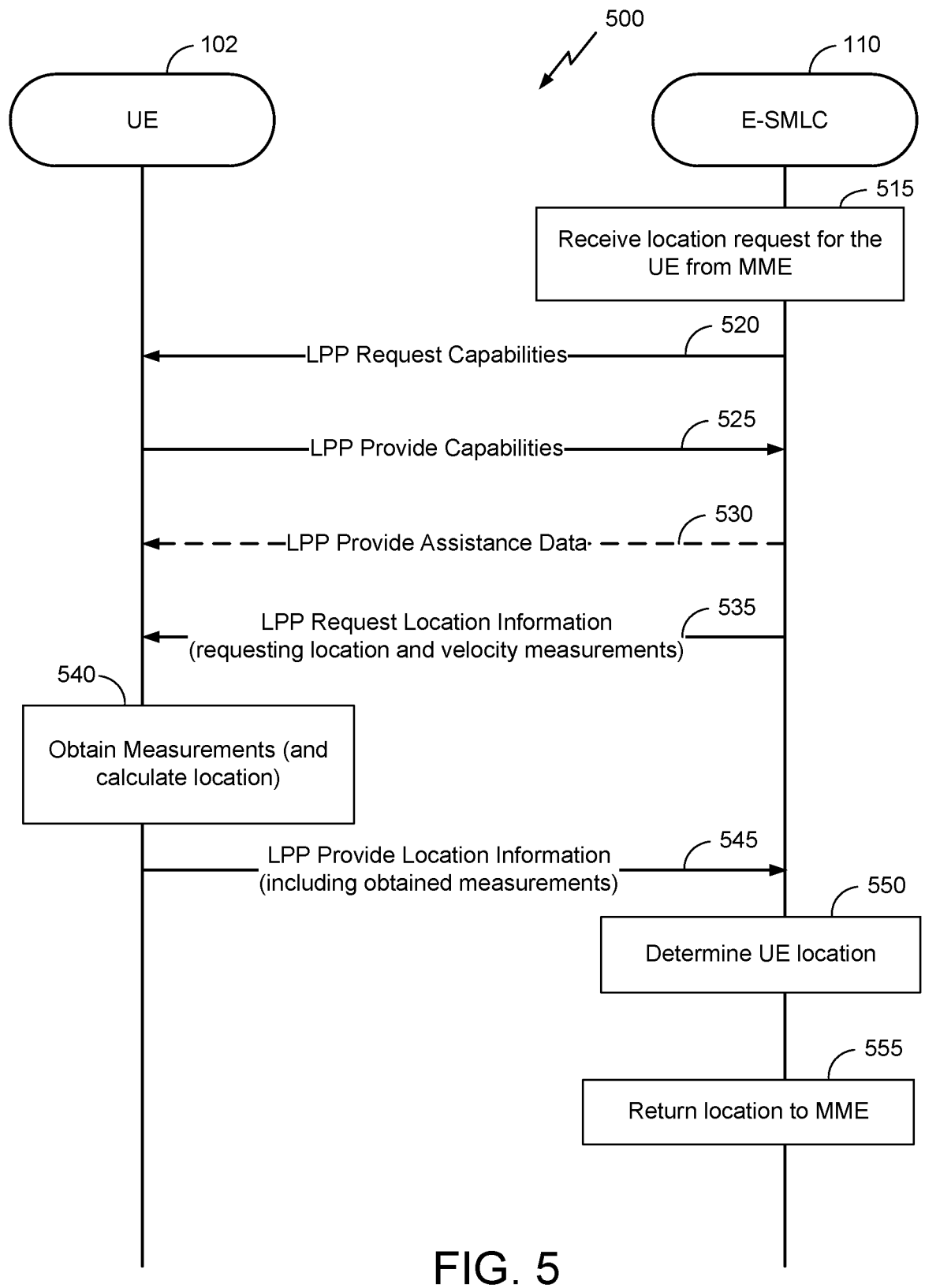

FIG. 5 shows a signaling flow 500, applicable to communication system 100 shown in FIG. 1A, illustrating communication between the UE 102 and the E-SMLC 110 that may take place in accordance with the techniques provided herein. It can be noted that here, messages are provided in accordance with the 3GPP LPP protocol as an example. However, embodiments are not so limited (e.g. NPP or a combination of LPP and LPPe, referred to as LPP/LPPe, might be used in another embodiment).

At block 515, the process may be initiated when the E-SMLC 110 receives a location request for the UE 102—e.g. from the External Client 150 via the GMLCs 116 and 148 and MME 108.

At action 520, the E-SMLC 110 may send an LPP Request Capabilities message to the UE 102. The UE 102 can respond in accordance with the LPP protocol by providing various location-related capabilities, such as capabilities to support different position methods such as Assisted GNSS (A-GNSS), OTDOA, RTK, Enhanced Cell ID (ECID), and to support different network measurements and assistance data etc. These capabilities are provided by UE 102 at action 525 in the LPP Provide Capabilities message sent by the UE 102 to the E-SMLC 110.

At action 530, the E-SMLC 110 may send the UE 102 an LPP Provide Assistance Data message, in response to receiving the LPP Provide Capabilities message at action 525. Here, PAD provided in the LPP Provide Assistance Data message can be commensurate with the capabilities of the UE 102, as indicated in the LPP Provide Capabilities message. For example, if the UE 102 indicates that it is capable of obtaining location-related measurements for OTDOA, the E-SMLC 110 may provide a list of nearby cells (e.g. based on a current serving cell or serving eNB 104 for the UE 102) and information (e.g. timing, frequency, bandwidth) for signals (e.g. PRS or CRS signals) transmitted within these cells by corresponding base stations (e.g. eNB 104 and eNB 106), which may enable RSTD measurements by UE 102. Similarly, if UE 102 indicates support of A-GNSS in the LPP Provide Capabilities message sent at action 525, the E-SMLC 110 may include information for visible satellites 160 in the LPP Provide Assistance Data message sent at action 530. PAD provided in the LPP Provide Assistance Data message at action 530 may omit assistance data that is broadcast by eNBs 104 and 106 (e.g. in messages 414 in signaling flow 400). In some embodiments, action 530 may not occur—e.g. because all needed assistance data is broadcast by eNBs 104 and 106 in posSIBs (e.g. in messages 414 and without ciphering), and possibly if the LPP Provide Capabilities message sent at action 525 indicates that UE 102 supports reception of broadcast messages containing PAD. In one embodiment, action 530 may be preceded by UE 102 sending an LPP Request Assistance Data message to E-SMLC 110 to request assistance data (not shown in FIG. 5). In this embodiment, UE 102 may only request assistance data that is supported by UE 102 but is not received from eNB 104 and/or eNB 106 via broadcast (e.g. in the broadcast messages 414).

At action 535, the E-SMLC 110 sends an LPP Request Location Information message to the UE 102. Here, the E-SMLC 110 may request location-related measurements (e.g. measurements for A-GNSS, OTDOA and/or RTK). In some embodiments, the LPP Request Location Information message may request that UE 102 compute a location estimate from these measurements (e.g. if the position method is UE based OTDOA or UE based A-GNSS) and may also include a requested accuracy for any location measurements or location estimate and/or a maximum response time.

At block 540, the UE 102 may obtain measurements requested at action 535. Location related measurements obtained by UE 102 may be obtained for RF signals transmitted by eNBs 104 and 106 and/or satellites 160. For example, location related measurements may include measurements of RSTD obtained by measuring PRS or other reference signals (e.g. CRS signals) transmitted by eNBs 104 and 106, measurements of RTT obtained by measuring signals transmitted from and/or to eNBs 104 and 106, and/or measurements of pseudorange, code phase or carrier phase obtained by measuring one or more navigation signals transmitted by each of one or more satellites 160. In some embodiments, UE 102 may also calculate a location estimate based on the obtained location measurements. The UE 102 may use PAD broadcast by eNBs 104 and 106 (e.g. in messages 414) and/or assistance data received at action 530 to help obtain the location measurements and/or determine any location estimate.

At action 545, information indicative of one or more location-related measurements (e.g. a location estimate or the location measurements) is sent to the E-SMLC 110 by the UE 102 in an LPP Provide Location Information message.

At block 550, the E-SMLC 110 can use the measurement information received at action 545 (comprising one or more location-related measurements or a location estimate) to determine (e.g. calculate or verify) an estimated location of the UE 102. The determined location estimate (and any accompanying uncertainty or expected error, if determined) may then be returned to the requesting entity at block 555.

In an embodiment applicable to the techniques described for FIGS. 2-5, assistance data for GNSS positioning may be split into common assistance data, independent of a particular GNSS, and GNSS specific assistance data, where the GNSS is indicated via a GNSS ID. All SIBs (except SIB1) for LTE access may be contained in SI messages. Each SI message may be transmitted periodically in time domain windows (SI-window) and SI-windows for different SI messages may not overlap. The length of the SI-window may be defined in a SIB1 and common for all SI messages. The scheduling information in SIB1 may allow a UE 102 to find an SI message to read the actual posSIB(s) contained in the SI message. For example, a maximum of 32 SI messages may be generated for a particular cell by an eNB 104 or 106 (maxSI-Message), each containing a maximum of 32 SIBs (maxSIB).

For generic GNSS Assistance Data elements, scheduling information may be defined, which includes the GNSS-ID (and possibly SBAS-ID) as shown by the example in Table 1

For each LPP assistance data element, a separate posSIB may be defined as exemplified in Table 13 (which also includes assistance data elements for RTK).

TABLE 13

| | pos-sib-type | assistanceDataElement |
|---|---|---|
| GNSS Common Assistance Data | posSibType1-1 | GNSS-Reference Time |
| | posSibType1-2 | GNSS-ReferenceLocation |
| | posSibType1-3 | GNSS-IonosphericModel |
| | posSibType1-4 | GNSS-EarthOrientationParameters |
| | posSibType1-5 | GNSS-RTK-ReferenceStationInfo |
| | posSibType1-6 | GNSS-RTK-CommonObservationInfo |
| | posSibType1-7 | GNSS-RTK-AuxiliaryStationData |
| GNSS Generic Assistance Data | posSibType2-1 | GNSS-TimeModelList |
| | posSibType2-2 | GNSS-DifferentialCorrections |
| | posSibType2-3 | GNSS-NavigationModel |
| | posSibType2-4 | GNSS-RealTimeIntegrity |
| | posSibType2-5 | GNSS-DataBitAssistance |
| | posSibType2-6 | GNSS-AcguisitionAssistance |
| | posSibType2-7 | GNSS-Almanac |
| | posSibType2-8 | GNSS-UTC-Model |
| | posSibType2-9 | GNSS-AuxiliaryInformation |
| | posSibType2-10 | BDS-DifferentialCorrections |
| | posSibType2-11 | BDS-GridModelParameter |
| | posSibType2-12 | GNSS-RTK-Observations |
| | posSibType2-13 | GLO-RTK-BiasInformation |
| | posSibType2-14 | GNSS-RTK-MAC-CorrectionDifferences |
| | posSibType2-15 | GNSS-RTK-Residuals |
| | posSibType2-16 | GNSS-RTK-FKP-Gradients |
| | posSibType2-17 | GNSS-SSR-OrbitCorrections |
| | posSibType2-18 | GNSS-SSR-ClockCorrections |
| | posSibType2-19 | GNSS-SSR-CodeBias |
| OTDOA Assistance Data | posSibType3-1 | OTDOA-UE-Assisted |
| | poaSibType3-2 | OTDOA-UE-Based |

All posSIBs exemplified in Table 13 could be added to the SystemInformation-r8-IEs ASN.1 IE in RRC in 3GPP TS 36.331.

The techniques described previously in association with Tables 3 to 8 and FIGS. 2-5 may also be used to support broadcasting (e.g. by an eNB 104, eNB 106 or gNB 111) of location assistance data to a UE 102, where the location assistance data contains data defined according to message types defined by the Radio Technical Commission for Maritime Services (RTCM). Such location assistance data may be used to support RTK and/or PPP positioning of UE 102

In one implementation, UE-based OTDOA assistance data definitions may also be used in LPP. However, in order to allow UE-assisted and UE-based OTDOA assistance data to be broadcast separately, position calculation information elements may be added to the top level assistance data as shown by the example in Table 14 which is based on ASN.1 encoding.

TABLE 14

```
-- ASN1START
OTDOA-ProvideAssistanceData ::= SEQUENCE {
    otdoa-ReferenceCellInfo         OTDOA-ReferenceCellInfo       OPTIONAL, -- Need ON
    otdoa-NeighbourCellInfo         OTDOA-NeighbourCellInfoList   OPTIONAL, -- Need ON
    otdoa-Error                     OTDOA-Error                   OPTIONAL, -- Need ON
    ...,
    [[
        otdoa-ReferenceCellInfoNB-r14     OTDOA-ReferenceCellInfoNB-r14    OPTIONAL, -- Need ON
        otdoa-NeighbourCellInfoNB-r14     OTDOA-NeighbourCellInfoListNB-r14 OPTIONAL  -- Need ON
    ]],
```

TABLE 14-continued

```
[[
    positionCalculationInfo-r15
    PositionCalculationInfo-r15        OPTIONAL, --
Cond ue-based
    positionCalculationInfoNB-r15
    PositionCalculationInfoNB-r15      OPTIONAL -- Cond
ue-based
    ]]
}
-- ASN1STOP
```

For the broadcast of OTDOA assistance data for LTE, it may further be advantageous to place UE-based and UE-assisted assistance data into different posSIBs, to separate Narrowband (NB) and Wideband (WB) related assistance data and to support ciphering on a per posSIB basis.

In one embodiment, it may be advantageous to include a single octet (or bit string) for PAD in a posSIB rather than to include several separate octet (or bit) strings. For example, if separate octet strings in the same posSIB were ciphered in combination (e.g. after being concatenated), the ciphering could be more complex, particularly when segmentation was used. Alternatively, if separate octet strings in the same posSIB were independently ciphered, the ciphering could be weakened due to reuse of the same ciphering procedure (e.g. same cipher code sequence) for the separate octet strings. As an illustration of this, ciphering methods such as AES counter mode and Data Encryption Standard (DES) perform ciphering through an exclusive OR (XOR) binary operation of the unciphered data with a cipher sequence derived from the cipher key and a counter (for AES) or an initial value (IV) (for DES). If the separate octet strings are ciphered in the same way (using the same cipher sequence for each octet string separately) and if some of the unciphered data is known in advance, it may become possible to recover some of the cipher sequence and use that to decipher other data. For example, if reference cell data for OTDOA hardly ever changes and can be known in advance, it could be used to recover part of the cipher sequence (by an XOR operation) and then to decipher neighbor cell data for OTDOA using the known cipher sequence.

Figure 6:
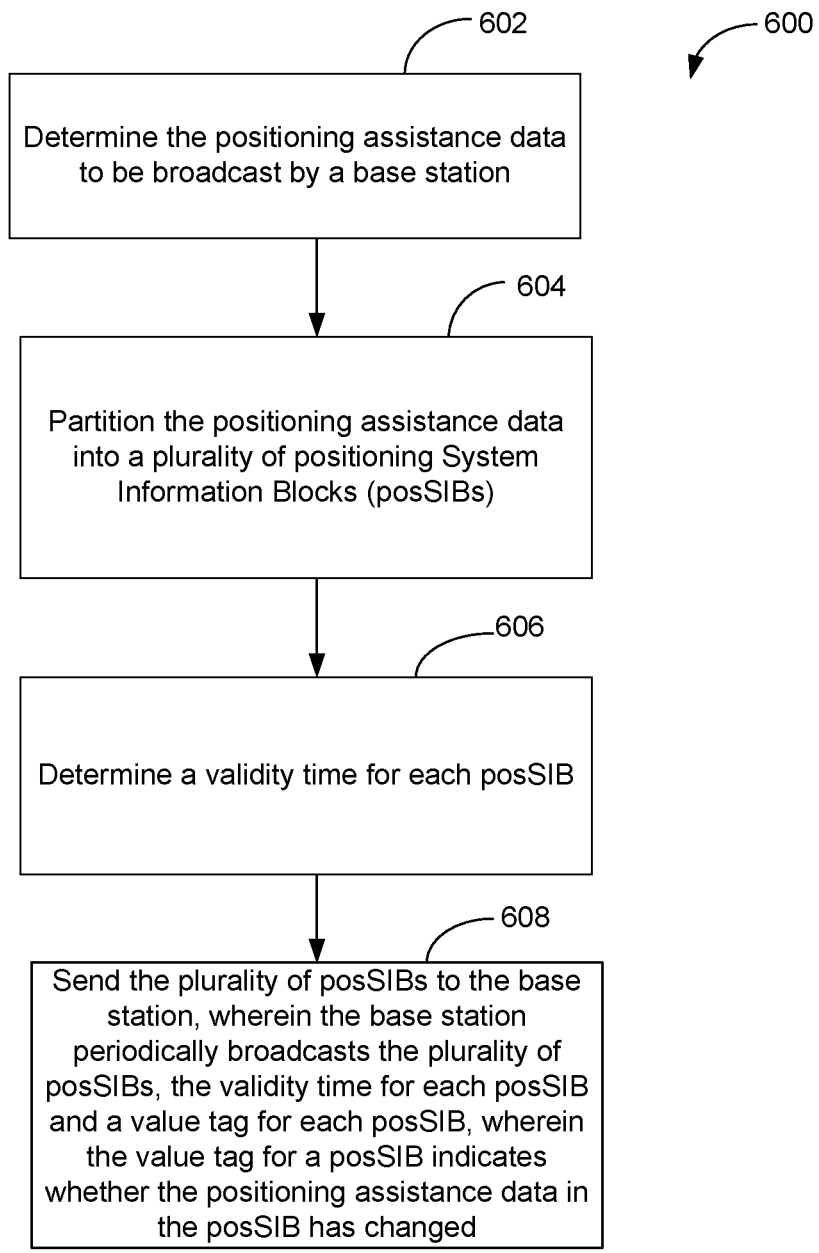
FIGS. 6 through 8 are flow diagrams for processes for supporting broadcast of positioning assistance data according to various embodiments.

FIG. 6 is a flow diagram of a process 600 for broadcasting positioning assistance data (PAD) in a wireless network that may be performed by a location server such as an E-SMLC (e.g. E-SMLC 110) or an LMF (e.g. LMF 184) according to an embodiment. Process 600 may start at block 602, which may comprise determining the positioning assistance data to be broadcast by a base station (e.g. a eNB 104 or 106, a gNB 111 or an ng-eNB) by, for example, performing actions described above for block 407 in signaling flow 400 and/or for stage 1 for signaling flow 200. Block 604 may comprise partitioning the positioning assistance data into a plurality of positioning System Information Blocks (posSIBs), as described above for block 407 in signaling flow 400 and/or for stage 1 for signaling flow 200. Block 606 may comprise determining a validity time for each posSIB, described above for block 407 or for stage 1 for signaling flow 200. At block 608, the location server may send the plurality of posSIBs to the base station, e.g., as described above at message 410 in signaling flow 400 and/or stage 2 for signaling flow 200, where the base station periodically broadcasts the plurality of posSIBs, the validity time for each posSIB and a value tag for each posSIB, and where the value tag for a posSIB indicates whether the positioning assistance data in the posSIB has changed, e.g., which may correspond to one or both of scheduling message 412 and downlink message 414 in signaling flow 400 and/or to broadcasting posSIB messages using RRC for stage 3 of signaling flow 200.

In an aspect, each posSIB in the plurality of posSIBs is assigned to one positioning System Information (positioning SI) message in a plurality of positioning SI messages. The base station periodically broadcasts the plurality of posSIBs by periodically broadcasting the plurality of the positioning SI messages, where, for each posSIB assigned to a positioning SI message, the positioning SI message comprises an entire posSIB when the posSIB is not segmented or a segment of the posSIB when the posSIB is segmented into a plurality of posSIB segments, where consecutive broadcasts of the positioning SI message comprise consecutive segments of the plurality of posSIB segments when the posSIB is segmented. Additionally, in one aspect, the process 600 may further comprise including at least one of the validity time or the value tag for at least one posSIB in the at least one posSIB. For example, both the validity time and the value tag for the at least one posSIB may be included in the at least one posSIB. Both the validity time and the value tag may be included as part of the positioning assistance data in the at least one posSIB, wherein the validity time and the value tag are transparent to the base station. For example, the positioning assistance data, the validity time and the value tag may be defined according to an LTE Positioning Protocol (LPP) or an NR Positioning Protocol (NPP). The process 600 may further comprise segmenting the at least one posSIB into a plurality of posSIB segments for the at least one posSIB; and including the validity time and the value tag for the at least one posSIB in only one of the plurality of posSIB segments. For example, the only one of the plurality of posSIB segments may be the first posSIB segment. The segmenting the at least one posSIB into the plurality of posSIB segments may comprise octet string segmentation or pseudo-segmentation. The at least one posSIB may not be segmented or may be segmented using octet string segmentation.

In one aspect, the process 600 may further comprise segmenting at least one posSIB into the plurality of posSIB segments for the posSIB using pseudo-segmentation; and including at least one of the validity time or the value tag for the posSIB in at least one of the plurality of posSIB segments, for example in the first posSIB segment.

In one aspect, the base station periodically broadcasts scheduling information for the plurality of positioning SI messages, the scheduling information for each positioning SI message including the periodicity of broadcast of the positioning SI message and an identification of each posSIB assigned to the positioning SI message. The scheduling information for each positioning SI message may include at least one of the validity time or the value tag for each posSIB assigned to the positioning SI message. The value tag for each posSIB may be included in the scheduling information and the validity time for each posSIB may be included in each posSIB. In one embodiment, a single value tag may be included in the scheduling information for each positioning SI message that applies to all posSIBs included in the positioning SI message and that indicates a change in any of these posSIBs, e.g. as described for implementation IM1. In another embodiment, a single value tag may be included in the scheduling information for each positioning SI message for each posSIB included in the positioning SI message that indicates a change in this posSIB, e.g. as described for implementation IM2.

The scheduling information for each positioning SI message may include the value tag for each posSIB assigned to the positioning SI message, and the process 600 may further comprise determining the value tag for each posSIB in the plurality of posSIBs; and including the value tag for each posSIB in the plurality of posSIBs when sending the plurality of posSIBs to the base station. The base station may determine the value tag for each posSIB in the plurality of posSIBs based on determining whether the positioning assistance data in the each posSIB in the plurality of posSIBs has changed.

In one aspect, the value tag for a posSIB may comprise a numeric value which remains unchanged while positioning assistance data in the posSIB is unchanged and is changed when positioning assistance data in the posSIB is changed.

In one aspect, the validity time may comprise at least one of a start time, a duration, an end time or some combination thereof.

In one aspect, the process 600 may further comprise determining the assignment of each posSIB in the plurality of posSIBs to the one positioning SI message in the plurality of positioning SI messages; determining the periodicity of each positioning SI message; and including information on the assignment of each posSIB to the one positioning SI message and the periodicity of each positioning SI message when sending the plurality of posSIBs to the base station.

In one aspect, the process 600 may further comprise segmenting at least one posSIB in the plurality of posSIBs into the plurality of posSIB segments for the posSIB; and including the plurality of posSIB segments for the posSIB when sending the plurality of posSIBs to the base station.

In one aspect, the base station may be an evolved NodeB (eNB) for 3rd Generation Partnership Project (3GPP) Long Term Evolution (LTE), e.g. the eNB 104 or eNB 106, or a New Radio (NR) NodeB (gNB) for 3GPP NR, e.g. a gNB 111. The sending the plurality of posSIBs to the base station at block 608 may comprise sending an LTE Positioning Protocol A (LPPa) message or an NR Positioning Protocol A (NRPPa) message.

In one aspect, the positioning assistance data may comprise assistance data for at least one position method. For example, the at least one position method may comprise a position method supported by an LTE Positioning Protocol (LPP) or an NR Positioning Protocol (NPP) or by message types defined by the Radio Technical Commission for Maritime Services (RTCM). For example, the at least one position method may comprise User Equipment (UE) assisted Observed Time Difference of Arrival (OTDOA) for wideband LTE, UE assisted OTDOA for narrowband LTE, UE based OTDOA for wideband LTE, UE based OTDOA for narrowband LTE, UE assisted OTDOA for NR, UE based OTDOA for NR, UE based Assisted Global Navigation Satellite System (A-GNSS), UE assisted A-GNSS, UE assisted Real Time Kinematic (RTK), or UE based RTK, UE assisted Precise Point Positioning (PPP), or UE based PPP.

Figure 7:
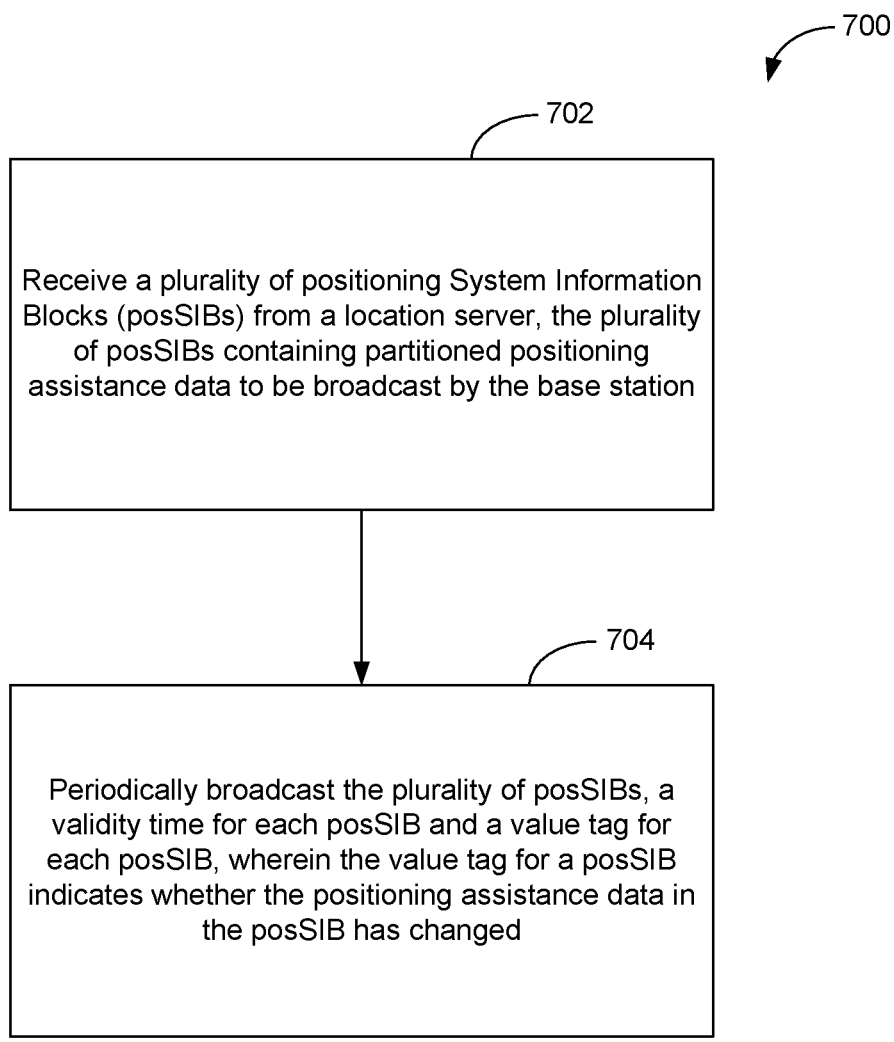

FIG. 7 is a flow diagram of a process 700 for broadcasting positioning assistance data (PAD) in a wireless network that may be performed by a base station such as an eNB (e.g. eNB 104 or 106), a gNB (e.g. gNB 111) or an ng-eNB. Process 700 may start at block 702, which may comprise receiving a plurality of positioning System Information Blocks (posSIBs) from a location server, e.g., an E-SMLC such as E-SMLC 110 or an LMF such as LMF 184, the plurality of posSIBs containing partitioned positioning assistance data to be broadcast by the base station. Block 702, for example, may correspond to receiving one or more messages 410 in signaling flow 400 and/or may correspond to stage 2 of signaling flow 200 and/or to stage 1 of FIG. 3B. In an implementation, the posSIB may comprise PAD specifically tailored to a particular cell for the base station. Block 704 may comprise periodically broadcasting the plurality of posSIBs, a validity time for each posSIB and a value tag for each posSIB, wherein the value tag for a posSIB indicates whether the positioning assistance data in the posSIB has changed. Block 704 may correspond to, e.g., one or both of scheduling message 412 and downlink message 414 in signaling flow 400 and/or to broadcasting posSIB messages using RRC for stage 3 of signaling flow 200.

In an aspect, each posSIB in the plurality of posSIBs is assigned to one positioning System Information (positioning SI) message in a plurality of positioning SI messages. The base station periodically broadcasts the plurality of posSIBs by periodically broadcasting the plurality of the positioning SI messages, wherein, for each posSIB assigned to a positioning SI message, the positioning SI message comprises an entire posSIB when the posSIB is not segmented or a segment of the posSIB when the posSIB is segmented into a plurality of posSIB segments, wherein consecutive broadcasts of the positioning SI message comprise consecutive segments of the plurality of posSIB segments when the posSIB is segmented. In one aspect, at least one of the validity time or the value tag for at least one posSIB is included in the at least one posSIB. In one aspect, both the validity time and the value tag for the at least one posSIB are included in the at least one posSIB. Both the validity time and the value tag may be included as part of the positioning assistance data in the at least one posSIB, wherein the validity time and the value tag are transparent to the base station. For example, the positioning assistance data, the validity time and the value tag may be defined according to an LTE Positioning Protocol (LPP) or an NR Positioning Protocol (NPP). The at least one posSIB may be segmented into a plurality of posSIB segments for the at least one posSIB; wherein the validity time and the value tag for the at least one posSIB may be included in only one of the plurality of posSIB segments. The only one of the plurality of posSIB segments may be the first posSIB segment. The at least one posSIB may be segmented into the plurality of posSIB segments using octet string segmentation or pseudo-segmentation. The at least one posSIB may not be segmented or may be segmented using octet string segmentation.

In one aspect, at least one posSIB is segmented into the plurality of posSIB segments for the posSIB using pseudo-segmentation; and at least one of the validity time or the value tag for the posSIB is included in at least one of the plurality of posSIB segments.

In one aspect, process 700 further comprises periodically broadcasting scheduling information for the plurality of positioning SI messages, the scheduling information for each positioning SI message including the periodicity of broadcast of the positioning SI message and an identification of each posSIB assigned to the positioning SI message. In one aspect, at least one of the validity time or the value tag for each posSIB assigned to the each positioning SI message may be included in the scheduling information for the each positioning SI message. The value tag for the each posSIB may be included in the scheduling information and the validity time for the each posSIB may be included in the each posSIB. The scheduling information for the each positioning SI message may include the value tag for the each posSIB assigned to the each positioning SI message, wherein the value tag for the each posSIB in the plurality of posSIBs is received from the location server. The process 700 may further include determining the value tag for each posSIB in the plurality of posSIBs by determining whether the positioning assistance data in the each posSIB in the plurality of posSIBs has changed.

In one aspect, the value tag for a posSIB comprises a numeric value which remains unchanged while positioning assistance data in the posSIB is unchanged and is changed when positioning assistance data in the posSIB is changed.

In one aspect, the validity time comprises at least one of a start time, a duration, an end time or some combination thereof.

In one aspect, the process 700 may further comprise receiving information on the assignment of each posSIB in the plurality of posSIBs to the one positioning SI message in the plurality of positioning SI messages and the periodicity of each positioning SI message from the location server.

In one aspect, at least one posSIB in the plurality of posSIBs is segmented into the plurality of posSIB segments for the posSIB, and the process 700 may further comprise receiving the plurality of posSIB segments for the posSIB from the location server.

In one aspect, the base station comprises an evolved NodeB (eNB) for 3rd Generation Partnership Project (3GPP) Long Term Evolution (LTE), e.g. the eNB 104 or eNB 106, or a New Radio (NR) NodeB (gNB) for 3GPP NR, e.g. a gNB 111. The receiving the plurality of posSIBs from the location server may comprise receiving an LTE Positioning Protocol A (LPPa) message or an NR Positioning Protocol A (NRPPa) message.

In one aspect, the positioning assistance data may comprise assistance data for at least one position method. For example, the at least one position method comprises a position method supported by an LTE Positioning Protocol (LPP) or an NR Positioning Protocol (NPP) or by message types defined by the Radio Technical Commission for Maritime Services (RTCM). For example, the at least one position method comprises User Equipment (UE) assisted Observed Time Difference of Arrival (OTDOA) for wideband LTE, UE assisted OTDOA for narrowband LTE, UE based OTDOA for wideband LTE, UE based OTDOA for narrowband LTE, UE assisted OTDOA for NR, UE based OTDOA for NR, UE based Assisted Global Navigation Satellite System (A-GNSS), UE assisted A-GNSS, UE assisted Real Time Kinematic (RTK), or UE based RTK, UE assisted Precise Point Positioning (PPP), or UE based PPP.

In one aspect, the location server is an Enhanced Serving Mobile Location Center (E-SMLC), e.g., E-SMLC 110, or a Location Management Function (LMF), e.g., LMF 184.

Figure 8:
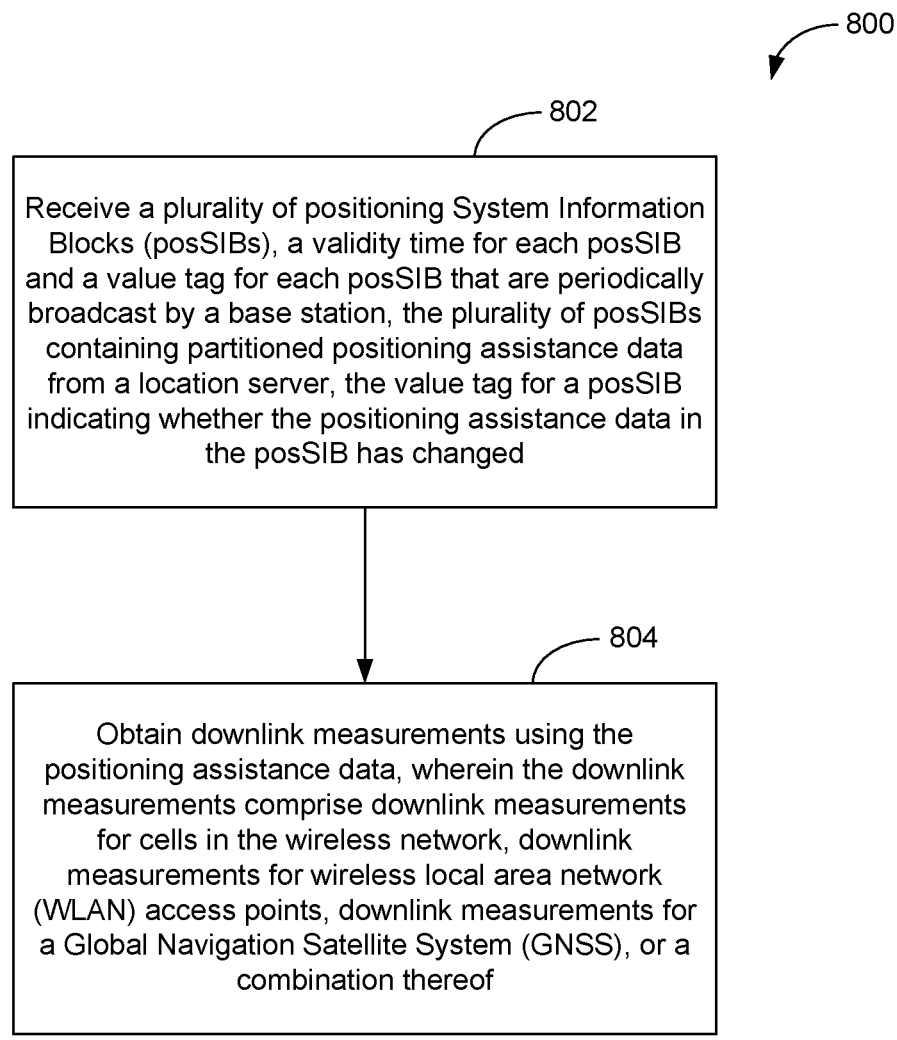

FIG. 8 is a flow diagram of a process 800 for broadcasting positioning assistance data in a wireless network that may be performed at a user equipment (UE), such as UE 102. Process 800 may start at block 802, which may comprise receiving a plurality of positioning System Information Blocks (posSIBs), a validity time for each posSIB and a value tag for each posSIB that are periodically broadcast by a base station, the plurality of posSIBs containing partitioned positioning assistance data from a location server, the value tag for a posSIB indicating whether the positioning assistance data in the posSIB has changed. Block 802 may correspond to, e.g., one or both of scheduling message 412 and downlink message 414 in signaling flow 400 and/or to broadcasting posSIB messages using RRC for stage 3 of signaling flow 200. Block 804 may comprise obtaining downlink measurements using the positioning assistance data, wherein the downlink measurements comprise downlink measurements for cells in the wireless network, downlink measurements for wireless local area network (WLAN) access points, downlink measurements for a Global Navigation Satellite System (GNSS), or a combination thereof. Block 804 may correspond to, e.g., block 540 in signaling flow 500.

In one aspect, process 800 may further comprise waiting until the validity time for a posSIB has expired before receiving a second plurality of posSIBs, a second validity time for each posSIB and a second value tag for each posSIB that are periodically broadcast by the base station; analyzing the second value tag for the posSIB to determine whether the positioning assistance data in the posSIB has changed; and decoding the posSIB when the second value tag indicates that the positioning assistance data in the posSIB has changed.

In one aspect, each posSIB in the plurality of posSIBs is assigned to one positioning System Information (positioning SI) message in a plurality of positioning SI messages. The base station periodically broadcasts the plurality of posSIBs by periodically broadcasting the plurality of the positioning SI messages, wherein, for each posSIB assigned to a positioning SI message, the positioning SI message comprises an entire posSIB when the posSIB is not segmented or a segment of the posSIB when the posSIB is segmented into a plurality of posSIB segments, wherein consecutive broadcasts of the positioning SI message comprise consecutive segments of the plurality of posSIB segments when the posSIB is segmented. In one aspect, at least one of the validity time or the value tag for at least one posSIB is included in the at least one posSIB. In one aspect, both the validity time and the value tag for the at least one posSIB are included in the at least one posSIB. Both the validity time and the value tag may be included as part of the positioning assistance data in the at least one posSIB, wherein the validity time and the value tag are transparent to the base station. For example, the positioning assistance data, the validity time and the value tag may be defined according to an LTE Positioning Protocol (LPP) or an NR Positioning Protocol (NPP). The at least one posSIB may be segmented into a plurality of posSIB segments for the at least one posSIB, wherein the validity time and the value tag for the at least one posSIB are included in only one of the plurality of posSIB segments. The only one of the plurality of posSIB segments may be the first posSIB segment. The at least one posSIB may be segmented into the plurality of posSIB segments using octet string segmentation or pseudo-segmentation. The at least one posSIB may not be segmented or may be segmented using octet string segmentation.

In one aspect, at least one posSIB is segmented into the plurality of posSIB segments for the posSIB using pseudo-segmentation; and at least one of the validity time or the value tag for the posSIB is included in at least one of the plurality of posSIB segments.

In one aspect, the process 800 further comprises receiving scheduling information for the plurality of positioning SI messages that is periodically broadcast by the base station, the scheduling information for each positioning SI message including the periodicity of broadcast of the positioning SI message and an identification of each posSIB assigned to the positioning SI message. The scheduling information for each positioning SI message may include at least one of the validity time or the value tag for each posSIB assigned to the positioning SI message. The value tag for the each posSIB may be included in the scheduling information and the validity time for the each posSIB may be included in the each posSIB. The scheduling information for each positioning SI message may include the value tag for each posSIB assigned to the positioning SI message, wherein the value tag for each posSIB in the plurality of posSIBs is determined by the location server. The value tag for each posSIB in the plurality of posSIBs may be determined by the base station by determining whether the positioning assistance data in the each posSIB in the plurality of posSIBs has changed.

In one aspect, the value tag for a posSIB comprises a numeric value which remains unchanged while positioning assistance data in the posSIB is unchanged and is changed when positioning assistance data in the posSIB is changed.

In one aspect, the validity time comprises at least one of a start time, a duration, an end time or some combination thereof.

In one aspect, the process 800 may further include receiving information on the assignment of each posSIB in the plurality of posSIBs to the one positioning SI message in the plurality of positioning SI messages and the periodicity of each positioning SI message from the location server.

In one aspect, at least one posSIB in the plurality of posSIBs is segmented into the plurality of posSIB segments for the posSIB, and the process 800 may further include receiving the plurality of posSIB segments for the posSIB from the base station.

In one aspect, the base station comprises an evolved NodeB (eNB) for 3rd Generation Partnership Project (3GPP) Long Term Evolution (LTE), e.g. the eNB 104 or eNB 106, or a New Radio (NR) NodeB (gNB) for 3GPP NR, e.g. a gNB 111. The receiving the plurality of posSIBs from the location server may comprise receiving an LTE Positioning Protocol A (LPPa) message or an NR Positioning Protocol A (NRPPa) message.

In one aspect, positioning assistance data comprises assistance data for at least one position method. For example, the at least one position method comprises a position method supported by an LTE Positioning Protocol (LPP) or an NR Positioning Protocol (NPP) or by message types defined by the Radio Technical Commission for Maritime Services (RTCM). For example, the at least one position method comprises User Equipment (UE) assisted Observed Time Difference of Arrival (OTDOA) for wideband LTE, UE assisted OTDOA for narrowband LTE, UE based OTDOA for wideband LTE, UE based OTDOA for narrowband LTE, UE assisted OTDOA for NR, UE based OTDOA for NR, UE based Assisted Global Navigation Satellite System (A-GNSS), UE assisted A-GNSS, UE assisted Real Time Kinematic (RTK), or UE based RTK, UE assisted Precise Point Positioning (PPP), or UE based PPP.

In one aspect, the location server is an Enhanced Serving Mobile Location Center (E-SMLC), e.g., E-SMLC 110, or a Location Management Function (LMF), e.g., LMF 184.

Figure 9:
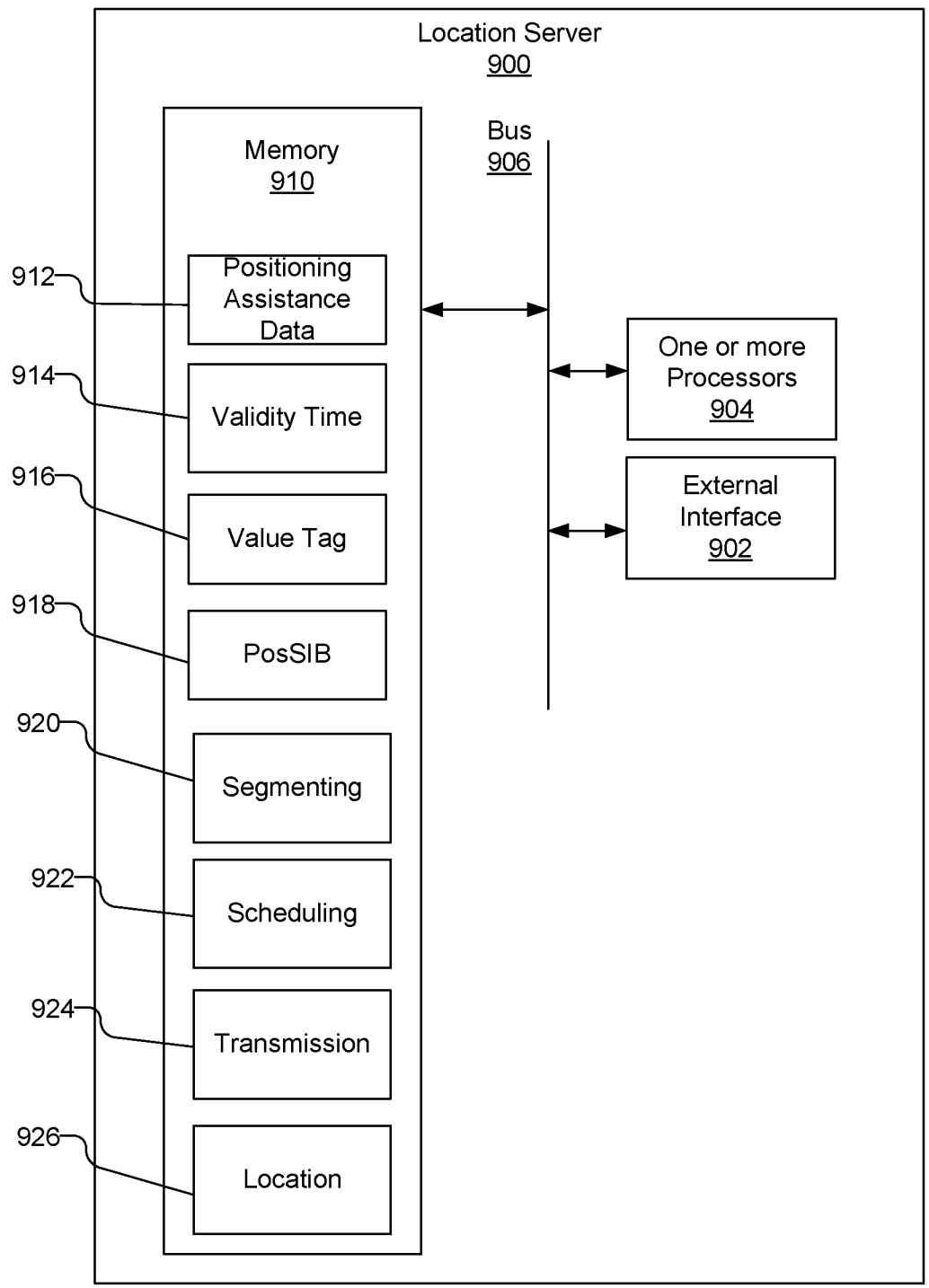
FIG. 9 is a diagram illustrating an example of a hardware implementation of a location server.

FIG. 9 is a diagram illustrating an example of a hardware implementation of a location server 900. The location server 900 may be, e.g., an Enhanced Serving Mobile Location Center (E-SMLC), e.g., E-SMLC 110, or a Location Management Function (LMF), e.g., LMF 184. The location server 900 may perform the process flow shown in FIG. 6. The location server 900 includes, e.g., hardware components such as an external interface 902, which may be a wired or wireless interface capable of connecting to a base station, such as an evolved NodeB (eNB) for 3rd Generation Partnership Project (3GPP) Long Term Evolution (LTE), e.g. the eNB 104 or eNB 106, or a New Radio (NR) NodeB (gNB) for 3GPP NR, e.g. a gNB 111, a user equipment, such as UE 102, an external client, e.g., external client 150 and/or other elements as illustrated, e.g., in FIGS. 1A and 1B. The location server 900 includes one or more processors 904 and memory 910, which may be coupled together with a bus 906. The memory 910 may contain executable code or software instructions that when executed by the one or more processors 904 cause the one or more processors to operate as a special purpose computer programmed to perform the techniques disclosed herein. As illustrated in FIG. 9, the memory 910 may include one or more components or modules that may be implanted by the one or more processors 904 to perform the methodologies as described herein. While the components or modules are illustrated as software in memory 910 that is executable by the one or more processors 904, it should be understood that the components or modules may be firmware or dedicated hardware either in the one or more processors 904 or off the processors.

For example, the memory 910 may include a positioning assistance data unit 912 that when implemented by the one or more processors 904 configures the one or more processors 904 to determine a plurality of positioning assistance data, e.g., collected from information obtained from base stations, e.g., as described in stage 2 in FIG. 3A and other sources. Memory 910 may include a validity time unit 914 that when implemented by the one or more processors 904 configures the one or more processors 904 to determine the validity time for the positioning assistance data. Memory 910 may further include a value tag unit 916 that when implemented by the one or more processors 904 configures the one or more processors 904 to determine a value tag for the positioning assistance data. A posSIB unit 918 when implemented by the one or more processors 904 configures the one or more processors 904 to partition the positioning assistance data into a plurality of positioning System Information Blocks (posSIBs) and may assign each posSIB to a positioning System Information (positioning SI) message. The memory 910 may include a segmenting unit 920, which when implemented by the one or more processors 904 configures the one or more processors 904 to segment one or more of the posSIBs. A scheduling unit 922 when implemented by the one or more processors 904 configures the one or more processors 904 to determine scheduling information. A transmission unit 924 when implemented by the one or more processors 904 configures the one or more processors 904 to cause the external interface 902 to send to a base station the plurality of posSIBs and the scheduling information. The memory 910 may further include a location unit 926 when implemented by the one or more processors 904 configures the one or more processors 904 to determine a location of a user equipment based on location information provided by the user equipment.

The methodologies described herein may be implemented by various means depending upon the application. For example, these methodologies may be implemented in hardware, firmware, software, or any combination thereof. For a hardware implementation, the one or more processors 904 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of location server 900 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 910) and executed by one or more processors 904, causing the one or more processors 904 to operate as a special purpose computer programmed to perform the techniques disclosed herein. Memory may be implemented within the one or processors 904 or external to the one or more processors 904. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by location server 900 may be stored as one or more instructions or code on a non-transitory computer-readable storage medium such as memory 910. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for location server 900 may be provided as signals on transmission media included in a communication apparatus. For example, a communication apparatus comprising part or all of location server 900 may include a transceiver having signals indicative of instructions and data. The instructions and data are stored on non-transitory computer readable media, e.g., memory 910, and are configured to cause the one or more processors 904 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a location server 900 may include a means for determining the positioning assistance data to be broadcast by a base station, which may be, e.g., the external interface 902 and one or more processors 904 with dedicated hardware or implementing executable code or software instructions in memory 910 such as the positioning assistance data unit 912. A means for partitioning the positioning assistance data into a plurality of positioning System Information Blocks (posSIBs) may be, e.g., one or more processors 904 with dedicated hardware or implementing executable code or software instructions in memory 910 such as the posSIB unit 918. A means for determining a validity time for each posSIB may be, e.g., one or more processors 904 with dedicated hardware or implementing executable code or software instructions in memory 910 such as the validity time unit 914. A means for sending the plurality of posSIBs to the base station, wherein the base station periodically broadcasts the plurality of posSIBs, the validity time for each posSIB and a value tag for each posSIB, wherein the value tag for a posSIB indicates whether the positioning assistance data in the posSIB has changed, may be, e.g., the external interface 902 and one or more processors 904 with dedicated hardware or implementing executable code or software instructions in memory 910 such as the transmission unit 924.

In one implementation, the location server 900 may further include a means for segmenting the at least one posSIB into a plurality of posSIB segments for the at least one posSIB, which may be, e.g., the one or more processors 904 with dedicated hardware or implementing executable code or software instructions in memory 910 such as the segmenting unit 920, and may include the validity time and the value tag for the at least one posSIB in only one of the plurality of posSIB segments.

In one implementation, the location server 900 may further include a means for segmenting at least one posSIB into the plurality of posSIB segments for the posSIB using pseudo-segmentation, which may be, e.g., the one or more processors 904 with dedicated hardware or implementing executable code or software instructions in memory 910 such as the segmenting unit 920, and may include the at least one of the validity time or the value tag for the posSIB in at least one of the plurality of posSIB segments.

In one implementation, scheduling information for each positioning SI message may include the value tag for each posSIB assigned to the positioning SI message, and the location server 900 may further include a means for determining the value tag for each posSIB in the plurality of posSIBs, which may be, e.g., the one or more processors 904 with dedicated hardware or implementing executable code or software instructions in memory 910 such as the value tag unit 916, and may include the value tag for each posSIB in the plurality of posSIBs when sending the plurality of posSIBs to the base station.

In one implementation, the location server 900 may further include a means for determining the assignment of each posSIB in the plurality of posSIBs to the one positioning SI message in the plurality of positioning SI messages, which may be, e.g., the one or more processors 904 with dedicated hardware or implementing executable code or software instructions in memory 910 such as the posSIB unit 918, a means for determining the periodicity of each positioning SI message which may be, e.g., the one or more processors 904 with dedicated hardware or implementing executable code or software instructions in memory 910 such as the scheduling unit 922, and may include information on the assignment of each posSIB to the one positioning SI message and the periodicity of each positioning SI message when sending the plurality of posSIBs to the base station.

In one implementation, the location server 900 may further include a means for segmenting at least one posSIB in the plurality of posSIBs into the plurality of posSIB segments for the posSIB, which may be, e.g., the one or more processors 904 with dedicated hardware or implementing executable code or software instructions in memory 910 such as the segmenting unit 920, and may include the plurality of posSIB segments for the posSIB when sending the plurality of posSIBs to the base station.

Figure 10:
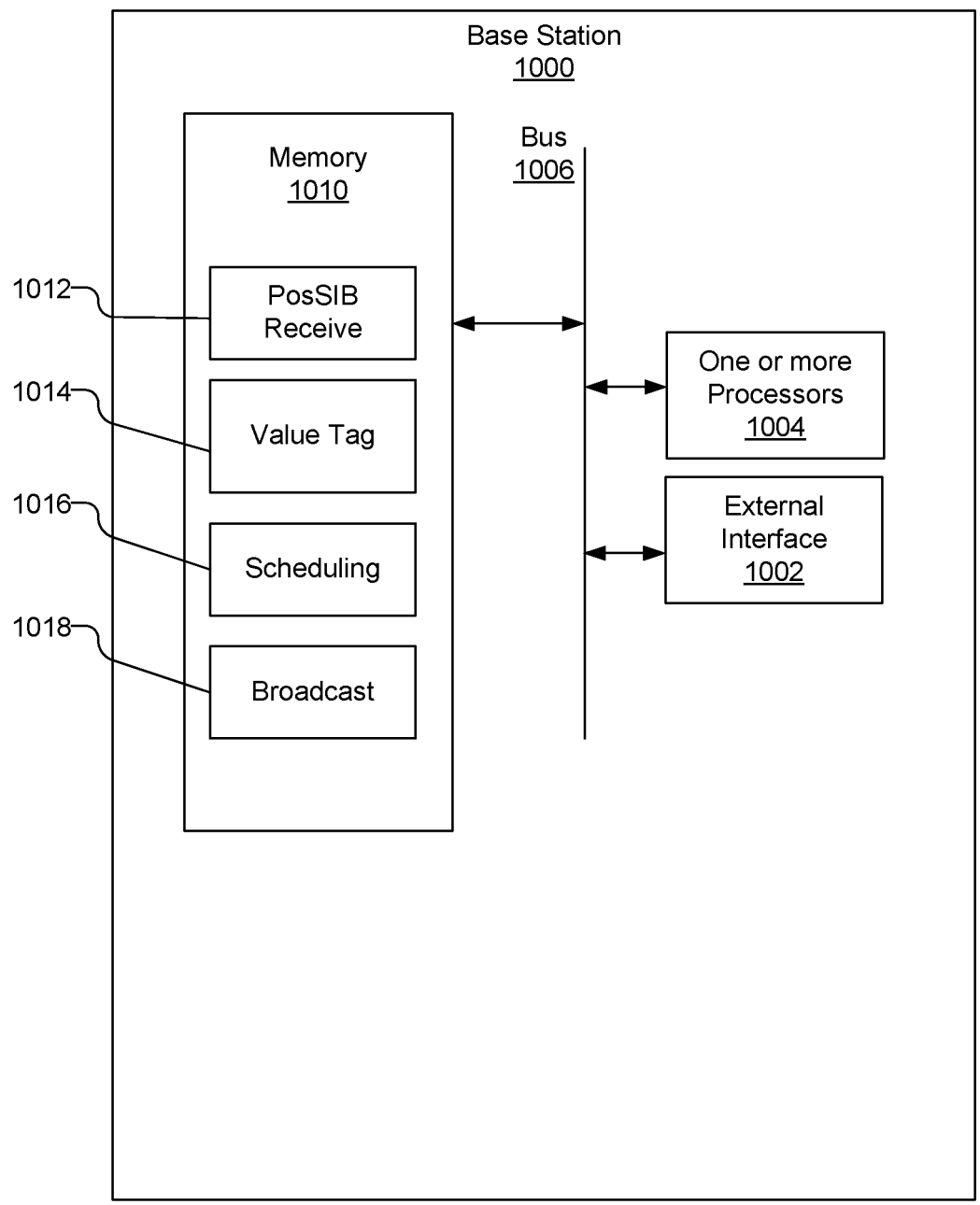
FIG. 10 is a diagram illustrating an example of a hardware implementation of a base station.

FIG. 10 is a diagram illustrating an example of a hardware implementation of a base station 1000, such as an eNB (e.g. eNB 104 or 106), a gNB (e.g. gNB 111) or an ng-eNB. The base station 1000 may perform the process flow 700 of FIG. 7. The base station 1000 includes, e.g., hardware components such as an external interface 1002, which may comprise one or more wired and/or wireless interfaces capable of connecting to UE 102 and location server, such as E-SMLC 110 or LMF 184, and to other elements in a wireless network directly or through one or more intermediary networks and/or one or more network entities, as shown in FIGS. 1A and 1B. The external interface 1002 may include one or more antennas (not shown in FIG. 10) to support a wireless interface to UE 102 and/or a wireless backhaul to elements in the wireless network. The base station 1000 includes one or more processors 1004 and memory 1010, which may be coupled together with a bus 1006. The memory 1010 may contain executable code or software instructions that when executed by the one or more processors 1004 cause the one or more processors 1004 to operate as a special purpose computer programmed to perform the techniques disclosed herein. As illustrated in FIG. 10, the memory 1010 may include one or more components or modules that may be implemented by the one or more processors 1004 to perform the methodologies as described herein. While the components or modules are illustrated as software in memory 1010 that is executable by the one or more processors 1004, it should be understood that the components or modules may be firmware or dedicated hardware either in the one or more processors 1004 or off the processors.

For example, the memory 1010 may include a posSIB receive unit 1012 that when implemented by the one or more processors 1004 configures the one or more processors 1004 to receive via the external interface 1002 a plurality of positioning System Information Blocks (posSIBs) from a location server. The memory 1010 may include a value tag unit 1014 that when implemented by the one or more processors 1004 configures the one or more processors 1004 to determine a value tag for each of the plurality of posSIBs, e.g., by determining whether the positioning assistance data in the each posSIB in the plurality of posSIBs has changed. A scheduling unit 1016 when implemented by the one or more processors 1004 configures the one or more processors 1004 to obtain, e.g., from a location server, via external interface 1002, or to determine scheduling information for the position assistance data. A broadcast unit 1018 when implemented by the one or more processors 1004 configures the one or more processors 1004 to cause the external interface 1002 to periodically broadcast the plurality of posSIBs, a validity time for each posSIB and a value tag for each posSIB, wherein the value tag for a posSIB indicates whether the positioning assistance data in the posSIB has changed. The broadcast unit 1018 when implemented by the one or more processors 1004 may further configure the one or more processors 1004 to cause the external interface 1002 to periodically broadcast the scheduling information.

The methodologies described herein may be implemented by various means depending upon the application. For example, these methodologies may be implemented in hardware, firmware, software, or any combination thereof. For a hardware implementation, the one or more processors 1004 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of base station 1000 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1010) and executed by one or more processors 1004, causing the one or more processors 1004 to operate as a special purpose computer programmed to perform the techniques disclosed herein. Memory may be implemented within the one or processors 1004 or external to the one or more processors 1004. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by base station 1000 may be stored as one or more instructions or code on a non-transitory computer-readable storage medium such as memory 1010. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for base station 1000 may be provided as signals on transmission media included in a communication apparatus. For example, a communication apparatus comprising part or all of base station 1000 may include a transceiver having signals indicative of instructions and data. The instructions and data are stored on non-transitory computer readable media, e.g., memory 1010, and are configured to cause the one or more processors 1004 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a base station 1000 may include a means for receiving a plurality of positioning System Information Blocks (posSIBs) from a location server, the plurality of posSIBs containing partitioned positioning assistance data to be broadcast by the base station, which may be, e.g., the external interface 1002 and one or more processors 1004 with dedicated hardware or implementing executable code or software instructions in memory 1010 such as the posSIB receive unit 1012. A means for periodically broadcasting the plurality of posSIBs, a validity time for each posSIB and a value tag for each posSIB, wherein the value tag for a posSIB indicates whether the positioning assistance data in the posSIB has changed may be, e.g., the external interface 1002 and one or more processors 1004 with dedicated hardware or implementing executable code or software instructions in memory 1010 such as the broadcast unit 1018.

In one implementation, the base station 1000 may include a means for periodically broadcasting scheduling information for the plurality of positioning SI messages, the scheduling information for each positioning SI message including the periodicity of broadcast of the positioning SI message and an identification of each posSIB assigned to the positioning SI message, which may be, e.g., the external interface 1002 and one or more processors 1004 with dedicated hardware or implementing executable code or software instructions in memory 1010 such as the scheduling unit 1016 and broadcast unit 1018. The base station 1000 may further include a means for including at least one of the validity time or the value tag for each posSIB assigned to the each positioning SI message in the scheduling information for the each positioning SI message, which may be, e.g., the external interface 1002 and one or more processors 1004 with dedicated hardware or implementing executable code or software instructions in memory 1010 such as the scheduling unit 1016.

In one implementation, the base station 1000 may include a means for determining the value tag for each posSIB in the plurality of posSIBs by determining whether the positioning assistance data in the each posSIB in the plurality of posSIBs has changed, which may be, e.g., the one or more processors 1004 with dedicated hardware or implementing executable code or software instructions in memory 1010 such as the value tag unit 1014.

In one implementation, the base station 1000 may include a means for receiving information on the assignment of each posSIB in the plurality of posSIBs to the one positioning SI message in the plurality of positioning SI messages and the periodicity of each positioning SI message from the location server, which may be, e.g., the external interface 1002 and one or more processors 1004 with dedicated hardware or implementing executable code or software instructions in memory 1010 such as the posSIB receive unit 1012.

implementation, at least one posSIB in the plurality of posSIBs is segmented into the plurality of posSIB segments for the posSIB, and the base station 1000 may include a means for receiving the plurality of posSIB segments for the posSIB from the location server, which may be, e.g., the external interface 1002 and one or more processors 1004 with dedicated hardware or implementing executable code or software instructions in memory 1010 such as the posSIB receive unit 1012.

Figure 11:
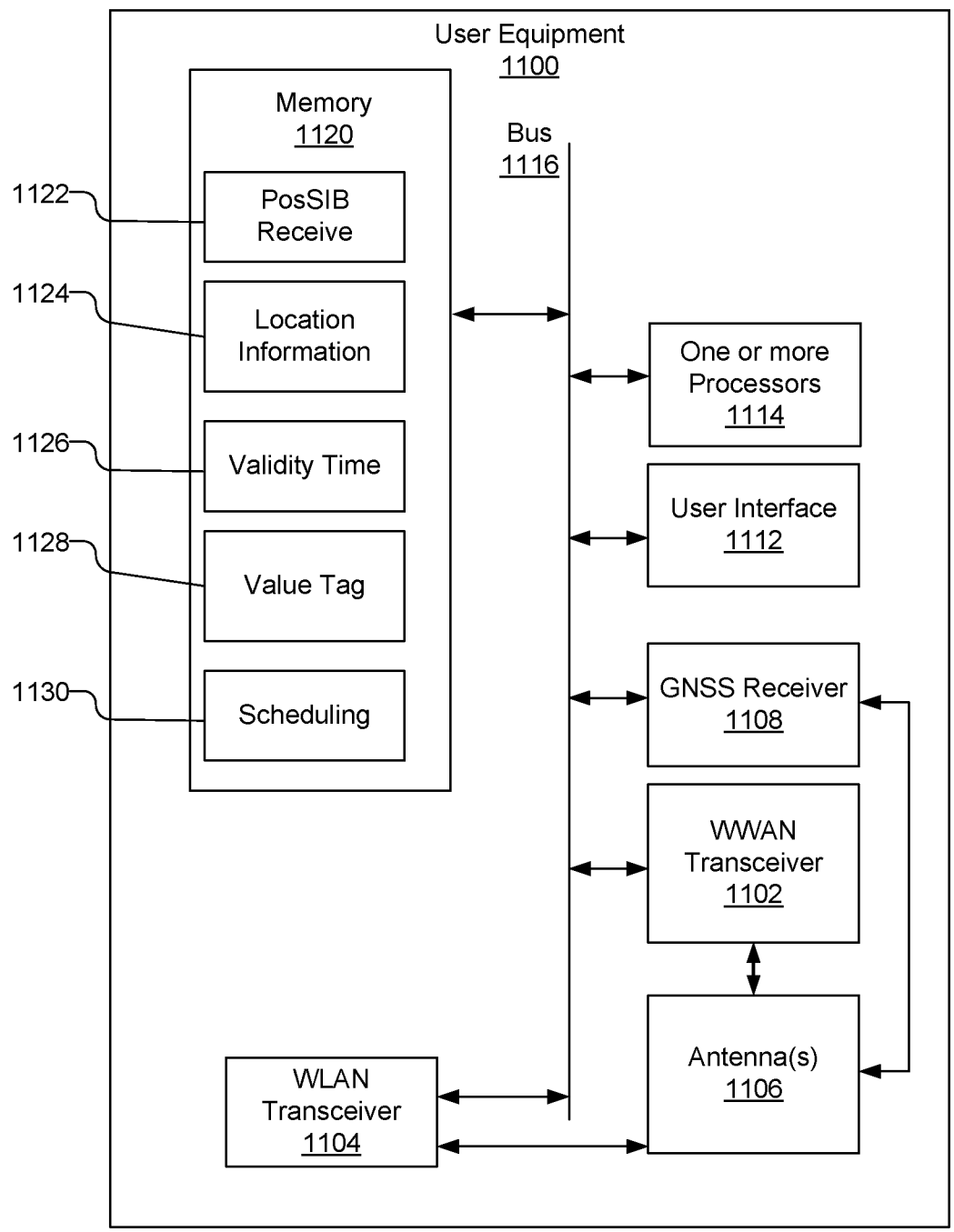
FIG. 11 is a diagram illustrating an example of a hardware implementation of a user equipment.

FIG. 11 is a diagram illustrating an example of a hardware implementation of a user equipment (UE), such as UE 102. The UE 1100 may perform the process 800 of FIG. 8. The UE 1100 may include a Wireless Wide Area Network (WWAN) transceiver 1102 to wirelessly communicate with and receive broadcast messages from base stations, such eNB (e.g. eNB 104 or 106), a gNB (e.g. gNB 111) or an ng-eNB. The UE 1100 may also include a WLAN transceiver 1104 to wirelessly communicate with local transceivers (e.g. WiFi APs or BT APs). The UE 1100 may include one or more antennas 1106 that may be used with the WWAN transceiver 1102 and WLAN transceiver 1104. The UE 1100 may further include a GNSS receiver 1108 for receiving and measuring signals from GNSS SVs 190 (as shown in FIG. 1). The UE 1100 may further include a user interface 1112 that may include e.g., a display, a keypad, a microphone, a speaker, or other input device, such as virtual keypad on the display, through which a user may interface with the UE 1100.

The UE 1100 further includes one or more processors 1114 and memory 1120, which may be coupled together with a bus 1116. The one or more processors 1114 and other components of the UE 1100 may similarly be coupled together with bus 1116, a separate bus, or may be directly connected together or coupled using a combination of the foregoing. The memory 1120 may contain executable code or software instructions that when executed by the one or more processors 1114 cause the one or more processors 1114 to operate as a special purpose computer programmed to perform the techniques disclosed herein. As illustrated in FIG. 11, the memory 1120 may include one or more components or modules that may be implemented by the one or more processors 1114 to perform the methodologies described herein. While the components or modules are illustrated as software in memory 1120 that is executable by the one or more processors 1114, it should be understood that the components or modules may be firmware or dedicated hardware either in the one or more processors 1114 or off the processors.

The memory 1120 may include posSIB receive unit 1122 that when implemented by the one or more processors 1114 configures the one or more processors 1114 to receive via the WWAN transceiver 1102 a plurality of positioning System Information Blocks (posSIBs), a validity time for each posSIB and a value tag for each posSIB that are periodically broadcast by a base station, the plurality of posSIBs containing partitioned positioning assistance data from a location server, the value tag for a posSIB indicates whether the positioning assistance data in the posSIB has changed. The posSIB receive unit 1122 when implemented by the one or more processors 1114 may further configure the one or more processors 1114 to decode the posSIB when a value tag indicates that the positioning assistance data in the posSIB has changed. The posSIB receive unit 1122 when implemented by the one or more processors 1114 may further configure the one or more processors 1114 to receive, e.g., via WWAN transceiver 1102, a plurality of posSIB segments for a posSIB from the base station. Memory 1120 may further include location information unit 1124 that when implemented by the one or more processors 1114 configures the one or more processors 1114 to obtain downlink measurements using the positioning assistance data, wherein the downlink measurements comprise downlink measurements for cells in the wireless network, downlink measurements for wireless local area network (WLAN) access points, downlink measurements for a Global Navigation Satellite System (GNSS), or a combination thereof. Memory 1120 may further include validity time unit 1126 that when implemented by the one or more processors 1114 configures the one or more processors 1114 to determine the validity time for a posSIB and to wait until the validity time for the posSIB has expired before receiving a second plurality of posSIBs, a second validity time for each posSIB and a second value tag for each posSIB that are periodically broadcast by the base station. Memory 1120 may further include a value tag unit 1128 that when implemented by the one or more processors 1114 configures the one or more processors 1114 to analyze value tags to determine whether positioning assistance data in a posSIB has changed. Memory 1120 may further include a scheduling unit 1130 that when implemented by the one or more processors 1114 configures the one or more processors 1114 to receive scheduling information for positioning System Information (positioning SI) messages that are periodically broadcast by the base station and that include a plurality of posSIBs, the scheduling information for each positioning SI message including the periodicity of broadcast of the positioning SI message and an identification of each posSIB assigned to the positioning SI message.

The methodologies described herein may be implemented by various means depending upon the application. For example, these methodologies may be implemented in hardware, firmware, software, or any combination thereof. For a hardware implementation, the one or more processors 1114 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 1100 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1120) and executed by one or more processors 1114, causing the one or more processors 1114 to operate as a special purpose computer programmed to perform the techniques disclosed herein. Memory may be implemented within the one or processors 1114 or external to the one or more processors 1114. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 1100 may be stored as one or more instructions or code on a non-transitory computer-readable storage medium such as memory 1120. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 1100 may be provided as signals on transmission media included in a communication apparatus. For example, a communication apparatus comprising part or all of UE 1100 may include a transceiver having signals indicative of instructions and data. The instructions and data are stored on non-transitory computer readable media, e.g., memory 1120, and are configured to cause the one or more processors 1114 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, the UE 1100 may include a means for receiving a plurality of positioning System Information Blocks (posSIBs), a validity time for each posSIB and a value tag for each posSIB that are periodically broadcast by a base station, the plurality of posSIBs containing partitioned positioning assistance data from a location server, the value tag for a posSIB indicates whether the positioning assistance data in the posSIB has changed, which may be, e.g., the WWAN transceiver 1102 and one or more processors 1114 with dedicated hardware or implementing executable code or software instructions in memory 1120 such as the posSIB receive unit 1122. A means for obtaining downlink measurements using the positioning assistance data, wherein the downlink measurements comprise downlink measurements for cells in the wireless network, downlink measurements for wireless local area network (WLAN) access points, downlink measurements for a Global Navigation Satellite System (GNSS), or a combination thereof may be, e.g., the WWAN transceiver 1102, the WLAN transceiver 1104, the GNSS Receiver 1108, and one or more processors 1114 with dedicated hardware or implementing executable code or software instructions in memory 1120 such as the location information unit 1124.

In one implementation, the UE 1100 further includes a means for waiting until the validity time for a posSIB has expired before receiving a second plurality of posSIBs, a second validity time for each posSIB and a second value tag for each posSIB that are periodically broadcast by the base station, which may be, e.g., the WWAN transceiver 1102 and the one or more processors 1114 with dedicated hardware or implementing executable code or software instructions in memory 1120 such as the validity time unit 1126. A means for analyzing the second value tag for the posSIB to determine whether the positioning assistance data in the posSIB has changed may be, e.g., the one or more processors 1114 with dedicated hardware or implementing executable code or software instructions in memory 1120 such as the value tag unit 1128. A means for decoding the posSIB when the second value tag indicates that the positioning assistance data in the posSIB has changed may be, e.g., the one or more processors 1114 with dedicated hardware or implementing executable code or software instructions in memory 1120 such as the posSIB receive unit 1122.

In one implementation, the UE 1100 further includes a means for receiving scheduling information for the plurality of positioning SI messages that is periodically broadcast by the base station, the scheduling information for each positioning SI message including the periodicity of broadcast of the positioning SI message and an identification of each posSIB assigned to the positioning SI message, which may be, e.g., the WWAN transceiver 1102 and one or more processors 1114 with dedicated hardware or implementing executable code or software instructions in memory 1120 such as the scheduling unit 1130.

In one implementation, at least one posSIB in the plurality of posSIBs is segmented into the plurality of posSIB segments for the posSIB, and the UE 1100 further includes a means for receiving the plurality of posSIB segments for the posSIB from the base station, which may be the WWAN transceiver 1102 and one or more processors 1114 with dedicated hardware or implementing executable code or software instructions in memory 1120 such as the posSIB receive unit 1122.

As used herein, the terms "mobile device" and "user equipment" (UE) are used synonymously to refer to a device that may from time to time have a location that changes. The changes in location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband CDMA (WCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and WCDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. 4G Long Term Evolution (LTE) and 5G or New Radio (NR) communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

One implementation (1) may be a method for broadcasting positioning assistance data in a wireless network performed by a base station, the method comprising: receiving a plurality of positioning System Information Blocks (posSIBs) from a location server, the plurality of posSIBs containing partitioned positioning assistance data to be broadcast by the base station; and periodically broadcasting the plurality of posSIBs, a validity time for each posSIB and a value tag for each posSIB, wherein the value tag for a posSIB indicates whether the positioning assistance data in the posSIB has changed.

There may be some implementations (2) of the above-described method (1) wherein each posSIB in the plurality of posSIBs is assigned to one positioning System Information (positioning SI) message in a plurality of positioning SI messages, wherein the base station periodically broadcasts the plurality of posSIBs by periodically broadcasting the plurality of the positioning SI messages, wherein, for each posSIB assigned to a positioning SI message, the positioning SI message comprises an entire posSIB when the posSIB is not segmented or a segment of the posSIB when the posSIB is segmented into a plurality of posSIB segments, wherein consecutive broadcasts of the positioning SI message comprise consecutive segments of the plurality of posSIB segments when the posSIB is segmented.

There may be some implementations (3) of the above-described method (2) wherein at least one of the validity time or the value tag for at least one posSIB is included in the at least one posSIB.

There may be some implementations (4) of the above-described method (3) wherein both the validity time and the value tag for the at least one posSIB are included in the at least one posSIB.

There may be some implementations (5) of the above-described method (4) wherein both the validity time and the value tag are included as part of the positioning assistance data in the at least one posSIB, wherein the validity time and the value tag are transparent to the base station.

There may be some implementations (6) of the above-described method (5) wherein the positioning assistance data, the validity time and the value tag are defined according to an LTE Positioning Protocol (LPP) or an NR Positioning Protocol (NPP).

There may be some implementations (7) of the above-described method (4) wherein the at least one posSIB is segmented into a plurality of posSIB segments for the at least one posSIB; wherein the validity time and the value tag for the at least one posSIB are included in only one of the plurality of posSIB segments.

There may be some implementations (8) of the above-described method (7) wherein the only one of the plurality of posSIB segments is the first posSIB segment.

There may be some implementations (9) of the above-described method (8) wherein the at least one posSIB is segmented into the plurality of posSIB segments using octet string segmentation or pseudo-segmentation.

There may be some implementations (10) of the above-described method (3) wherein the at least one posSIB is not segmented or is segmented using octet string segmentation.

There may be some implementations (11) of the above-described method (2) wherein: at least one posSIB is segmented into the plurality of posSIB segments for the posSIB using pseudo-segmentation; and at least one of the validity time or the value tag for the posSIB is included in at least one of the plurality of posSIB segments.

There may be some implementations (12) of the above-described method (2) further comprising periodically broadcasting scheduling information for the plurality of positioning SI messages, the scheduling information for each positioning SI message including the periodicity of broadcast of the positioning SI message and an identification of each posSIB assigned to the positioning SI message.

There may be some implementations (13) of the above-described method (12) further comprising including at least one of the validity time or the value tag for each posSIB assigned to the each positioning SI message in the scheduling information for the each positioning SI message.

There may be some implementations (14) of the above-described method (13) wherein the value tag for the each posSIB is included in the scheduling information and the validity time for the each posSIB is included in the each posSIB.

There may be some implementations (15) of the above-described method (13) wherein the scheduling information for the each positioning SI message includes the value tag for the each posSIB assigned to the each positioning SI message, wherein the value tag for the each posSIB in the plurality of posSIBs is received from the location server.

There may be some implementations (16) of the above-described method (13) further comprising determining the value tag for each posSIB in the plurality of posSIBs by determining whether the positioning assistance data in the each posSIB in the plurality of posSIBs has changed.

There may be some implementations (17) of the above-described method (1) wherein the value tag for a posSIB comprises a numeric value which remains unchanged while positioning assistance data in the posSIB is unchanged and is changed when positioning assistance data in the posSIB is changed.

There may be some implementations (18) of the above-described method (1) wherein the validity time comprises at least one of a start time, a duration, an end time or some combination thereof.

There may be some implementations (19) of the above-described method (2) further comprising: receiving information on the assignment of each posSIB in the plurality of posSIBs to the one positioning SI message in the plurality of positioning SI messages and the periodicity of each positioning SI message from the location server.

There may be some implementations (20) of the above-described method (2) wherein at least one posSIB in the plurality of posSIBs is segmented into the plurality of posSIB segments for the posSIB, the method further comprising: receiving the plurality of posSIB segments for the posSIB from the location server.

There may be some implementations (21) of the above-described method (1) wherein the base station comprises an evolved NodeB (eNB) for 3rd Generation Partnership Project (3GPP) Long Term Evolution (LTE) or a New Radio (NR) NodeB (gNB) for 3GPP NR.

There may be some implementations (22) of the above-described method (21) wherein receiving the plurality of posSIBs from the location server comprises receiving an LTE Positioning Protocol A (LPPa) message or an NR Positioning Protocol A (NRPPa) message.

There may be some implementations (23) of the above-described method (1) wherein the positioning assistance data comprises assistance data for at least one position method.

There may be some implementations (24) of the above-described method (23) wherein the at least one position method comprises a position method supported by an LTE Positioning Protocol (LPP) or an NR Positioning Protocol (NPP) or by message types defined by the Radio Technical Commission for Maritime Services (RTCM).

There may be some implementations (25) of the above-described method (24) wherein the at least one position method comprises User Equipment (UE) assisted Observed Time Difference of Arrival (OTDOA) for wideband LTE, UE assisted OTDOA for narrowband LTE, UE based OTDOA for wideband LTE, UE based OTDOA for narrowband LTE, UE assisted OTDOA for NR, UE based OTDOA for NR, UE based Assisted Global Navigation Satellite System (A-GNSS), UE assisted A-GNSS, UE assisted Real Time Kinematic (RTK), or UE based RTK, UE assisted Precise Point Positioning (PPP), or UE based PPP.

There may be some implementations (26) of the above-described method (1) wherein the location server is an Enhanced Serving Mobile Location Center (E-SMLC) or a Location Management Function (LMF).

One implementation (27) may be a base station configured for broadcasting positioning assistance data in a wireless network comprising: an external interface configured to communicate with a location server in the wireless network; a wireless interface configured to wirelessly communicating with entities in the wireless network; at least one memory; and at least one processor coupled to the external interface and the wireless interface and the at least one memory and configured to: receive, via the external interface, a plurality of positioning System Information Blocks (posSIBs) from the location server, the plurality of posSIBs containing partitioned positioning assistance data to be broadcast by the base station; and periodically broadcasting, via the wireless interface, the plurality of posSIBs, a validity time for each posSIB and a value tag for each posSIB, wherein the value tag for a posSIB indicates whether the positioning assistance data in the posSIB has changed.

There may be some implementations (28) of the above-described base station (27) wherein each posSIB in the plurality of posSIBs is assigned to one positioning System Information (positioning SI) message in a plurality of positioning SI messages, wherein the base station periodically broadcasts the plurality of posSIBs by periodically broadcasting the plurality of the positioning SI messages, wherein, for each posSIB assigned to a positioning SI message, the positioning SI message comprises an entire posSIB when the posSIB is not segmented or a segment of the posSIB when the posSIB is segmented into a plurality of posSIB segments, wherein consecutive broadcasts of the positioning SI message comprise consecutive segments of the plurality of posSIB segments when the posSIB is segmented.

There may be some implementations (29) of the above-described base station (28) wherein at least one of the validity time or the value tag for at least one posSIB is included in the at least one posSIB.

There may be some implementations (30) of the above-described base station (29) wherein both the validity time and the value tag for the at least one posSIB are included in the at least one posSIB.

There may be some implementations (31) of the above-described base station (30) wherein both the validity time and the value tag are included as part of the positioning assistance data in the at least one posSIB, wherein the validity time and the value tag are transparent to the base station.

There may be some implementations (32) of the above-described base station (31) wherein the positioning assistance data, the validity time and the value tag are defined according to an LTE Positioning Protocol (LPP) or an NR Positioning Protocol (NPP).

There may be some implementations (33) of the above-described base station (30) wherein the at least one posSIB is segmented into a plurality of posSIB segments for the at least one posSIB; wherein the validity time and the value tag for the at least one posSIB are included in only one of the plurality of posSIB segments.

There may be some implementations (34) of the above-described base station (33) wherein the only one of the plurality of posSIB segments is the first posSIB segment.

There may be some implementations (35) of the above-described base station (34) wherein the at least one posSIB is segmented into the plurality of posSIB segments using octet string segmentation or pseudo-segmentation.

There may be some implementations (36) of the above-described base station (29) wherein the at least one posSIB is not segmented or is segmented using octet string segmentation.

There may be some implementations (37) of the above-described base station (28) wherein: at least one posSIB is segmented into the plurality of posSIB segments for the posSIB using pseudo-segmentation; and at least one of the validity time or the value tag for the posSIB is included in at least one of the plurality of posSIB segments.

There may be some implementations (38) of the above-described base station (28) wherein the at least one processor is further configured to periodically broadcast scheduling information for the plurality of positioning SI messages, the scheduling information for each positioning SI message including the periodicity of broadcast of the positioning SI message and an identification of each posSIB assigned to the positioning SI message.

There may be some implementations (39) of the above-described base station (38) wherein the at least one processor is further configured to include at least one of the validity time or the value tag for each posSIB assigned to the each positioning SI message in the scheduling information for the each positioning SI message.

There may be some implementations (40) of the above-described base station (39) wherein the value tag for the each posSIB is included in the scheduling information and the validity time for the each posSIB is included in the each posSIB.

There may be some implementations (41) of the above-described base station (39) wherein the scheduling information for the each positioning SI message includes the value tag for the each posSIB assigned to the each positioning SI message, wherein the value tag for the each posSIB in the plurality of posSIBs is received from the location server.

There may be some implementations (42) of the above-described base station (39) wherein the at least one processor is further configured to determine the value tag for each posSIB in the plurality of posSIBs by determining whether the positioning assistance data in the each posSIB in the plurality of posSIBs has changed.

There may be some implementations (43) of the above-described base station (27) wherein the value tag for a posSIB comprises a numeric value which remains unchanged while positioning assistance data in the posSIB is unchanged and is changed when positioning assistance data in the posSIB is changed.

There may be some implementations (44) of the above-described base station (27) wherein the validity time comprises at least one of a start time, a duration, an end time or some combination thereof.

There may be some implementations (45) of the above-described base station (28) wherein the at least one processor is further configured to: receive, via the external interface, information on the assignment of each posSIB in the plurality of posSIBs to the one positioning SI message in the plurality of positioning SI messages and the periodicity of each positioning SI message from the location server.

There may be some implementations (46) of the above-described base station (28) wherein at least one posSIB in the plurality of posSIBs is segmented into the plurality of posSIB segments for the posSIB, the at least one processor is further configured to: receive, via the external interface, the plurality of posSIB segments for the posSIB from the location server.

There may be some implementations (47) of the above-described base station (27) wherein the base station comprises an evolved NodeB (eNB) for 3rd Generation Partnership Project (3GPP) Long Term Evolution (LTE) or a New Radio (NR) NodeB (gNB) for 3GPP NR.

There may be some implementations (48) of the above-described base station (47) wherein the at least one processor is configured to receive the plurality of posSIBs from the location server by being configured to receive an LTE Positioning Protocol A (LPPa) message or an NR Positioning Protocol A (NRPPa) message.

There may be some implementations (49) of the above-described base station (27) wherein the positioning assistance data comprises assistance data for at least one position method.

There may be some implementations (50) of the above-described base station (49) wherein the at least one position method comprises a position method supported by an LTE Positioning Protocol (LPP) or an NR Positioning Protocol (NPP) or by message types defined by the Radio Technical Commission for Maritime Services (RTCM).

There may be some implementations (51) of the above-described base station (50) wherein the at least one position method comprises User Equipment (UE) assisted Observed Time Difference of Arrival (OTDOA) for wideband LTE, UE assisted OTDOA for narrowband LTE, UE based OTDOA for wideband LTE, UE based OTDOA for narrowband LTE, UE assisted OTDOA for NR, UE based OTDOA for NR, UE based Assisted Global Navigation Satellite System (A-GNSS), UE assisted A-GNSS, UE assisted Real Time Kinematic (RTK), or UE based RTK, UE assisted Precise Point Positioning (PPP), or UE based PPP.

There may be some implementations (52) of the above-described base station (27) wherein the location server is an Enhanced Serving Mobile Location Center (E-SMLC) or a Location Management Function (LMF).

One implementation (53) may be a base station configured for broadcasting positioning assistance data in a wireless network comprising: means for receiving a plurality of positioning System Information Blocks (posSIBs) from a location server, the plurality of posSIBs containing partitioned positioning assistance data to be broadcast by the base station; and means for periodically broadcasting the plurality of posSIBs, a validity time for each posSIB and a value tag for each posSIB, wherein the value tag for a posSIB indicates whether the positioning assistance data in the posSIB has changed.

One implementation (54) may be a non-transitory storage medium including program code stored thereon, the program code is operable to configure at least one processor in a base station in a wireless network for broadcasting positioning assistance data, comprising: program code to receive a plurality of positioning System Information Blocks (posSIBs) from a location server, the plurality of posSIBs containing partitioned positioning assistance data to be broadcast by the base station; and program code to periodically broadcast the plurality of posSIBs, a validity time for each posSIB and a value tag for each posSIB, wherein the value tag for a posSIB indicates whether the positioning assistance data in the posSIB has changed.

One implementation (55) may be a method for broadcasting positioning assistance data in a wireless network performed by a user equipment, the method comprising: receiving a plurality of positioning System Information Blocks (posSIBs), a validity time for each posSIB and a value tag for each posSIB that are periodically broadcast by a base station, the plurality of posSIBs containing partitioned positioning assistance data from a location server, the value tag for a posSIB indicating whether the positioning assistance data in the posSIB has changed; and obtaining downlink measurements using the positioning assistance data, wherein the downlink measurements comprise downlink measurements for cells in the wireless network, downlink measurements for wireless local area network (WLAN) access points, downlink measurements for a Global Navigation Satellite System (GNSS), or a combination thereof.

There may be some implementations (56) of the above-described method (55) further comprising: waiting until the validity time for a posSIB has expired before receiving a second plurality of posSIBs, a second validity time for each posSIB and a second value tag for each posSIB that are periodically broadcast by the base station; analyzing the second value tag for the posSIB to determine whether the positioning assistance data in the posSIB has changed; and decoding the posSIB when the second value tag indicates that the positioning assistance data in the posSIB has changed.

There may be some implementations (57) of the above-described method (55) wherein each posSIB in the plurality of posSIBs is assigned to one positioning System Information (positioning SI) message in a plurality of positioning SI messages, wherein the base station periodically broadcasts the plurality of posSIBs by periodically broadcasting the plurality of the positioning SI messages, wherein, for each posSIB assigned to a positioning SI message, the positioning SI message comprises an entire posSIB when the posSIB is not segmented or a segment of the posSIB when the posSIB is segmented into a plurality of posSIB segments, wherein consecutive broadcasts of the positioning SI message comprise consecutive segments of the plurality of posSIB segments when the posSIB is segmented.

There may be some implementations (58) of the above-described method (57) wherein at least one of the validity time or the value tag for at least one posSIB is included in the at least one posSIB.

There may be some implementations (59) of the above-described method (58) wherein both the validity time and the value tag for the at least one posSIB are included in the at least one posSIB.

There may be some implementations (60) of the above-described method (59) wherein both the validity time and the value tag are included as part of the positioning assistance data in the at least one posSIB, wherein the validity time and the value tag are transparent to the base station.

There may be some implementations (61) of the above-described method (60) wherein the positioning assistance data, the validity time and the value tag are defined according to an LTE Positioning Protocol (LPP) or an NR Positioning Protocol (NPP).

There may be some implementations (62) of the above-described method (59) wherein the at least one posSIB is segmented into a plurality of posSIB segments for the at least one posSIB, wherein the validity time and the value tag for the at least one posSIB are included in only one of the plurality of posSIB segments.

There may be some implementations (63) of the above-described method (62) wherein the only one of the plurality of posSIB segments is the first posSIB segment.

There may be some implementations (64) of the above-described method (63) wherein the at least one posSIB is segmented into the plurality of posSIB segments using octet string segmentation or pseudo-segmentation.

There may be some implementations (65) of the above-described method (58) wherein the at least one posSIB is not segmented or is segmented using octet string segmentation.

There may be some implementations (66) of the above-described method (57) wherein: at least one posSIB is segmented into the plurality of posSIB segments for the posSIB using pseudo-segmentation; and at least one of the validity time or the value tag for the posSIB is included in at least one of the plurality of posSIB segments.

There may be some implementations (67) of the above-described method (57) further comprising receiving scheduling information for the plurality of positioning SI messages that is periodically broadcast by the base station, the scheduling information for each positioning SI message including the periodicity of broadcast of the positioning SI message and an identification of each posSIB assigned to the positioning SI message.

There may be some implementations (68) of the above-described method (67) wherein the scheduling information for each positioning SI message includes at least one of the validity time or the value tag for each posSIB assigned to the positioning SI message.

There may be some implementations (69) of the above-described method (68) wherein the value tag for the each posSIB is included in the scheduling information and the validity time for the each posSIB is included in the each posSIB.

There may be some implementations (70) of the above-described method (68) wherein the scheduling information for each positioning SI message includes the value tag for each posSIB assigned to the positioning SI message, wherein the value tag for each posSIB in the plurality of posSIBs is determined by the location server.

There may be some implementations (71) of the above-described method (68) wherein the value tag for each posSIB in the plurality of posSIBs is determined by the base station by determining whether the positioning assistance data in the each posSIB in the plurality of posSIBs has changed.

There may be some implementations (72) of the above-described method (55) wherein the value tag for a posSIB comprises a numeric value which remains unchanged while positioning assistance data in the posSIB is unchanged and is changed when positioning assistance data in the posSIB is changed.

There may be some implementations (73) of the above-described method (55) wherein the validity time comprises at least one of a start time, a duration, an end time or some combination thereof.

There may be some implementations (74) of the above-described method (57) wherein at least one posSIB in the plurality of posSIBs is segmented into the plurality of posSIB segments for the posSIB, the method further comprising: receiving the plurality of posSIB segments for the posSIB from the base station.

There may be some implementations (75) of the above-described method (55) wherein the base station comprises an evolved NodeB (eNB) for 3rd Generation Partnership Project (3GPP) Long Term Evolution (LTE) or a New Radio (NR) NodeB (gNB) for 3GPP NR.

There may be some implementations (76) of the above-described method (55) wherein the positioning assistance data comprises assistance data for at least one position method.

There may be some implementations (77) of the above-described method (76) wherein the at least one position method comprises a position method supported by an LTE Positioning Protocol (LPP) or an NR Positioning Protocol (NPP) or by message types defined by the Radio Technical Commission for Maritime Services (RTCM).

There may be some implementations (78) of the above-described method (77) wherein the at least one position method comprises User Equipment (UE) assisted Observed Time Difference of Arrival (OTDOA) for wideband LTE, UE assisted OTDOA for narrowband LTE, UE based OTDOA for wideband LTE, UE based OTDOA for narrowband LTE, UE assisted OTDOA for NR, UE based OTDOA for NR, UE based Assisted Global Navigation Satellite System (A-GNSS), UE assisted A-GNSS, UE assisted Real Time Kinematic (RTK), or UE based RTK, UE assisted Precise Point Positioning (PPP), or UE based PPP.

There may be some implementations (79) of the above-described method (55) wherein the location server is an Enhanced Serving Mobile Location Center (E-SMLC) or a Location Management Function (LMF).

One implementation (80) may be a user equipment (UE) configured to support broadcast positioning assistance data in a wireless network comprising: at least one wireless transceiver configured to wirelessly communicate with at least one wireless network; at least one memory; and at least one processor coupled to the at least one wireless transceiver and the at least one memory and configured to: receive, via the at least one wireless transceiver, a plurality of positioning System Information Blocks (posSIBs), a validity time for each posSIB and a value tag for each posSIB that are periodically broadcast by a base station in the wireless network, the plurality of posSIBs containing partitioned positioning assistance data from a location server, the value tag for a posSIB indicating whether the positioning assistance data in the posSIB has changed; and obtain downlink measurements, via the at least one wireless transceiver, using the positioning assistance data, wherein the downlink measurements comprise downlink measurements for cells in the wireless network, downlink measurements for wireless local area network (WLAN) access points, downlink measurements for a Global Navigation Satellite System (GNSS), or a combination thereof.

There may be some implementations (81) of the above-described UE (80) the at least one processor further configured to: wait until the validity time for a posSIB has expired before receiving a second plurality of posSIBs, a second validity time for each posSIB and a second value tag for each posSIB that are periodically broadcast by the base station; analyze the second value tag for the posSIB to determine whether the positioning assistance data in the posSIB has changed; and decode the posSIB when the second value tag indicates that the positioning assistance data in the posSIB has changed.

There may be some implementations (82) of the above-described UE (80) wherein each posSIB in the plurality of posSIBs is assigned to one positioning System Information (positioning SI) message in a plurality of positioning SI messages, wherein the base station periodically broadcasts the plurality of posSIBs by periodically broadcasting the plurality of the positioning SI messages, wherein, for each posSIB assigned to a positioning SI message, the positioning SI message comprises an entire posSIB when the posSIB is not segmented or a segment of the posSIB when the posSIB is segmented into a plurality of posSIB segments, wherein consecutive broadcasts of the positioning SI message comprise consecutive segments of the plurality of posSIB segments when the posSIB is segmented.

There may be some implementations (83) of the above-described UE (82) wherein at least one of the validity time or the value tag for at least one posSIB is included in the at least one posSIB.

There may be some implementations (84) of the above-described UE (83) wherein both the validity time and the value tag for the at least one posSIB are included in the at least one posSIB.

There may be some implementations (85) of the above-described UE (84) wherein both the validity time and the value tag are included as part of the positioning assistance data in the at least one posSIB, wherein the validity time and the value tag are transparent to the base station.

There may be some implementations (86) of the above-described UE (85) wherein the positioning assistance data, the validity time and the value tag are defined according to an LTE Positioning Protocol (LPP) or an NR Positioning Protocol (NPP).

There may be some implementations (87) of the above-described UE (84) wherein the at least one posSIB is segmented into a plurality of posSIB segments for the at least one posSIB, wherein the validity time and the value tag for the at least one posSIB are included in only one of the plurality of posSIB segments.

There may be some implementations (88) of the above-described UE (87) wherein the only one of the plurality of posSIB segments is the first posSIB segment.

There may be some implementations (89) of the above-described UE (88) wherein the at least one posSIB is segmented into the plurality of posSIB segments using octet string segmentation or pseudo-segmentation.

There may be some implementations (90) of the above-described UE (83) wherein the at least one posSIB is not segmented or is segmented using octet string segmentation.

There may be some implementations (91) of the above-described UE (82) wherein: at least one posSIB is segmented into the plurality of posSIB segments for the posSIB using pseudo-segmentation; and at least one of the validity time or the value tag for the posSIB is included in at least one of the plurality of posSIB segments.

There may be some implementations (92) of the above-described UE (82) the at least one processor further configured to receive, via the at least one wireless interface, scheduling information for the plurality of positioning SI messages that is periodically broadcast by the base station, the scheduling information for each positioning SI message including the periodicity of broadcast of the positioning SI message and an identification of each posSIB assigned to the positioning SI message.

There may be some implementations (93) of the above-described UE (92) wherein the scheduling information for each positioning SI message includes at least one of the validity time or the value tag for each posSIB assigned to the positioning SI message.

There may be some implementations (94) of the above-described UE (93) wherein the value tag for the each posSIB is included in the scheduling information and the validity time for the each posSIB is included in the each posSIB.

There may be some implementations (95) of the above-described UE (93) wherein the scheduling information for each positioning SI message includes the value tag for each posSIB assigned to the positioning SI message, wherein the value tag for each posSIB in the plurality of posSIBs is determined by the location server.

There may be some implementations (96) of the above-described UE (93) wherein the value tag for each posSIB in the plurality of posSIBs is determined by the base station by determining whether the positioning assistance data in the each posSIB in the plurality of posSIBs has changed.

There may be some implementations (97) of the above-described UE (80) wherein the value tag for a posSIB comprises a numeric value which remains unchanged while positioning assistance data in the posSIB is unchanged and is changed when positioning assistance data in the posSIB is changed.

There may be some implementations (98) of the above-described UE (80) wherein the validity time comprises at least one of a start time, a duration, an end time or some combination thereof.

There may be some implementations (99) of the above-described UE (82) wherein at least one posSIB in the plurality of posSIBs is segmented into the plurality of posSIB segments for the posSIB, the at least one processor further configured to: receive the plurality of posSIB segments for the posSIB from the base station.

There may be some implementations (100) of the above-described UE (80) wherein the base station comprises an evolved NodeB (eNB) for 3rd Generation Partnership Project (3GPP) Long Term Evolution (LTE) or a New Radio (NR) NodeB (gNB) for 3GPP NR.

There may be some implementations (101) of the above-described UE (80) wherein the positioning assistance data comprises assistance data for at least one position method.

There may be some implementations (102) of the above-described UE (101) wherein the at least one position method comprises a position method supported by an LTE Positioning Protocol (LPP) or an NR Positioning Protocol (NPP) or by message types defined by the Radio Technical Commission for Maritime Services (RTCM).

There may be some implementations (103) of the above-described UE (102) wherein the at least one position method comprises User Equipment (UE) assisted Observed Time Difference of Arrival (OTDOA) for wideband LTE, UE assisted OTDOA for narrowband LTE, UE based OTDOA for wideband LTE, UE based OTDOA for narrowband LTE, UE assisted OTDOA for NR, UE based OTDOA for NR, UE based Assisted Global Navigation Satellite System (A-GNSS), UE assisted A-GNSS, UE assisted Real Time Kinematic (RTK), or UE based RTK, UE assisted Precise Point Positioning (PPP), or UE based PPP.

There may be some implementations (104) of the above-described UE (80) wherein the location server is an Enhanced Serving Mobile Location Center (E-SMLC) or a Location Management Function (LMF).

One implementation (105) may be a user equipment (UE) configured to support broadcast positioning assistance data in a wireless network comprising: means for receiving a plurality of positioning System Information Blocks (posSIBs), a validity time for each posSIB and a value tag for each posSIB that are periodically broadcast by a base station, the plurality of posSIBs containing partitioned positioning assistance data from a location server, the value tag for a posSIB indicating whether the positioning assistance data in the posSIB has changed; and means for obtaining downlink measurements using the positioning assistance data, wherein the downlink measurements comprise downlink measurements for cells in the wireless network, downlink measurements for wireless local area network (WLAN) access points, downlink measurements for a Global Navigation Satellite System (GNSS), or a combination thereof.

One implementation (106) may be a non-transitory storage medium including program code stored thereon, the program code is operable to configure at least one processor in user equipment in a wireless network for broadcasting positioning assistance data, comprising: program code to receive a plurality of positioning System Information Blocks (posSIBs), a validity time for each posSIB and a value tag for each posSIB that are periodically broadcast by a base station, the plurality of posSIBs containing partitioned positioning assistance data from a location server, the value tag for a posSIB indicating whether the positioning assistance data in the posSIB has changed; and program code to obtain downlink measurements using the positioning assistance data, wherein the downlink measurements comprise downlink measurements for cells in the wireless network, downlink measurements for wireless local area network (WLAN) access points, downlink measurements for a Global Navigation Satellite System (GNSS), or a combination thereof.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method for broadcasting positioning assistance data in a wireless network performed by a location server, the method comprising:
   determining the positioning assistance data to be broadcast by a base station;
   partitioning the positioning assistance data into a plurality of positioning System Information Blocks (posSIBs);
   segmenting at least one posSIB into a plurality of posSIB segments for the at least one posSIB;
   determining a validity time for the at least one posSIB; and
   sending the plurality of posSIBs to the base station, wherein the base station periodically broadcasts the plurality of posSIBs and the plurality of posSIB segments, wherein the validity time for the at least one posSIB is included in only one of the plurality of posSIB segments, wherein the only one of the plurality of posSIB segments is a first posSIB segment.

2. The method of claim 1, wherein each posSIB in the plurality of posSIBs is assigned to one positioning System Information (positioning SI) message in a plurality of positioning SI messages, wherein the base station periodically broadcasts the plurality of posSIBs by periodically broadcasting the plurality of the positioning SI messages, wherein, for each posSIB assigned to a positioning SI message, the positioning SI message comprises an entire posSIB when the posSIB is not segmented or a segment of the posSIB when the posSIB is segmented into posSIB segments, wherein consecutive broadcasts of the positioning SI message comprise consecutive segments of the posSIB when the posSIB is segmented into posSIB segments.

3. The method of claim 1, wherein both the validity time and a value tag are included as part of the positioning assistance data in the at least one of the plurality of posSIB segments, wherein the value tag indicates whether the positioning assistance data in the at least one posSIB has changed, and wherein the validity time and the value tag are transparent to the base station.

4. The method of claim 3, wherein the positioning assistance data, the validity time and the value tag are defined according to an LTE Positioning Protocol (LPP) or an NR Positioning Protocol (NPP).

5. The method of claim 3, wherein the value tag comprises a numeric value which remains unchanged while positioning assistance data in the at least one posSIB is unchanged and is changed when positioning assistance data in the at least one posSIB is changed.

6. The method of claim 1, wherein the segmenting the at least one posSIB into the plurality of posSIB segments comprises octet string segmentation or pseudo-segmentation.

7. The method of claim 1, wherein the base station periodically broadcasts scheduling information for the plurality of positioning SI messages, the scheduling information for each positioning SI message including the periodicity of broadcast of the positioning SI message and an identification of each posSIB assigned to the positioning SI message.

8. The method of claim 1, wherein the validity time comprises at least one of a start time, a duration, an end time or some combination thereof.

9. The method of claim 1, wherein the base station comprises an evolved NodeB (eNB) for 3rd Generation Partnership Project (3GPP) Long Term Evolution (LTE) or a New Radio (NR) NodeB (gNB) for 3GPP NR.

10. The method of claim 1, wherein the location server is an Enhanced Serving Mobile Location Center (E-SMLC) or a Location Management Function (LMF).

11. A location server configured for broadcasting positioning assistance data in a wireless network comprising:
    an external interface configured to communicate with a base station in the wireless network;
    at least one memory; and
    at least one processor coupled to the external interface and the at least one memory and configured to:
    determine the positioning assistance data to be broadcast by the base station;
    partition the positioning assistance data into a plurality of positioning System Information Blocks (posSIBs);
    segment at least one posSIB into a plurality of posSIB segments for the at least one posSIB;
    determine a validity time for the at least one posSIB; and
    send, via the external interface, the plurality of posSIBs to the base station, wherein the base station periodically broadcasts the plurality of posSIBs and the plurality of posSIB segments, wherein the validity time for the at least one posSIB is included in only one of the plurality of posSIB segments, wherein the only one of the plurality of posSIB segments is a first posSIB segment.

12. The location server of claim 11, wherein each posSIB in the plurality of posSIBs is assigned to one positioning System Information (positioning SI) message in a plurality of positioning SI messages, wherein the base station periodically broadcasts the plurality of posSIBs by periodically broadcasting the plurality of the positioning SI messages, wherein, for each posSIB assigned to a positioning SI message, the positioning SI message comprises an entire posSIB when the posSIB is not segmented or a segment of the posSIB when the posSIB is segmented into a plurality of posSIB segments, wherein consecutive broadcasts of the positioning SI message comprise consecutive segments of the plurality of posSIB segments when the posSIB is segmented into posSIB segments.

13. The location server of claim 11, wherein both a value tag are included as part of the positioning assistance data in the at least one of the plurality of posSIB segments, wherein the value tag indicates whether the positioning assistance data in the at least one posSIB has changed, and wherein the validity time and the value tag are transparent to the base station.

14. The location server of claim 13, wherein the positioning assistance data, the validity time and the value tag are defined according to an LTE Positioning Protocol (LPP) or an NR Positioning Protocol (NPP).

15. The location server of claim 13, wherein the value tag comprises a numeric value which remains unchanged while positioning assistance data in the at least one posSIB is unchanged and is changed when positioning assistance data in the at least one posSIB is changed.

16. The location server of claim 11, wherein the at least one processor is configured to segment the at least one posSIB into the plurality of posSIB segments using octet string segmentation or pseudo-segmentation.

17. The location server of claim 11, wherein the base station periodically broadcasts scheduling information for the plurality of positioning SI messages, the scheduling information for each positioning SI message including the periodicity of broadcast of the positioning SI message and an identification of each posSIB assigned to the positioning SI message.

18. The location server of claim 11, wherein the validity time comprises at least one of a start time, a duration, an end time or some combination thereof.

19. The location server of claim 11, wherein the base station comprises an evolved NodeB (eNB) for 3rd Generation Partnership Project (3GPP) Long Term Evolution (LTE) or a New Radio (NR) NodeB (gNB) for 3GPP NR.

20. The location server of claim 11, wherein the location server is an Enhanced Serving Mobile Location Center (E-SMLC) or a Location Management Function (LMF).

21. A location server configured for broadcasting positioning assistance data in a wireless network comprising:
    means for determining the positioning assistance data to be broadcast by a base station;
    means for partitioning the positioning assistance data into a plurality of positioning System Information Blocks (posSIBs);
    means for segmenting at least one posSIB into a plurality of posSIB segments for the at least one posSIB;
    means for determining a validity time for the at least one posSIB; and
    means for sending the plurality of posSIBs to the base station, wherein the base station periodically broadcasts the plurality of posSIBs and the plurality of posSIB segments, wherein the validity time for the at least one posSIB is included in only one of the plurality of posSIB segments, wherein the only one of the plurality of posSIB segments is a first posSIB segment.

22. A non-transitory storage medium including program code stored thereon, the program code is operable to configure at least one processor in a location server in a wireless network for broadcasting positioning assistance data, comprising:
    program code to determine the positioning assistance data to be broadcast by a base station;
    program code to partition the positioning assistance data into a plurality of positioning System Information Blocks (posSIBs);
    program code to segment at least one posSIB into a plurality of posSIB segments for the at least one posSIB;
    program code to determine a validity time for the at least one posSIB; and
    program code to send the plurality of posSIBs to the base station, wherein the base station periodically broadcasts the plurality of posSIBs and the plurality of posSIB segments, wherein the validity time for the at least one posSIB is included in only one of the plurality of posSIB segments, wherein the only one of the plurality of posSIB segments is a first posSIB segment.

* * * * *